United States Patent [19]

Anderson et al.

[11] Patent Number: 5,664,127
[45] Date of Patent: Sep. 2, 1997

[54] SYSTEM AND METHODS FOR IMPROVED SPREADSHEET INTERFACE WITH USER-FAMILIAR OBJECTS

[75] Inventors: Charles Anderson, Santa Cruz; Robert W. Warfield, Aptos; Istvan Cseri, Scotts Valley; Murray K. Low, Santa Cruz; Weikuo Liaw, Scotts Valley; Alan M. Bush, Palo Alto, all of Calif.

[73] Assignee: Borland International, Inc., Scotts Valley, Calif.

[21] Appl. No.: 608,448

[22] Filed: Feb. 28, 1996

Related U.S. Application Data

[62] Division of Ser. No. 78,877, Jun. 16, 1993, Pat. No. 5,502,805, which is a division of Ser. No. 866,658, Apr. 8, 1992, Pat. No. 5,416,895.

[51] Int. Cl.$^6$ .................................................. G06F 17/30
[52] U.S. Cl. .......................... 345/333; 345/339; 345/340; 345/347; 345/350; 395/764; 395/938
[58] Field of Search .................................... 395/155–161, 395/600, 326, 333–335, 339–340, 342, 348, 349, 350, 352–354, 764–765, 938, 939, 967, 614, 615

[56] References Cited

U.S. PATENT DOCUMENTS

| | | | |
|---|---|---|---|
| 4,674,042 | 6/1987 | Hernandez et al. | 364/401 |
| 4,896,291 | 1/1990 | Gest et al. | 364/900 |
| 4,974,174 | 11/1990 | Kleinman | 364/521 |
| 4,984,152 | 1/1991 | Muller | 364/200 |
| 4,987,527 | 1/1991 | Hamada et al. | 364/167.01 |
| 5,021,973 | 6/1991 | Hernandez et al. | 364/518 |
| 5,033,009 | 7/1991 | Dubnoff | 364/523 |
| 5,055,998 | 10/1991 | Wright et al. | 364/200 |
| 5,072,412 | 12/1991 | Henderson, Jr. et al. | 395/159 |
| 5,093,907 | 3/1992 | Hwong et al. | 395/152 |
| 5,095,429 | 3/1992 | Harris et al. | 364/408 |
| 5,121,499 | 6/1992 | McCaskill et al. | 395/700 |
| 5,140,678 | 8/1992 | Torres | 395/159 |
| 5,175,812 | 12/1992 | Kreiger | 395/156 |
| 5,179,718 | 1/1993 | MacPhail | 395/153 |
| 5,182,793 | 1/1993 | Alexander et al. | 395/13 |
| 5,231,577 | 7/1993 | Koss | 364/419 |
| 5,237,651 | 8/1993 | Randall | 395/148 |
| 5,283,864 | 2/1994 | Knowlton | 395/158 |
| 5,347,295 | 9/1994 | Agulnick et al. | 345/156 |
| 5,502,805 | 3/1996 | Anderson et al. | 395/148 |

FOREIGN PATENT DOCUMENTS

| | | |
|---|---|---|
| 0 428 261 A3 | 5/1991 | European Pat. Off. |
| 0 431 638 A2 | 6/1991 | European Pat. Off. |
| 0 443 184 A2 | 8/1991 | European Pat. Off. |
| WO92/04678 | 3/1992 | WIPO |
| WO92/08199 | 5/1992 | WIPO |

OTHER PUBLICATIONS

Euler et al, "Create Real Windows Applications . . . ", Microsoft Systems Journal, Jul. 1991, v. 6, No. 4, pp. 57–71.
Burns et al., "A graphical entity relationship database browser," *IEEE Sep. 1988*, pp. 694–704 (1988).
Canvas User Guide: Section 1, pp. 32–38; Section 2, pp. 7–9 (Deneba Systems, Inc. 1988).
Canvas Reference Manual: Section 3, pp. 4, 18, 42–46, 58–59, 79, and 86–87 (Deneba Systems, Inc. 1988).
Canvas 3.0, Section 1, p. 2; Section 2, pp. 16–20; Section 5, p. 15; Section 13, pp. 18–24; Section 19, pp. 97–98, 115–116, 146–150, and 204–211 (Deneba Systems, Inc. Jun. 15, 1991).

(List continued on next page.)

*Primary Examiner*—Joseph H. Feild
*Attorney, Agent, or Firm*—John A. Smart; David N. Slone

[57] ABSTRACT

An electronic spreadsheet system includes a notebook interface having a plurality of notebook pages, each of which may contain a spread of information cells, or other desired page type (e.g., Graphs page). Methods are provided for rapidly accessing and processing information on the different pages, including displaying a plurality of page identifiers for selecting individual pages, and further including a preferred syntax for referencing information. Additional methods are provided for editing cells and blocks of cells.

33 Claims, 35 Drawing Sheets

OTHER PUBLICATIONS

Collateral Purchase Agreement (1990).

Microsoft Windows User's Guide; 1990; pp. 22, 33–41; 187–188; 237–240; 283–292.

Taylor, "Using Lotus Spreadsheet for Deskmate;"1990, pp. 16, 47–72, 100–115; 204, 276, 277.

Tsuda et al., "Iconic Browser: An iconic retrieval system for object–oriented databases," 1989 *IEEE Workshop on Visual Languages*, pp. 130–137 (1989).

User's Guide Lotus 1–2–3 for Macintosh; pp. 7, 10–11, 86–87, 150–158, and 177–201 (Lotus Development Corporation 1991).

Birkholz, "Die Datenbank in der Tabellenkalkulation," *CHIP Zeitschrift fur Mikrocomputer–Technik*, No. 3, Mar. 1991, pp. 450–454.

Cakmakov, D. et al., "A Multimedia Cognitive–Based System Model," Advanced Computer Technology, Reliable Systems and Applications, 5th Annual European Computer Conference, Bologna, May 13–16, 1991, pp. 282–286.

"Hyperpaper," *IBM Technical Disclosure Bulletin*, vol. 33, No. 9, Feb. 1991, pp. 283–384.

Lotus Development Corporation, *Lotus User's Guide: Lotus 1–2–3 for Windows Release 1.0*, 1991, pp. 37–46, 307–317.

*Lucid 3–D Tutorial Guide*, Ch. 16, 1987, pp. 1–18.

*Microsoft Excel User's Guide*, 1990, pp. 76–79.

*Proceedings: Advanced Computer Technology, Reliable Systems and Applications*, 5th Annual European Computer Conf., CompEuro '91, May 13, 1991, Italy, pp. 282–286.

*The R–File: An Efficient Access Structure for Proximity Queries*, Feb. 1990, pp. 372–379.

496 — ABSOLUTE REFERENCE TO ROW 1

@PMT(B$1,A2/12,30*12)

| | A | B |
|---|---|---|
| 1 | Loan Amt | $202,300 |
| 2 | 9.00% | $1,628 |
| 3 | 8.50% | $1,556 |
| 4 | 8.00% | $1,484 |

COPIED REFERENCES TO ROW 1

@PMT(B$1,A7/12,30*12)

| | A | B |
|---|---|---|
| 1 | Loan Amt | $202,300 |
| 2 | 9.00% | $1,628 |
| 3 | 8.50% | $1,556 |
| 4 | 8.00% | $1,484 |
| 5 | | |
| 6 | Loan Amt | $150,000 |
| 7 | 9.00% | $1,628 |
| 8 | 8.50% | $1,556 |
| 9 | 8.00% | $1,484 |

NON-MODEL COPY:

FORMULAS STILL REFER TO ROW 1

@PMT(B$6,A7/12,30*12)

| | A | B |
|---|---|---|
| 1 | Loan Amt | $202,300 |
| 2 | 9.00% | $1,628 |
| 3 | 8.50% | $1,556 |
| 4 | 8.00% | $1,484 |
| 5 | | |
| 6 | Loan Amt | $150,000 |
| 7 | 9.00% | $1,207 |
| 8 | 8.50% | $1,153 |
| 9 | 8.00% | $1,101 |

USING MODEL COPY:

FORMULAS REFER TO ROW 6

FIG. 4J

COL. B

| | A | B | C | D | E | F |
|---|---|---|---|---|---|---|
| 1 | | | Current | Back | | |
| 2 | Part No. | Orders | Inventory | Orders | | |
| 3 | P5-724-AB01 | 724 | 1001 | 0 | | |
| 4 | P5-801-AA02 | 134 | 85 | 49 | | |
| 5 | D5-714-AA04 | 267 | 250 | 17 | | |
| 6 | D7-824-AB09 | 340 | 340 | 0 | | |
| 7 | | | | | | |
| 8 | Name | Address | City | ST | ZIP | |
| 9 | Roberta Alfred | 5843 County Rd | Bloomdale | MS | 29548 | |
| 10 | Adam Stackable | 990 Middlefiled St | Louisville | IN | 30929 | |
| 11 | Jerry Hurtado | 224 Handley Dr | Canyon | AZ | 12553 | |
| 12 | Mel Grant | 155 Miguel St | Atlanta | GA | 30309 | |
| 13 | Betty Rogers | 629 Powers Dr | Kankakee | IL | 60901 | |
| 14 | Joyce Lupinetti | 399 Glenview Way | Harrisburg | PA | 13099 | |
| 15 | Tom Jueneman | 8398 Inlet Rd | La Jolla | CA | 92651 | |

S1ONEPG.WB1 — 300

FIG. 4L

COL. B₁

S1TWOPGS.WB1:1 — 350, 351

| | A | B | C | D |
|---|---|---|---|---|
| 1 | | | Current | Back |
| 2 | Part No. | Orders | Inventory | Orders |
| 3 | P5-724-AB01 | 724 | 1001 | 0 |
| 4 | P5-801-AA02 | 134 | 85 | 49 |
| 5 | D5-714-AA04 | 267 | 250 | 17 |
| 6 | D7-824-AB09 | 340 | 340 | 0 |

COL. B₂ — 352

S1TWOPGS.WB1:2

| | A | B | C | D | E |
|---|---|---|---|---|---|
| 1 | Name | Address | City | ST | ZIP |
| 2 | Roberta Alfred | 5843 County Rd | Bloomdale | MS | 29548 |
| 3 | Adam Stackable | 990 Middlefiled St | Louisville | IN | 30929 |
| 4 | Jerry Hurtado | 224 Handley Dr | Canyon | AZ | 12553 |
| 5 | Mel Grant | 155 Miguel St | Atlanta | GA | 30309 |
| 6 | Betty Rogers | 629 Powers Dr | Kankakee | IL | 60901 |
| 7 | Joyce Lupinetti | 399 Glenview Way | Harrisburg | PA | 13099 |
| 8 | Tom Jueneman | 8398 Inlet Rd | La Jolla | CA | 92651 |

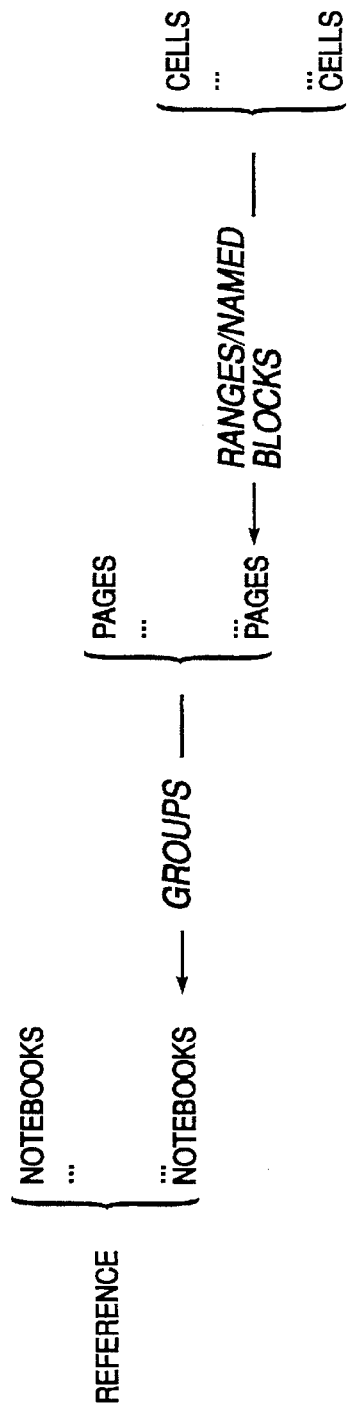

SYSTEM AND METHODS FOR IMPROVED SPREADSHEET INTERFACE WITH USER-FAMILIAR OBJECTS

The present application is a divisional application of application Ser. No. 08/078,877, filed Jun. 16, 1993, now U.S. Pat. No. 5,502,805 which is a division application of application Ser. No. 07/866,658, filed Apr. 8, 1992, now U.S. Pat. No. 5,416,895.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX

An Appendix A is included with this application.

BACKGROUND OF THE INVENTION

The present invention relates generally to the field of information processing by digital computers and, more particularly, to the processing and presentation of information by program applications, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computers memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro 2*, Borland-Osborne/McGraw-Hill, 1990; and LeBlond, G. and Cobb, D., *Using 1-2-3*, Que Corp., 1985. The disclosures of each of the foregoing references are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what if" scenarios. After a set of mathematical relationships has been entered into a worksheet, the spread of information can be recalculated using different sets of assumptions, with the results of each recalculation appearing almost instantaneously. Performing this operation manually, with paper and pencil, would require recalculating every relationship in the model with each change made.

While electronic spreadsheets offer significant productivity gains in the task of complex data modeling, none has been as intuitive to use as ordinary paper and pencil—objects already familiar to the user. Instead, the user must master many complex and arbitrary operations. To find the proper command for a task at hand, for example, the user must hunt through a complex menuing system, with the desired choice often buried under several menus. Even simple tasks can pose a significant challenge to the user. To change the punctuation format of a number in one prior art spreadsheet, for example, the user must traverse several nodes of a menu tree, carefully selecting among cryptic menu choices along the way. A mistake at any one of the nodes can lead to harsh consequences, including the loss of valuable data.

Finding this approach to be unworkable, many users memorize frequently-needed commands instead. To accomplish the foregoing task, for example, the user would memorize the command: /Worksheet Global Default Other International. As one can only memorize just so many arbitrary commands, however, the user typically masters only a very small subset of available commands and features. And without constant practice, these commands tend to be quickly forgotten. Moreover, many useful and needed commands are sufficiently hidden in layers of menus that they are never discovered by the user. All told, the non-intuitive interfaces of prior art spreadsheets have led to steep learning curves for users. Even after mastering a particular spreadsheet interface, the user typically only knows a fraction of available commands and features, most of which are easily forgotten.

Even with advances in computer and software technology, electronic spreadsheets have not necessarily become easier to use. Instead, technological advances have been largely employed to build more complex functions and modeling features into spreadsheets, often with more complicated menu trees; or worse yet, a staggering array of icons which leave the user even more bewildered. Thus, while prior art spreadsheets have continued to increase in functionality, they have also greatly increased in complexity for the user.

Three dimensionality is one such example. Three-dimensional spreadsheets allow the user to create a worksheet having cells arranged in a 3-D grid. In this manner, the user can manipulate multi-dimensional ranges, i.e., solid blocks of cells. This feature has distinct advantages. For example, the user can build a worksheet consisting of multiple two-dimensional spreads, define 3-D ranges that span these spreads, and copy a range of rows and columns into each of many 2-D spreads at once. This feature eases difficult choirs, such as consolidation of multiple spreads.

Despite its advantages, three-dimensionality, as presently implemented, is an advanced feature beyond the grasp of many spreadsheet users. This is not a necessary result of a three-dimensional model per se but, instead, has resulted from poor implementations of the model in prior art spreadsheet programs. One popular implementation of the model in the prior art, for example, requires the user to manipulate each additional spread of a three-dimensional spreadsheet as a separate window in a graphical windowing environment. This approach is far from intuitive, however. In particular, this approach requires the user to master actions which have no counterpart in everyday activities. While three-dimensional spreadsheets provide additional functionality, they serve to illustrate how non-intuitive implementations of new technology greatly add to the complexity of the user interface.

What is needed is application software which maintains a highly intuitive interface. Moreover, the application should implement advanced features, such as three dimensionality, by employing interface objects which are familiar to the user. In this manner, the user will not have to master an elaborate and/or awkward environment but, instead, may rely upon his or her own common fund of knowledge. The present invention fulfills this and other needs.

SUMMARY OF THE INVENTION

Application software, such as electronic spreadsheets, have found wide application in the processing and presentation of information. Despite their computational power, however, these programs require users to master complex interfaces, adopting abstract representation models which are beyond the grasp of ordinary users. As a result, much of the computational power of these applications goes un-utilized by end users.

The present invention, in contrast, provides system and methods having a highly intuitive interface for users. More particularly, the present invention provides interface objects which are familiar to the user. In an exemplary embodiment of the present invention, an electronic spreadsheet system includes a notebook interface having a plurality of notebook pages, each of which contains a spread of information cells, or other desired page type (e.g., Graphs page).

Methods are provided for rapidly accessing and processing information on the different pages, including, for example, displaying a plurality of page identifiers for selecting individual pages. Additional methods are provided for editing cells and blocks of cells. In this fashion, the spreadsheet notebook of the present invention provides a convenient means for organizing and presenting information. Moreover, the spreadsheet notebook of the present invention readily accommodates complex data (e.g., consolidation across multiple spreads); yet, at the same time provides the user with a highly intuitive interface, one which employs interface objects which are familiar to the user.

The present invention also includes system and methods for conveniently inspecting and setting the properties of object. A method for accessing an objects property, in accordance with the present invention, includes receiving a request from the user for inspection of an object; accessing properties for the object; and displaying the properties to the user. From the displayed properties, the user may alter the characteristics of the object, as desired.

BRIEF DESCRIPTION OF THE DRAWINGS

FIGS. 4H–J are a series of screen bitmaps illustrating the model copy method of the present invention.

FIGS. 4L–M are screen bitmaps illustrating the presentation of information in a notebook of the present invention.

FIG. 5A is a screen bitmap illustrating exemplary objects of the spreadsheet notebook of the present invention.

FIGS. 8D–F illustrate the referencing of information in the spreadsheet notebook of the present invention.

DETAILED DESCRIPTION OF A PREFERRED EMBODIMENT

System Hardware

Figure 1A:
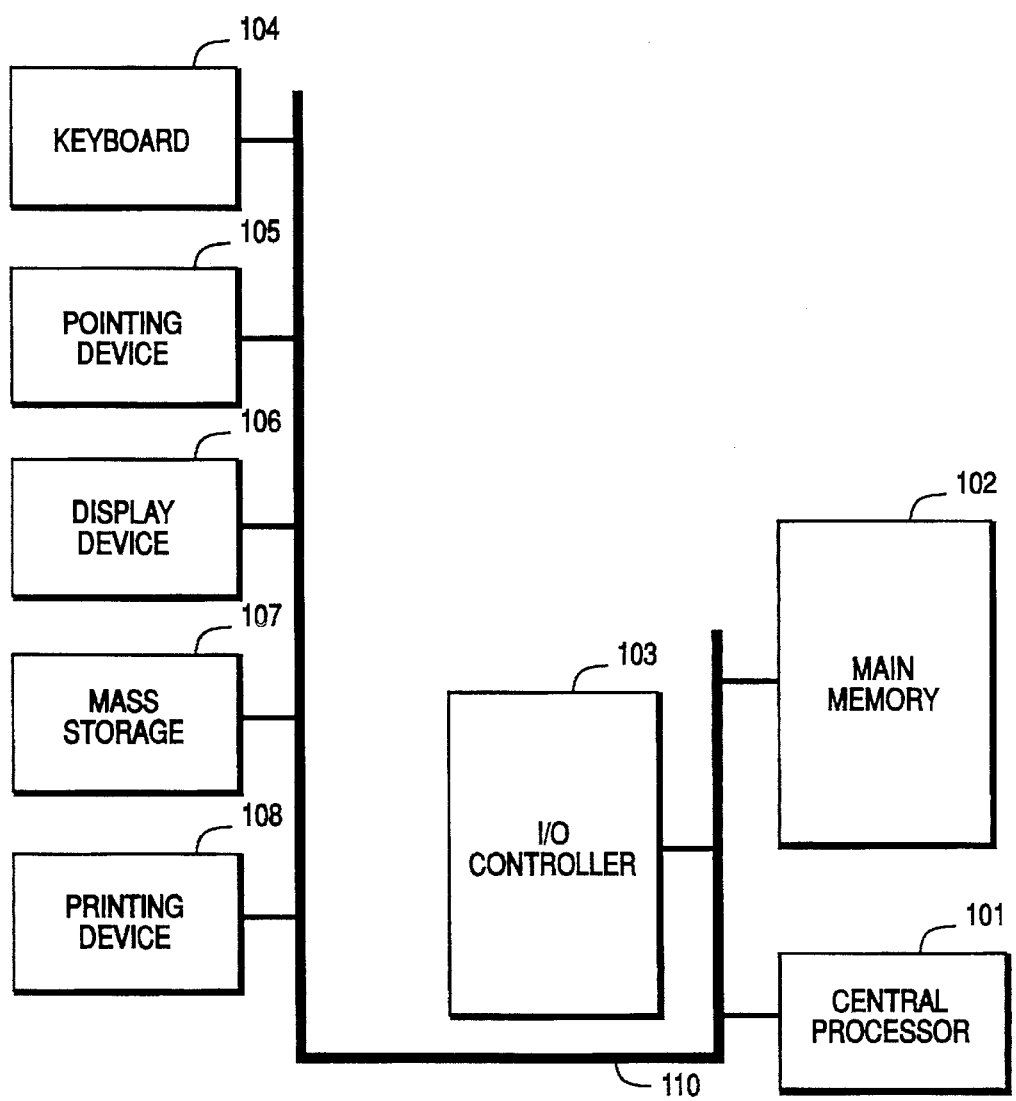
FIG. 1A is a block diagram of a computer system in which the present invention may be embodied.

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
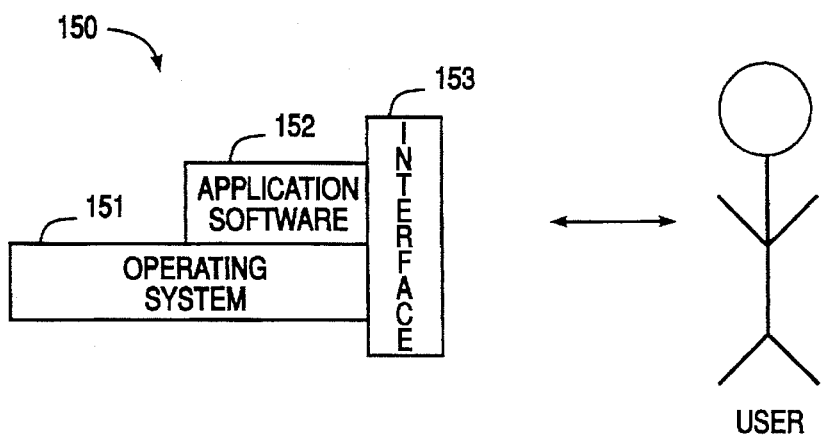
FIG. 1B is a block diagram of a software system of the present invention, which includes operating system, application software, and user interface components.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 is MS-DOS, and interface 153 is Microsoft® Windows; both are available from Microsoft Corporation of Redmond, Wash. Application module 152, on the other hand, includes a spreadsheet notebook of the present invention (as described in further detail hereinbelow).

Interface: User-Familiar Objects

A. Introduction

The following description will focus on the presently preferred embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
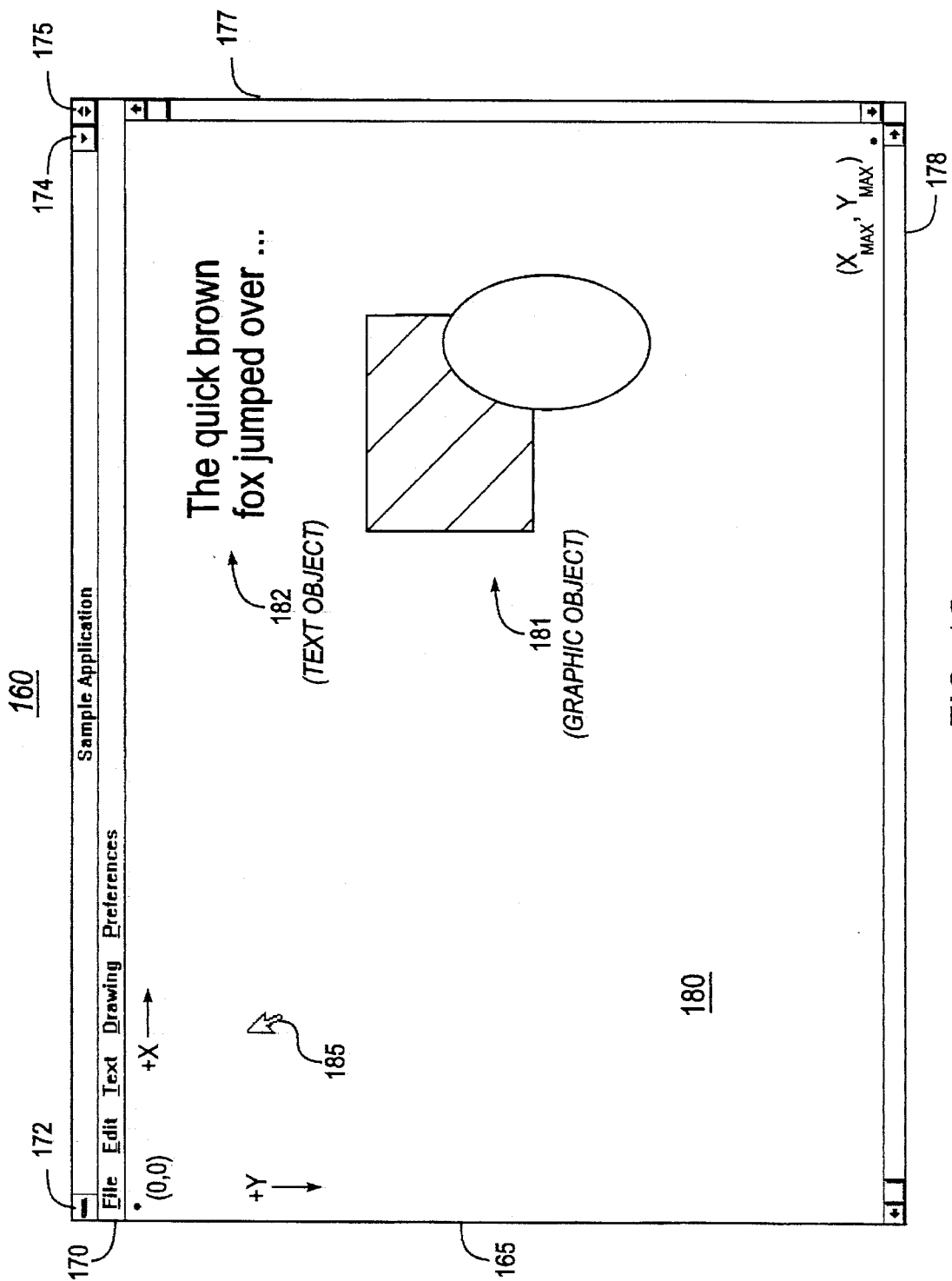
FIG. 1C is bitmap screen shots illustrating the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computers of Cupertino, Calif., Microsoft Corporation of Redmond, Wash. and Logitech Corporation of Fremont, Calif., respectively. More preferably, screen cursor control device 105 is a two-button mouse device, including both right and left "mouse buttons." Programming techniques and operations for mouse devices are well documented in the programming and hardware literature; see e.g., *Microsoft Mouse Programmer's Reference*, Microsoft Press, 1989, the disclosure of which is hereby incorporated by reference.

B. Spreadsheet Notebooks

In contrast to conventional applications, even those operative in a windowing environment, the present invention includes user-familiar objects, i.e., paradigms of real-world objects which the user already knows how to use. In an exemplary embodiment, system 100 includes a spreadsheet notebook interface, with such user-familiar objects as pages and tabs. In this manner, complexities of the system are hidden under ordinary, everyday object metaphors. By drawing upon skills which the user has already mastered, the present invention provides a highly intuitive interface—one in which advanced features (e.g., three-dimensionality) are easily learned.

1. General Interface

Figure 2A:
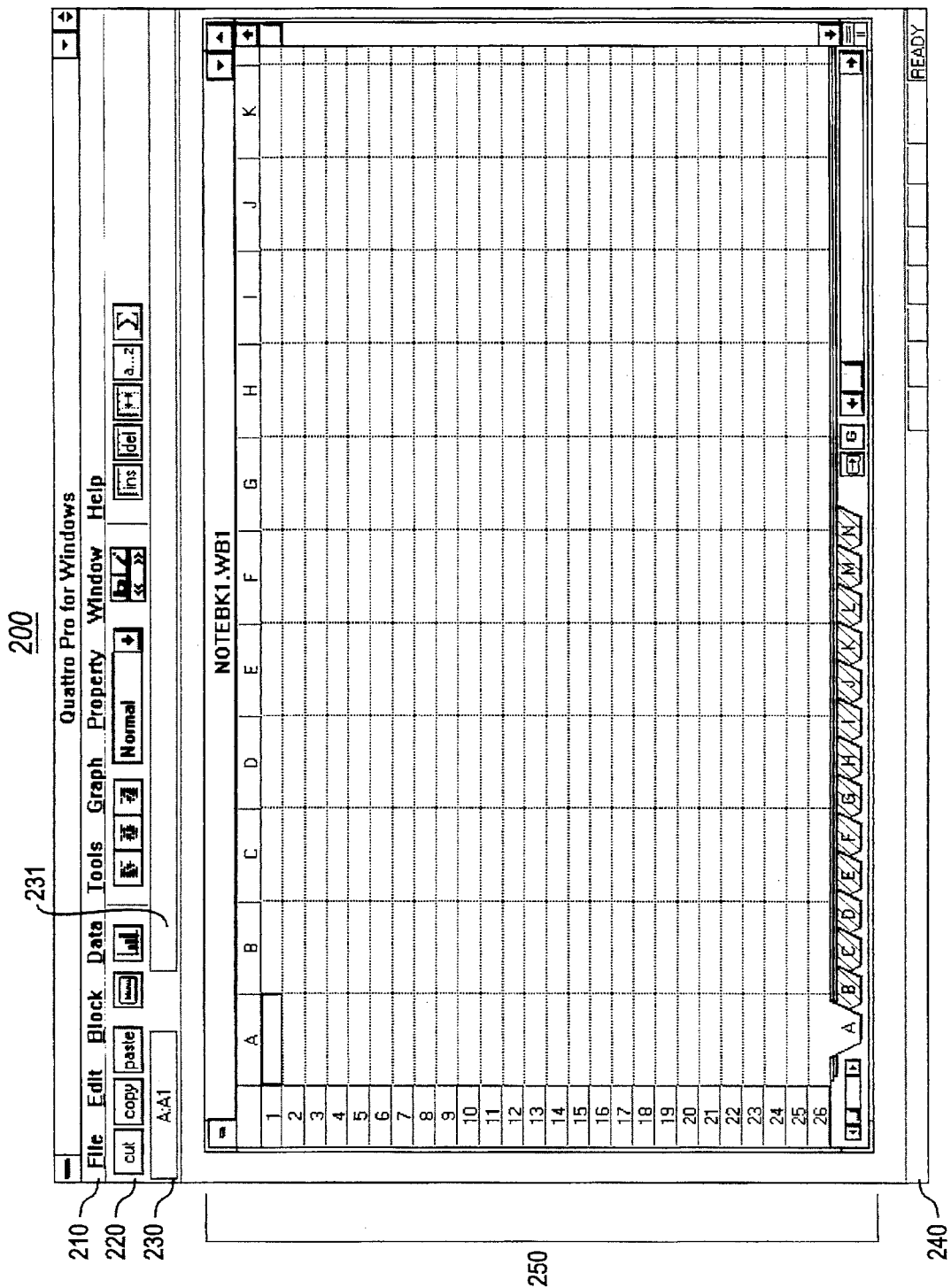
FIG. 2A is a screen bitmap illustrating a spreadsheet notebook of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a tool bar 220, a current cell indicator 230, an input line 231, a status line 240, and a notebook window 250. The menu bar 210 displays and invokes, in response to user inputs, a main level of user commands. Menu 210 also invokes additional pulldown menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
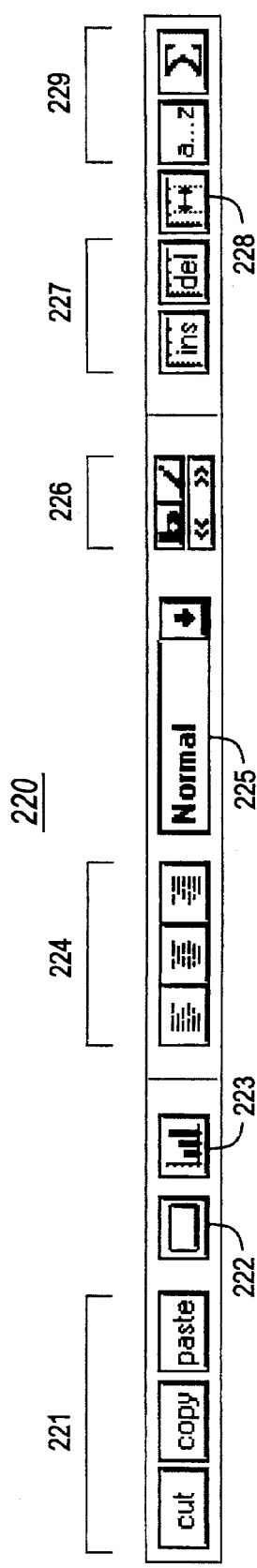
FIG. 2B is a bitmap of a tool bar component of the spreadsheet of the present invention.

The tool bar 220, shown in further detail in FIG. 2B, comprises a row or palette of tools which provide a quick way for the user to choose commonly-used menu commands or properties. In an exemplary embodiment, tool bar 220 includes cut, copy, and paste buttons 221, a power button tool 222, a graph tool 223, alignment buttons 224, a style list 225, font buttons 226, insert/delete buttons 227, a fit button 228, and action buttons 229. Buttons 221 cut, copy and paste data and objects to and from Windows clipboard. The same actions are also available as corresponding commands in the Edit menu (available from menu bar 210). Tool 220 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

Other tools are available for formatting cells. Alignment buttons 224 place cell entries flush left, centered, or flush right, as desired. The style list 225 specifies the style for the active block and may be selected from a plurality of predefined styles (e.g., normal, currency, fixed, percent, and the like). The font buttons 226 effect font changes, including toggling bold and italic fonts, as well as increasing and decreasing font (point) size. The insert and delete buttons 227 permit the user to insert or delete blocks, rows, columns, and pages (described in further detail hereinbelow), as desired. The fit button 228 allows the user to quickly tailor a column's width to match its widest cell entry. Action buttons 229 provide automated spreadsheet operations, including sorting and summing operations. For example, a Sort button, when invoked, performs a sort on data in a currently active block. A sum button, on the other hand, totals the values in any block of cells by generating an @SUM function, just outside a selected range of blocks.

2. Notebook and Pages

Figure 2D:
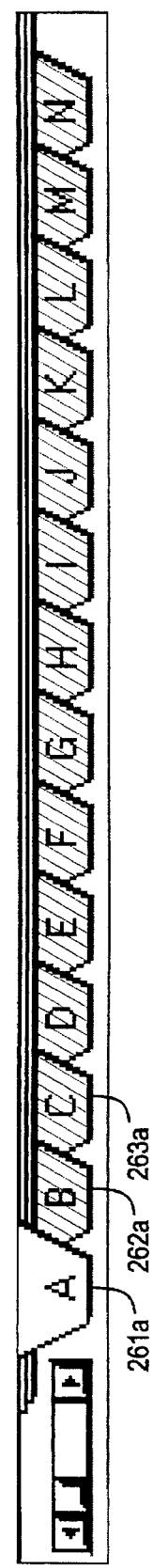
FIGS. 2D–E are bitmaps illustrating page identifiers for rapidly accessing and manipulating individual pages of the notebook of the present invention.
Figure 2E:
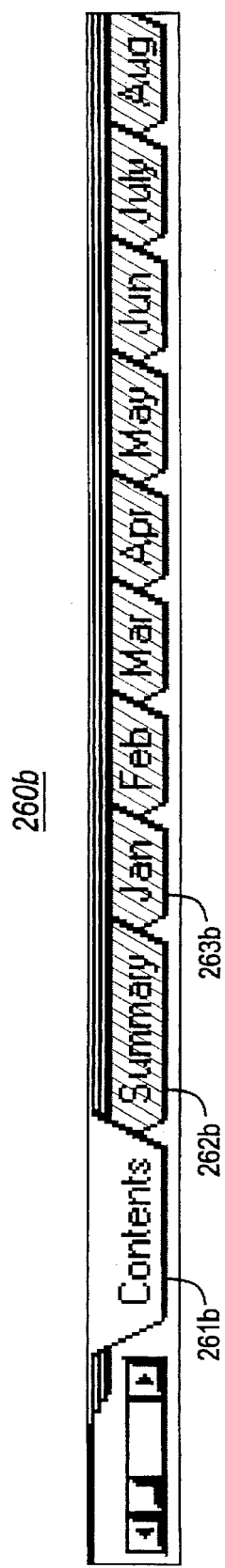
Figure 2C:
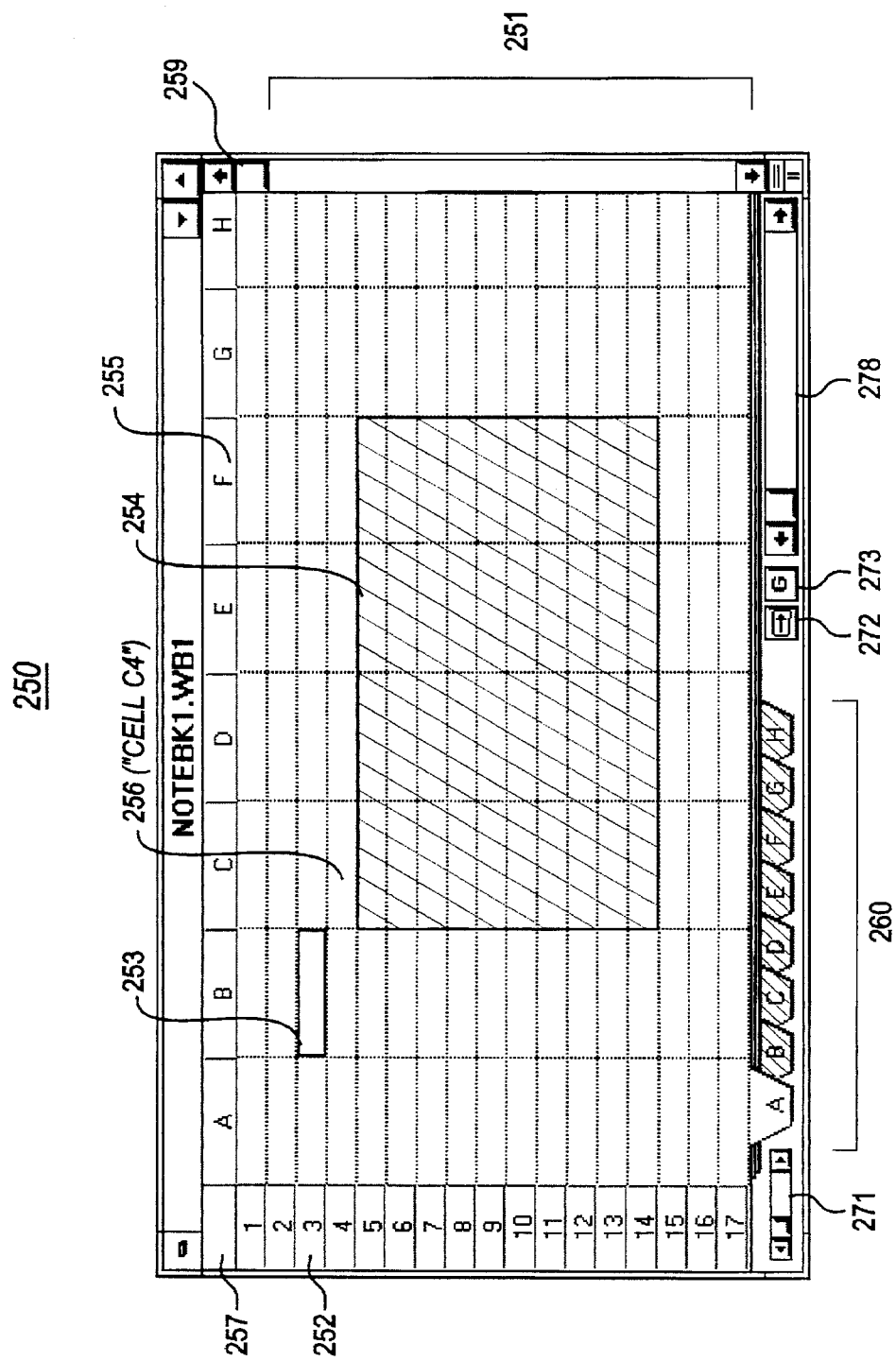
FIG. 2C is a screen bitmap illustrating a notebook window from the spreadsheet notebook of the present invention.

Notebook 250, shown in further detail in FIG. 2C, provides an interface for entering and displaying information of interest. The notebook 250 includes a plurality of spreadsheet pages, such as page 251 (Page A). Notebook 250 also includes a "Graphs page" for readily accessing all the graphs created for the notebook. Each page may include conventional windowing features and operations, such as moving, resizing, and deleting. In a preferred embodiment, the notebook 250 includes 256 spreadsheet pages and one Graphs page, all of which are saved as a single disk file on the mass storage 107. In accordance with the present invention, workspace 200 may display one or more notebooks, each sized and positioned (e.g., tiled, overlapping, and the like) according to user-specified constraints. When a single notebook is used, notebook 250 will typically occupy a majority of workspace 200.

Each spreadsheet page of a notebook includes a 2-D spread. For example, spreadsheet page 251 includes a grid in row and column format, such as row 252 (row 3) and column 255 (col. F). At each row/column intersection, a box or cell (e.g., cell C4) is provided for entering, processing, and displaying information in a conventional manner. Each cell is addressable, with a selector 253 being provided for indicating a currently active one (i.e., the cell that is currently selected).

As shown in FIGS. 2C–E, individual notebook pages are identified by page identifiers 260, preferably located along one edge of the notebook 250. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2D, the tab members 260 are set to their respective default names. For example, the first three tab members (members 261a, 262a, 263a) are respectively set to A, B, and C. In a preferred embodiment, however, tab members are typically given descriptive names provided by the user. As shown in FIG. 2E, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet formulas. For example, when entering a formula referring to cells on another page, the user may simply use the descriptive page name in the formula itself (as described hereinbelow), thus making it easier for the user to understand the relationship of the cell(s) or information being referenced.

3. Navigation in a Notebook

Figure 3A:
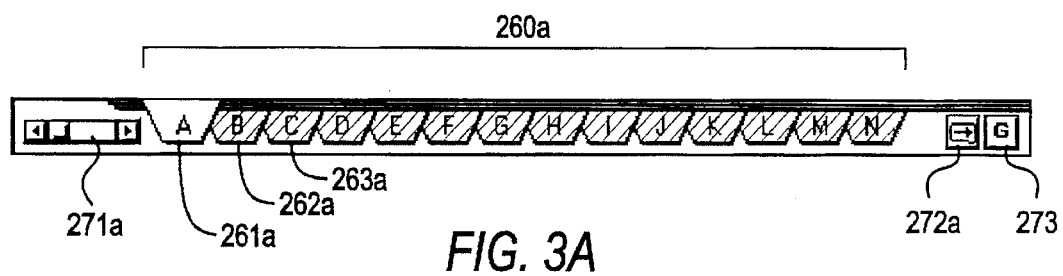
FIGS. 3A–C illustrate navigation (i.e., access of desired information) in the spreadsheet notebook of the present invention.
Figure 3B:
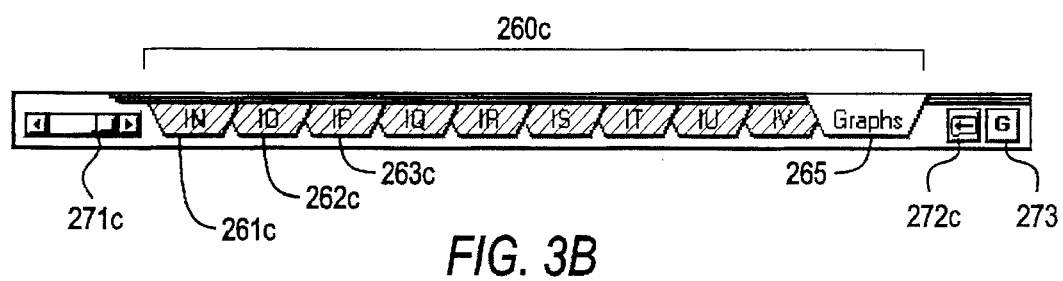
Figure 3C:
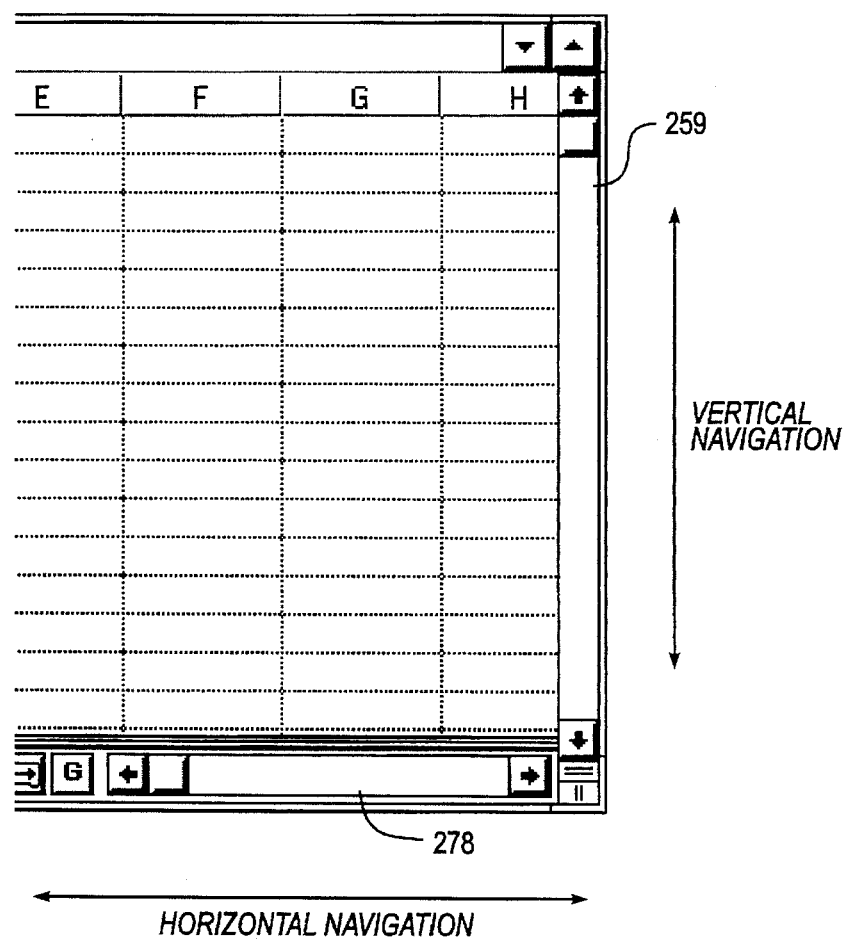

Referring now to FIGS. 3A–C, movement (i.e., location of desired information cells) within a spreadsheet notebook of the present invention is illustrated. To move to different pages in the notebook, the user simply selects the corresponding tab from tabs 260. To move to Page B, for example, the user selects (e.g., with keyboard 104 or pointing device 105) tab 262a; similarly, Page C is reached by selecting tab 263a. Continuing the example, the user may return to Page A by selecting tab 261a. Thus instead of finding information by scrolling different parts of a large spreadsheet, or by invoking multiple windows of a conventional three-dimensional spreadsheet, the present invention allows the user to simply and conveniently "flip through" several pages of the notebook to rapidly locate information of interest.

Notebook 250 also includes supplemental tools for navigation between pages, including a tab scroller 271 and a fast-forward button 272. The tab scroller (shown in two different states: 271a and 271b) permits access to identifiers for pages which are not currently visible on the screen device 106. If a desired identifier or tab is not currently in view, the user simply activates the tab scroller 271 to reveal additional tabs. The fast-forward button 272, on the other hand, provides immediate access to the last pages of the notebook, including the Graphs page. As shown in FIGS. 3A and B, after invoking the fast-forward button 272a, the page identifiers for the last pages (e.g., tabs 261c, 262c, 263c, 265) are accessible. To switch back to the previously active spreadsheet page, the user may select or click the fast-forward button 272c again. For navigation within a spreadsheet page, horizontal and vertical scrollbars 278, 259 are provided; general features and operations of basic scroller or sliders are described in Windows user and programming literature, including Microsoft's *Windows Software Development Kit*.

4. Selections and Aggregate Operations Within a Notebook

The selection of desired information cells in the notebook of the present invention is now described. For selecting a plurality of information cells, both 2-D blocks (e.g., block 254 of FIG. 2C) and 3-D blocks of cells may be defined. A 2-D block is a rectangular group of one or more cells and is identified by block coordinates, such as the cell addresses of its upper-left and bottom-right corners. Similarly, a 3-D block represents a solid block (e.g., cube) of cells.

A 2-D block is specified by selecting, with mouse 105 or keyboard 104, opposing corners. In FIG. 2C, for example, the block 254 is defined by corner cells C5 and F14. Additional selection examples are illustrated in FIGS. 4A–E. For example, column B (col. 411) is selected by clicking column heading 410; similarly, row 3 (row 421) is chosen by clicking row heading 420. Selection may be additive (i.e., additional selections are appended to the current ones), as shown by selection of a row 420 and a column 410 in FIG. 4C. To facilitate the selection of all cell members (e.g., block 431), a select-all button 430 is also provided. In addition to these "contiguous" blocks, non-contiguous block selection (e.g., selection of blocks 441, 442) is provided by use of a status key (e.g., CTRL-, ALT-, or SHIFT-) plus a mouse event (e.g., click and drag operations).

Selection of 3-D cell blocks, i.e., cell ranges spanning more than one page, occurs in a similar fashion. To extend the block 254 (of FIG. 2C) into a 3-D block, the user specifies an additional or third dimension by selecting an appropriate page identifier. If the user selects the D tab while the block 254 is selected (e.g., with a SHIFT or other status key), the 2-D block is extended into a 3-D block spanning from Pages A to D. Additional 3-D operations may be performed by utilizing a method of the present invention for grouping pages, which will now be described.

Figure 4A:
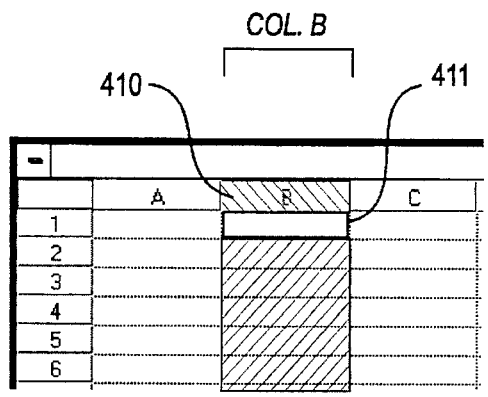
FIGS. 4A–E are screen bitmaps illustrating the selection of information cells in the spreadsheet notebook of the present invention.
Figure 4B:
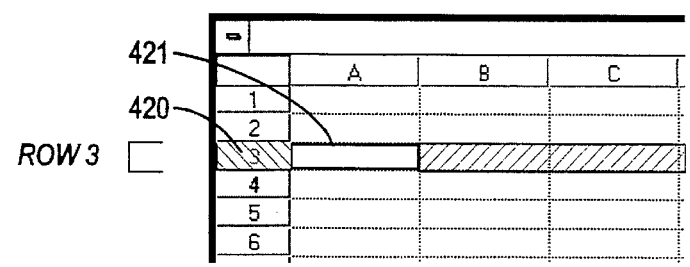
Figure 4C:
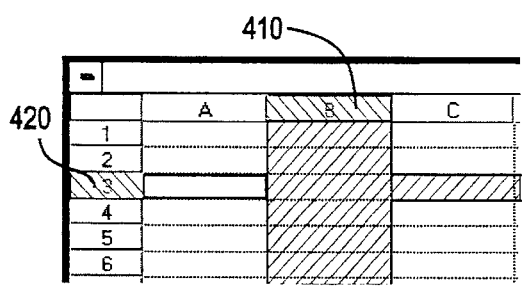
Figure 4D:
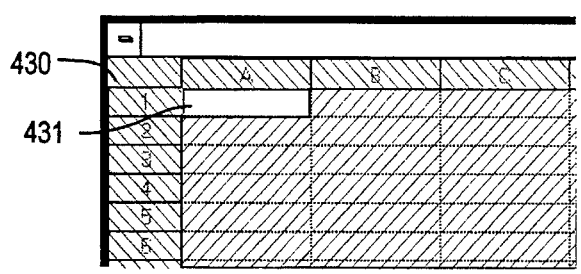
Figure 4E:
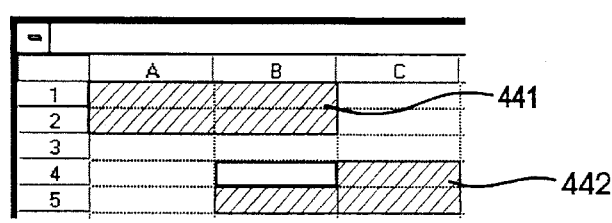
Figure 4F:
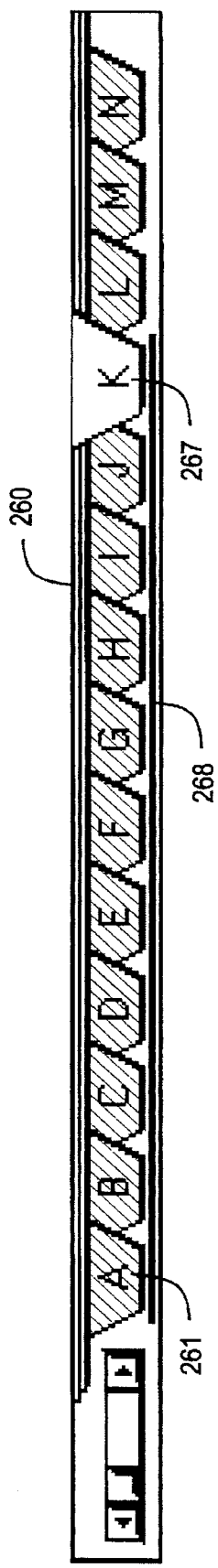
FIG. 4F is screen bitmap illustrating the operation of grouping one or more desired pages in the spreadsheet notebook of the present invention.

Pages may be selected or grouped together, thereby providing a means for changing multiple pages simultaneously. In much the same manner as cells from a spread are grouped into 2-D blocks, a range of pages are grouped by specifying beginning and ending members. As shown in FIG. 4F, a range from Page A to Page K may be achieved by selecting tabs A (261) and K (267) from identifiers 260, for example, while depressing a key (e.g., status key). A grouping indicator 268 is displayed for indicating members of a group; groupings may also be annotated with user-specified labels. Once grouped, a page of the group may have its operations (e.g., selection, data entry, and the like) percolate to the other members of the group, as desired. A non-contiguous selection of pages may also be selected (even across different pages); for example, a selection of Pages A and D, but not B and C, may be achieved by selecting tabs A and D while depressing a second key (e.g., CTRL- key). Furthermore, groups may overlap (i.e., a page can be in more than one group), as desired. By selectively activating a group mode (e.g., by toggling group button 273), groupings may be temporarily turned off, in which case events are not percolated to other members of the group.

With group mode active, an activity in a page which is a member of a group can also affect similarly situated cells of the other pages of the group. For example, information entered in a cell on one page of the group can also propagate to the same (relative) cell in other pages of the group; data entry may be "drilled" (propagated) to other group pages by concluding data entry, for example, with a "Ctrl-Enter" keystroke (instead of a "Enter" command). For instance, an entry into cell C4 of Page A may also conveniently and automatically appear in cell C4 of pages B, C, D, E, F, G, H, I, J, and K, for an A–K grouping. Similarly, block or aggregate operations may propagate across member pages. For example, a block operation (e.g., Block Fill) for cells A1 to C4 in Page A in an A–D grouping would also operate (in this case, fill information) in the same cells (i.e., from A1 to C4) for Page B to Page D.

Employing the user-specified page identifiers of the present invention, a simple nomenclature is available for specifying these solid blocks of information. In a preferred embodiment, a solid block is specified by:

<<First Page>> . . . <<Last Page>>:<<First Cell>> . . . <<Last Cell>>

For example, a solid block may be defined as A . . . D:A1 . . . C4, in which case the block spans from cells A1 to C4, and spans across Pages A–D. By permitting alias names (i.e., user-supplied alternative labels), the present invention allows the block to be specified as 1989 Sales . . . 1992 Sales:A1 . . . C4; or even 1989 Sales . . . 1992 Sales: First Quarter . . . Third Quarter. Additionally, the present invention readily accommodates notebook information as well, for example, [TAX]1989 Sales . . . 1992 Sales:First Quarter . . . Third Quarter, thus permitting information to be linked across various notebooks. Wildcard characters (e.g., * and ?) may also be employed for cell, page, and notebook identifiers, as desired. Thus, the spreadsheet notebook of the present invention provides a 3-D interface which readily accommodates real-world information in a format the user understands (instead of forcing the user to adapt his or her information to fit an arbitrary spreadsheet model).

5. Advanced Editing

Figure 4G:
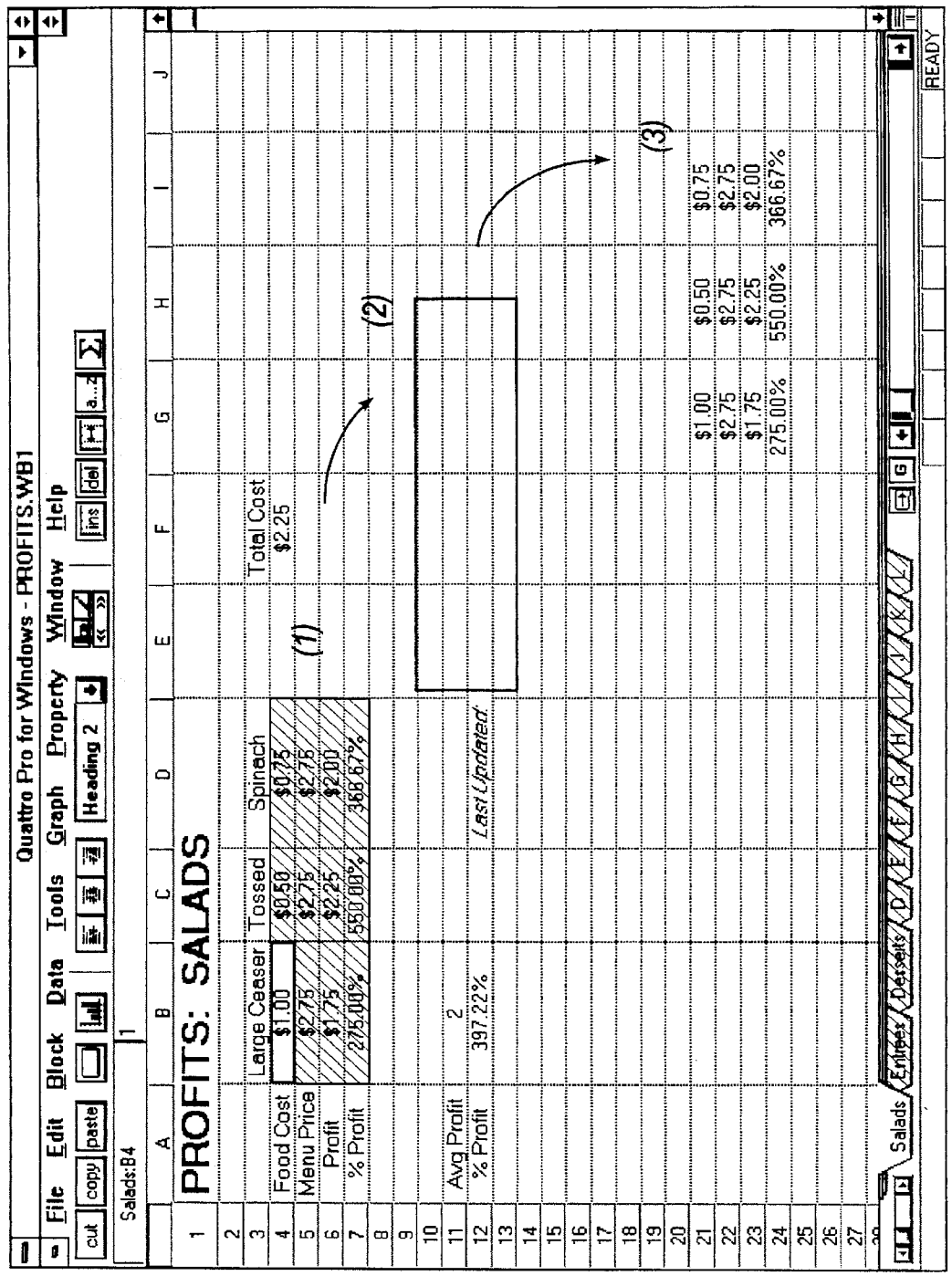
FIG. 4G is a screen bitmap illustrating drag-and-drop editing in the spreadsheet notebook of the present invention.

Whether 2-D or 3-D in nature, blocks of cells may be easily copied and cut (i.e., moved) using drag-and-drop editing techniques of the present invention. As shown in FIG. 4G for a 2-D block, for example, a method for copying a block of cells includes (1) selecting a source block by dragging a range of cells (e.g., mouse button-down events coupled with mouse movement across the range; close selection with a button-up event), (2) dragging the block (e.g., click within block, followed by repeated mouse button-down events), and (3) dropping the block (e.g., mouse button-up event at desired target location). In a similar fashion, 3-D blocks may be dragged and dropped.

In typical cut and copy operations, relative and absolute cell addressing is employed, as is known in the art (see e.g., *Using 1-2-3*). According to the present invention, however, a "model copy" technique for copying blocks is also provided. Model copying, illustrated in FIGS. 4H–J, is useful when the user is copying a block that contains absolute references to cells within the copied block. In FIG. 4H, a small spread model 496 is shown which contains a formula to figure the monthly payment for a 30-year loan at different interest rates; a reference to the loan amount was entered as absolute so that when the formula is copied, it continues to refer to cell B1. The user may want to calculate (at the same time) monthly payments for different loan amounts and, thus, might copy the model, with the loan amount changed (shown in FIG. 4I as spread 497). However, in this approach the absolute reference still refers to row 1; to correct this, the user would typically manually edit each formula to refer to B6 instead of B1.

With model copying of the present invention enabled (e.g., by default or through a user dialog), however, the problem is solved. In particular, absolute references adjust to the new location of the referenced cell, as shown by spread 498 in FIG. 4J; however, absolute references remain absolute to make future copies absolute. For instance, should the user make more copies of the formula, the reference to cell B6 is still absolute. In this manner, model copying of the present invention saves the user time-consuming and error-prone editing of formulas.

Figure 4K:
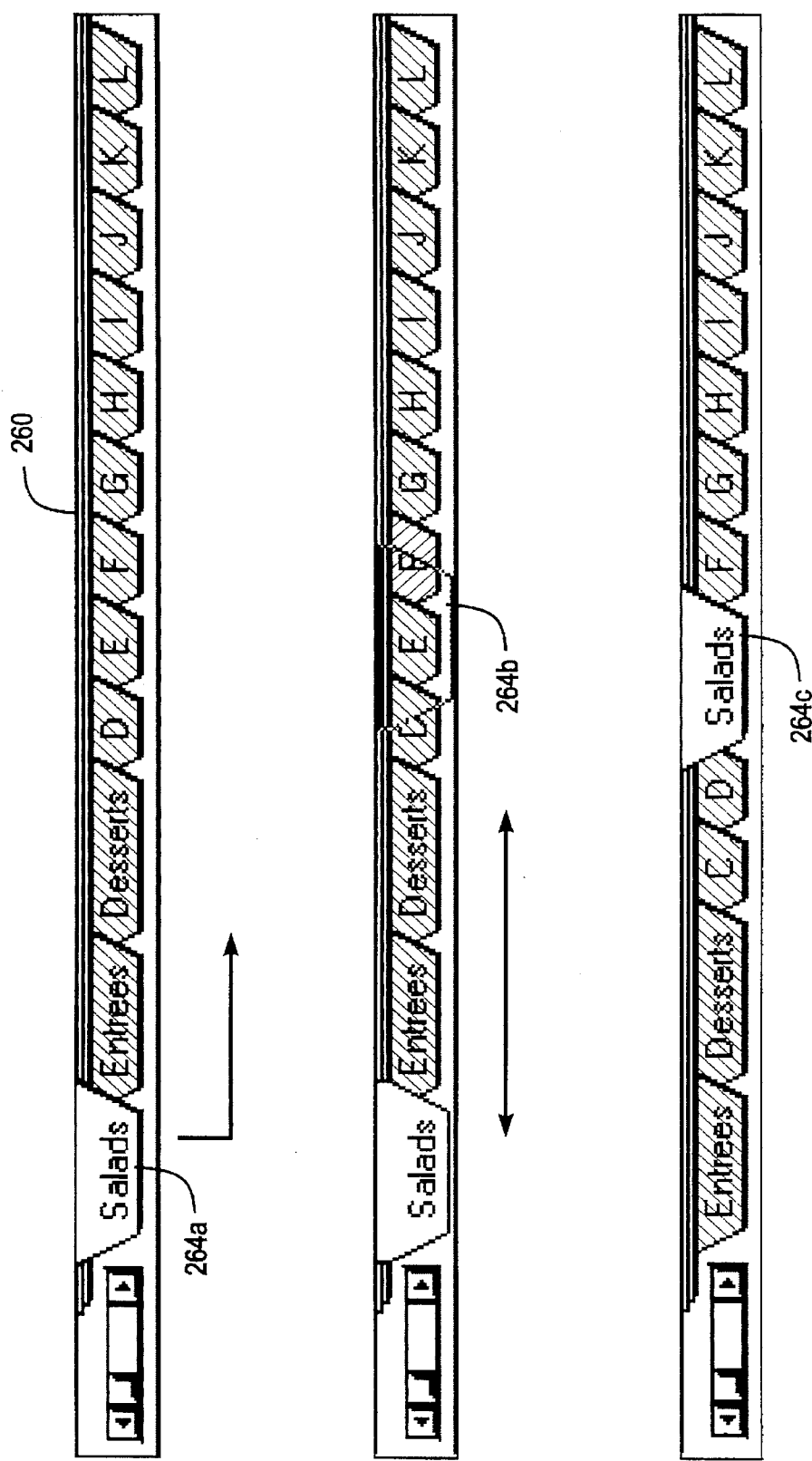
FIG. 4K is a set of bitmaps illustrating the operation of moving and copying a notebook page.

As shown in FIG. 4K, notebook pages may be copied or moved using the drag-and-drop editing techniques of the present invention (a dialog box is also provided as an alternative). As shown, for example, the "Salads" page is moved by selecting its tab identifier 264a from the identifiers 260; in a preferred method, the identifier is selected by dragging it downward (mouse button-down plus downward movement) with the mouse cursor. Next, the, identifier is dragged to a desired new position (mouse button-down plus left and right movement). Once positioned at a desired location (as indicated by in-transit tab identifier 264b), the page is then "dropped" (mouse button-up) into position. Similarly, a "copy" operation may be effected by coupling the above operation with a status key (e.g., CTRL-); in a preferred method of copying, only the page information (not its tab identifier) is copied to a target location.

Additional editing operations may be easily accomplish using the page identifiers of the present invention. For example, an additional page may be inserted by selecting a desired tab and entering "INS" (keyboard or mouse). Similarly, a notebook page may be deleted by coupling the selection of a corresponding page tab to a delete command.

6. Advantages

In contrast to prior art spreadsheet implementations, use of the spreadsheet notebook of the present invention is easily ascertained by the user. The notebook interface of the present invention provides a convenient means for organizing many spreadsheets together into one file. This permits the user to load (into memory 102) all related information with a single command, without having to remember a variety of different file names. Moreover, the notebook interface 250 encourages a user to spread data out among multiple pages, thus better organizing one's data. In FIG. 4L, for example, spreadsheet page 300 illustrates the conventional method for grouping unrelated information onto a single spreadsheet. As shown in column B, the incorporation of unrelated information into a single spread leads to unnecessary whitespace padding of information. In FIG. 4M, in contrast related information is grouped on separate pages 351, 352 (e.g., with their own columns, col. $B_1$ and Col. $B_2$) of notebook 350. Not only does this eliminate grouping of disparate information, with its disadvantages (e.g., padding data entries), but it also encourages better organization of information.

Inspecting and Setting the Properties of Objects

A. Disadvantages of Prior Techniques

Standard windowing interfaces depend heavily on a clunky system of pull-down menus. While pull-down menus are an improvement over command-line (e.g., MS-DOS) interfaces, they are non-metaphoric or non-analogous to ordinary objects, i.e., ones familiar to the user. Thus, prior art windowing GUIs are no more intuitive or useful to the user than other menuing systems.

Perhaps the biggest weakness of pull-down menus is the requirement that the user must know beforehand which menu contains the item or function of interest. If the user does not know which pull-down menu, submenu, or dialog box contains the item he or she is seeking, the user will spend an inordinate amount of time checking the contents of each in an effort to hunt down the needed item. And often the search is in vain. Moreover, since functions for a given object (e.g., text object) are often scattered over several disparate menus, the user is discouraged from interacting and experimenting with the object.

One approach to overcoming this problem has been the implementation of "smart icons." This interface technique employs screen buttons painted with icons which are supposed to tell the user what the buttons do. This approach, however, often makes the interface problem even worse because the meaning of the icons are not easily grasped. Thus, the approach is often no more helpful than hiding the desired function deep inside a menuing system. Worse, some button images are so small or so numerous that it is hard to see the icons well enough to discern what they mean.

B. Property Inspectors

1. Introduction

Overcoming this problem, the present invention provides "property inspectors" for inspecting and setting the properties of objects. Property inspectors of the present invention examine an object of interest to the user and tell the user what can be done to it. In this manner, the present invention requires the system and its interface components (e.g., menus or dialog boxes), not the user, to know what functions are being sought or may be of immediate interest to the user. Moreover, property inspectors of the present invention require the program to present functions to the user when and where he or she requests them, rather than making the user hunt for them when they are needed. Thus, the user need only know which data item or object he or she wants to inspect or manipulate.

In the spreadsheet notebook, for example, there are many kinds of objects which one can use. Examples include cells, blocks of cells, pages, notebooks, graphs and their elements (including bars or axes), dialog boxes, and even the application program itself. Each of these objects has properties, which are characteristics of that particular object. For example, blocks of cells have a font property that can be set to bold, so that the text of entries in the block appear in boldface type. A property of a workbook page, on the other hand, is the name that appears on its tab. Each notebook has its own palette property for controlling available colors. Application properties, for instance, include system defaults, such as a default storage directory or file extension. Thus in any system, the user has a variety of objects available, each of which has its own set of properties.

Property inspection of the present invention provides the user with immediate access to an object's properties. If the object of interest is a spreadsheet cell, for example, the property inspector of the present invention produces a menu that includes font, color, border, size, and other display properties, along with formula properties which may be modified. If, on the other hand, the object is a graph, the property inspector will display a menu to change its color, shape, borders, and other features of a spreadsheet graph. Moreover, inspection menus are state or context-sensitive, i.e., constructed on-the-fly to reflect the current state of the object. If an object's properties change so that what a user can do to it also changes, the property inspector of the present invention will create a new and appropriate menu reflecting those changes.

A variety of user events, including keyboard and mouse events, may be employed to invoke property inspection and setting. In a preferred method of the present invention, however, an object is inspected by selecting the object with a screen cursor, i.e., clicking (generating a mouse event) on the object. Since, according to the present invention, property inspection may be available across different modes of operation (i.e., generally available at all times), the generated mouse event or signal is preferably one which does not launch or otherwise invoke routine object actions. Instead, the mouse signal should be one which the user will easily associate with inspection of an object. In a two or three mouse button embodiment of the present invention, therefore, the generated mouse signal is most preferably from the lesser-used or right mouse button (e.g., Windows' WM_RBUTTONDOWN). In this manner, the user associates object actions with left button signals and object inspection with right button signals.

2. Exemplary Embodiments

Figure 5A:
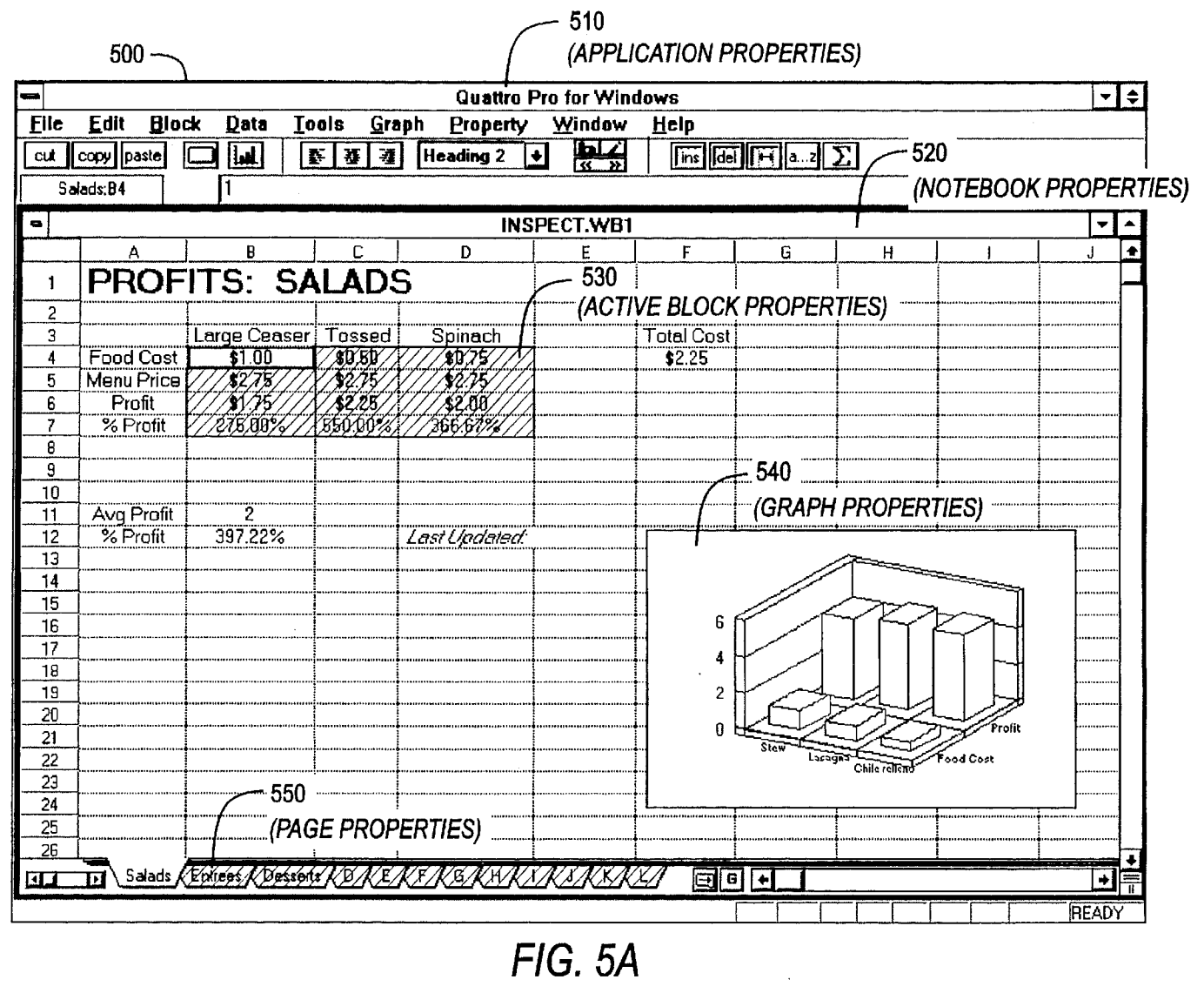
Figure 5B:
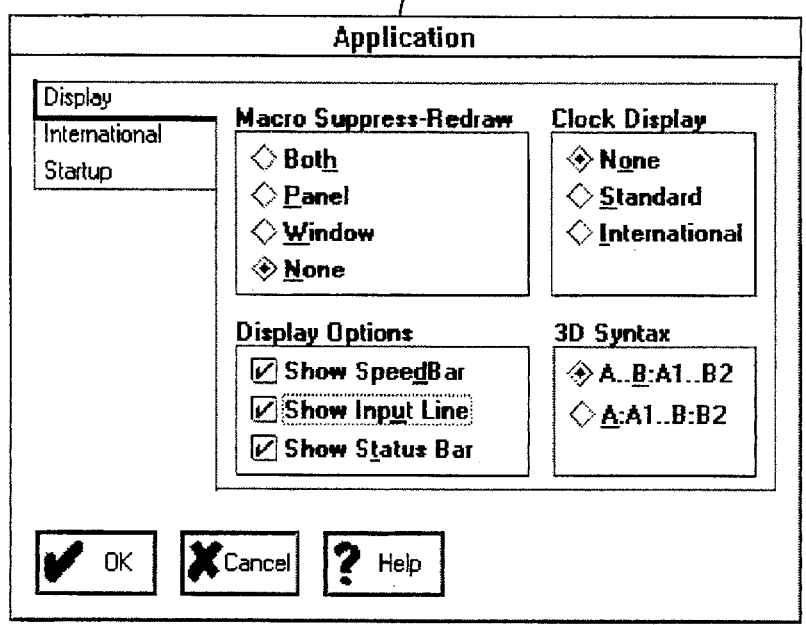
FIGS. 5B–E are bitmaps illustrating property inspectors of the present invention, for the objects of FIG. 5A.
Figure 5C:
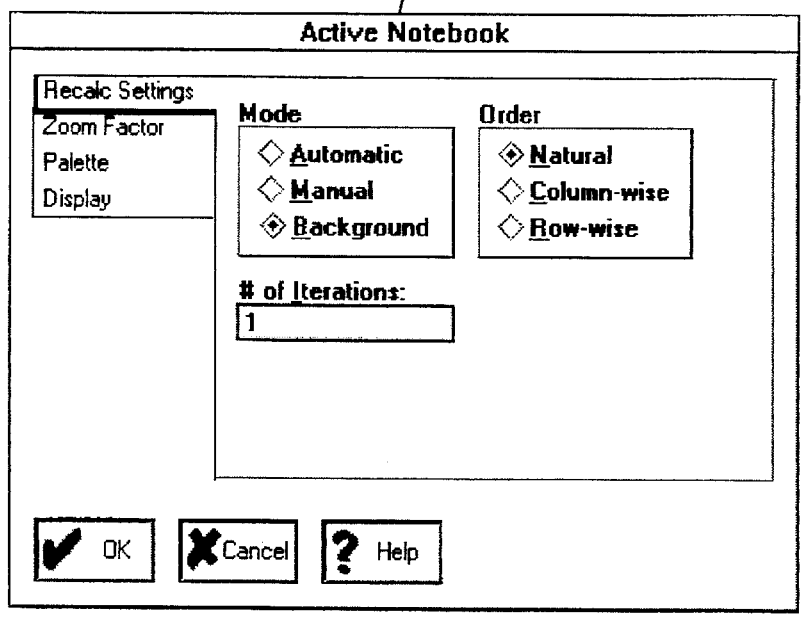

Referring now to FIGS. 5A–E, the inspecting and setting of object properties, in accordance with the present invention, is illustrated. In FIG. 5A, a notebook application window 500 is shown. Window 500 includes a variety of objects which may be inspected by the property inspector of the present invention. The top-most object is the application itself: application object 510. By selecting the application object (e.g., by right mouse clicking on the application title bar), various properties for the application may be inspected and set. As shown in FIG. 5B, inspection of the application object 510 invokes application inspector 515, which lists the various properties of the application object; the user may now inspect and set the properties of the object, as desired.

Referring back to FIG. 5A, the next level which may be inspected is the notebook object 520. User inspection of this object, e.g., by right mouse clicking on the notebook title bar, invokes the active notebook property inspector 525 of FIG. 5C. In a manner similar to the application property inspector, the notebook property inspector 525 includes all the properties and corresponding options which may be set for the notebook 520.

Figure 5D:
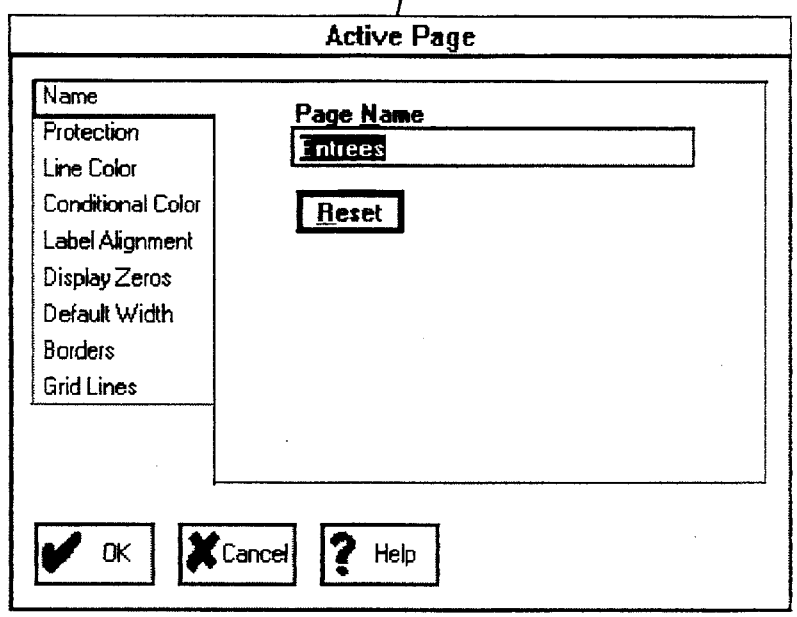

Notebook object 520 includes a plurality of page objects, which may themselves be inspected. To inspect the page object 550, for example, the user brings the page tab into view (if it is not already displayed), then right clicks the tab page. This action invokes the active page property inspector 535, as shown in FIG. 5D. With access to page properties, the user can control the page name, overall page protection, line color, colors in cells that meet certain conditions, default label alignment, whether zeroes are displayed, default column width, row and column borders, gridline display, and the like. To assign a more descriptive name to a page, for example, its tab is inspected and the option "NAME" is selected from the page property inspector (or, as shown, it is selected by default). After the user enters a new name, the new name appears on the page tab. Other page properties, most of which affect the appearance of data or screen elements, may be set in a similar manner.

Figure 5E:
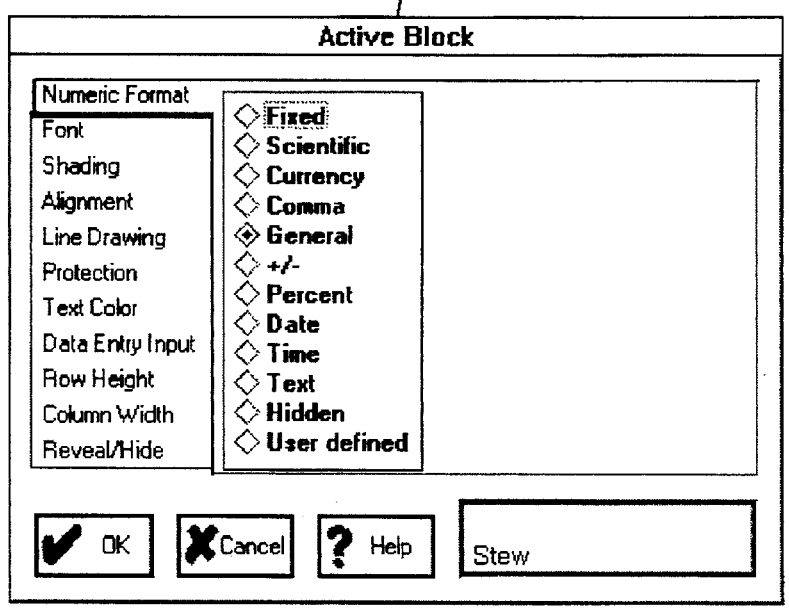
Figure 6A:
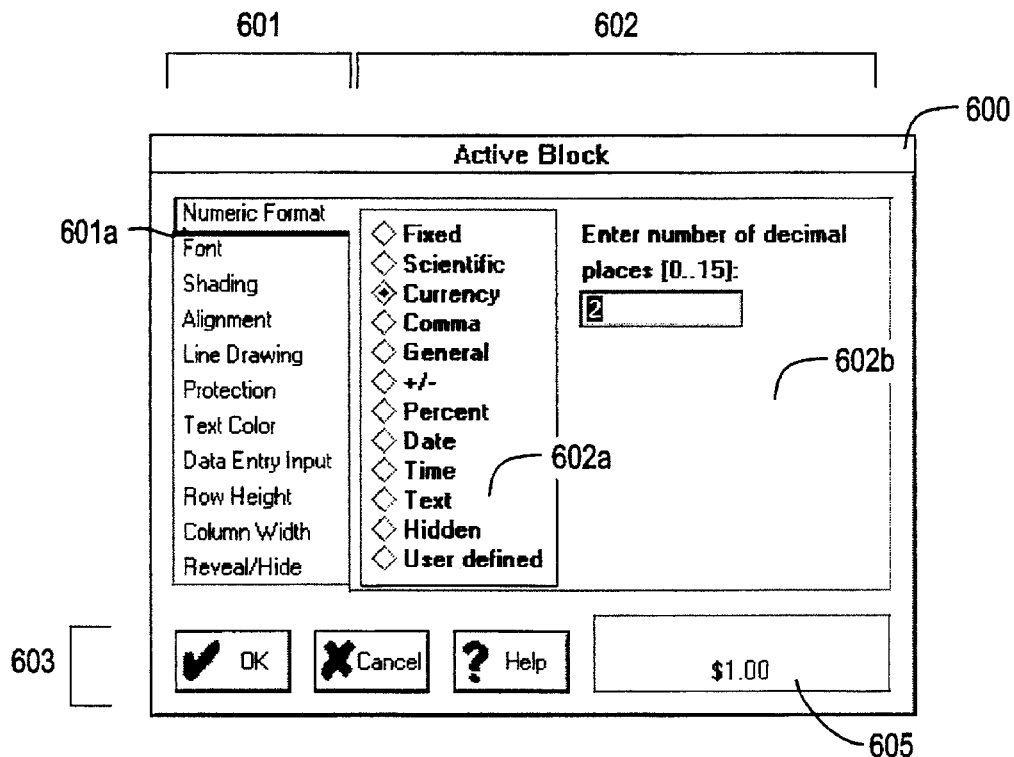
FIGS. 6A–K are bitmaps illustrating different states (and accompanying panes) for the property inspector of FIG. 5E, each state depending on a particular property of the object being inspected.
Figure 6B:
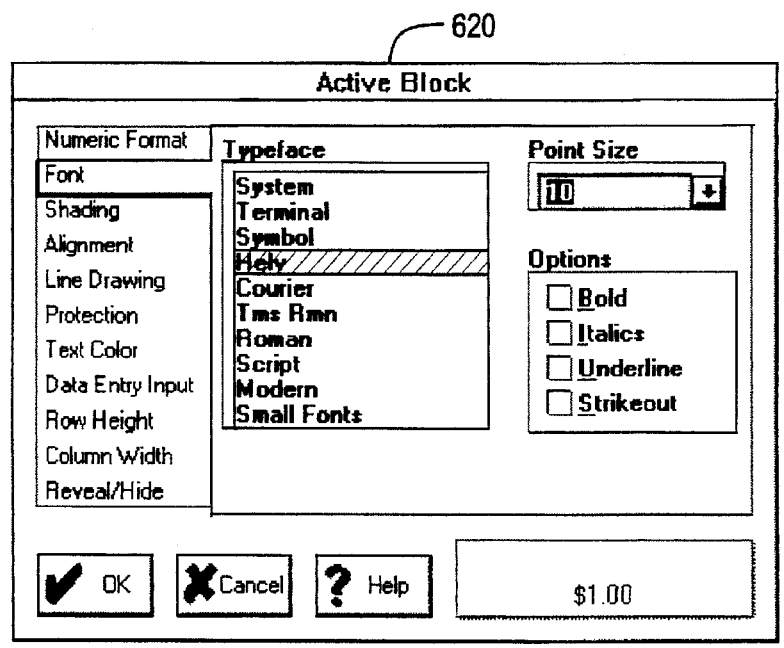
Figure 6C:
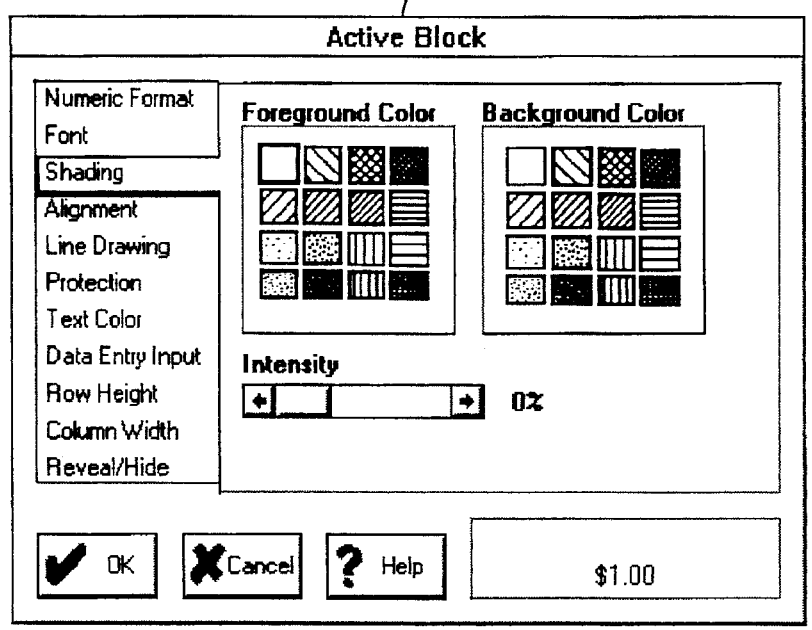
Figure 6D:
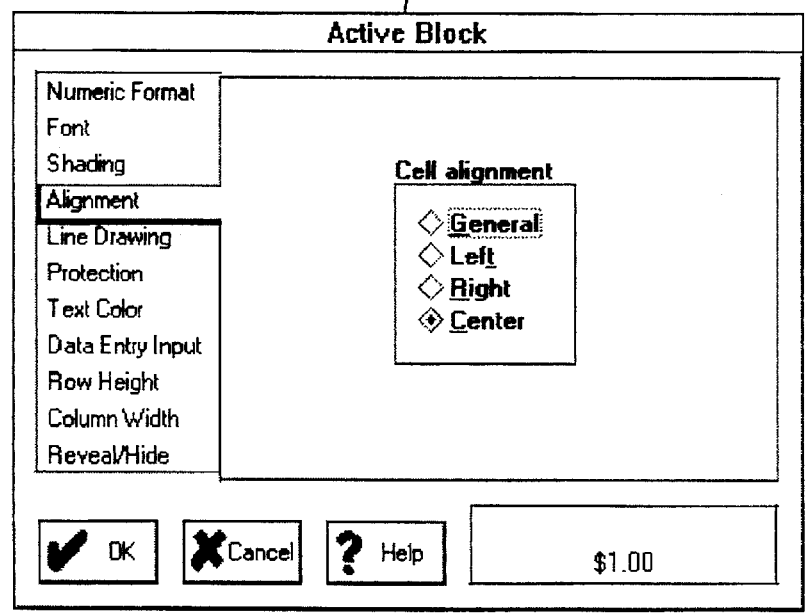
Figure 6E:
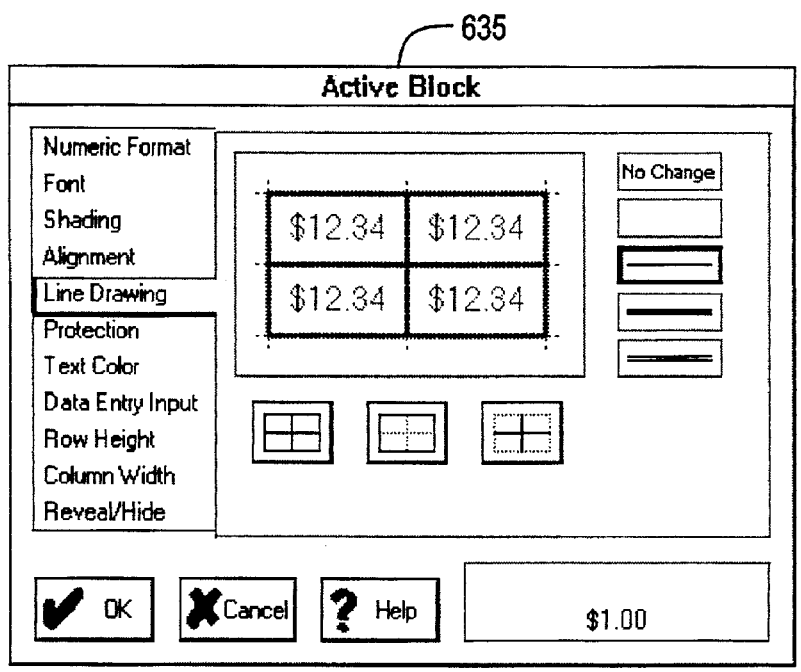
Figure 6F:
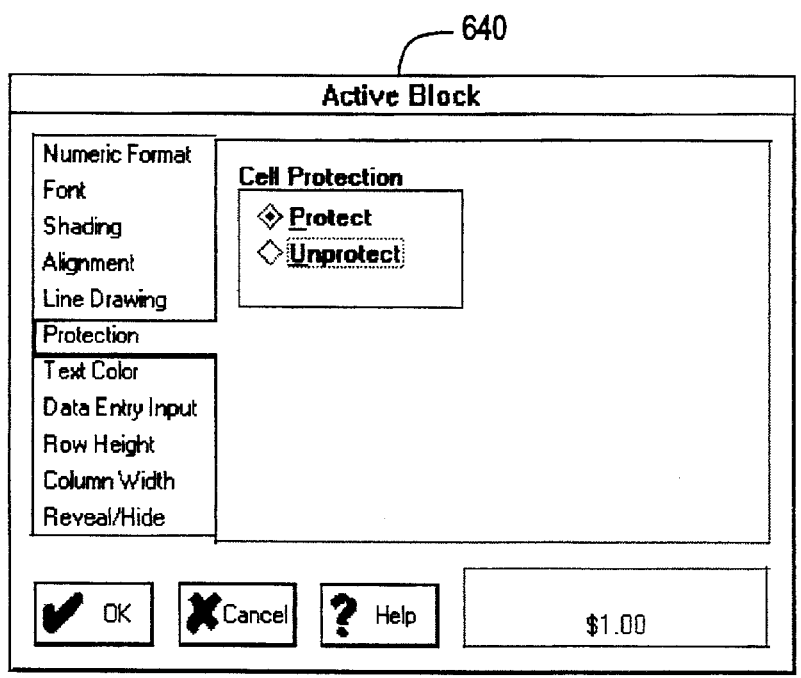
Figure 6G:
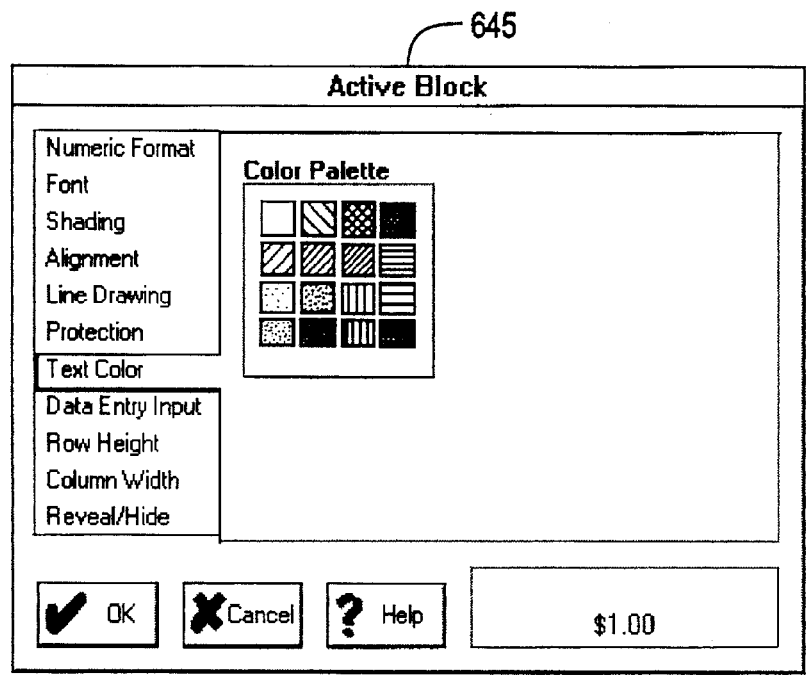
Figure 6H:
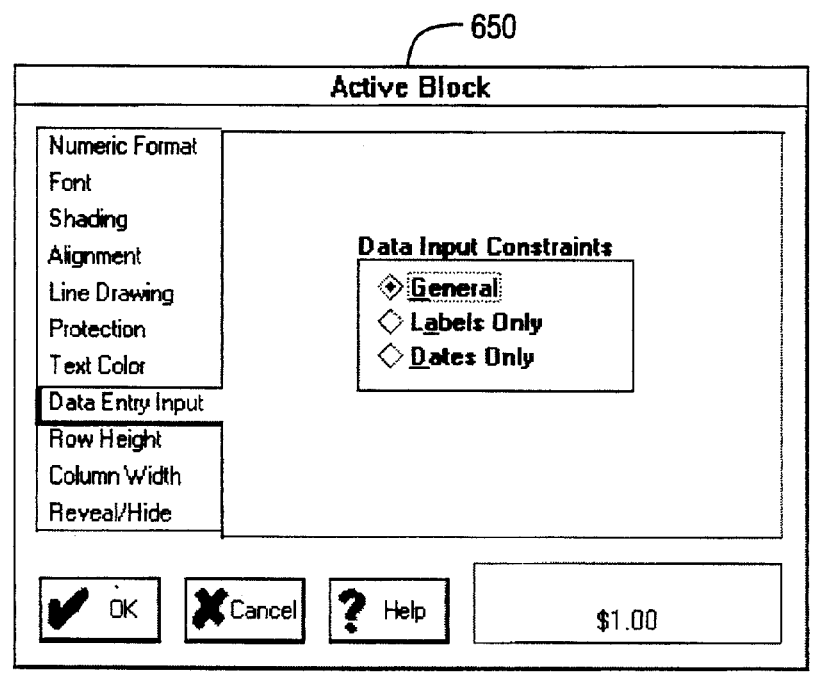
Figure 6I:
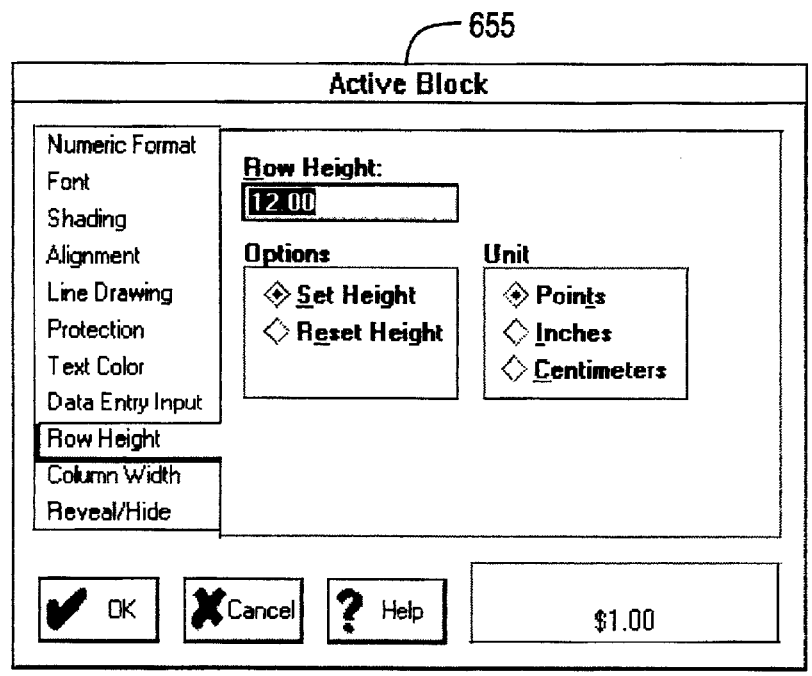
Figure 6J:
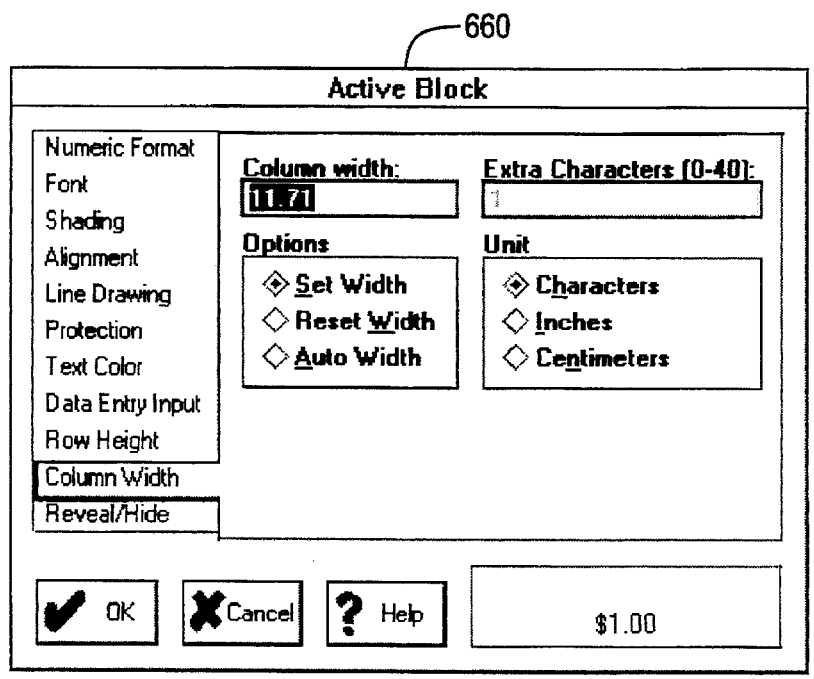
Figure 6K:
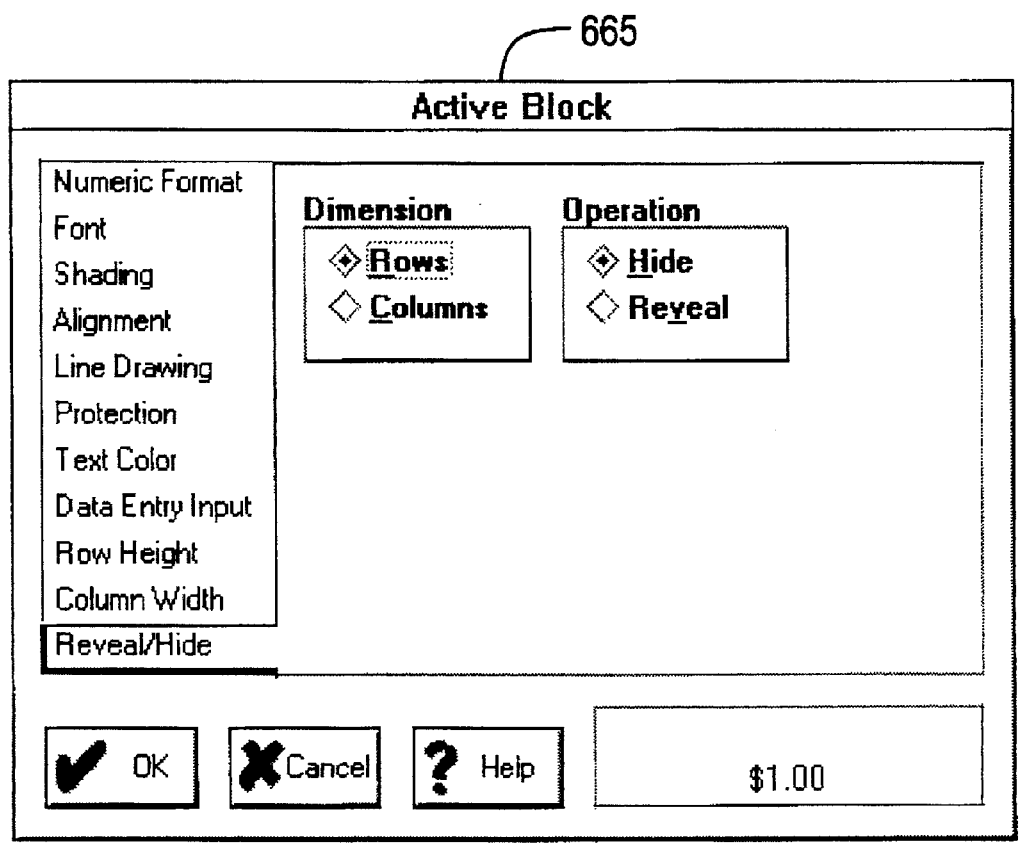
Figure 7A:
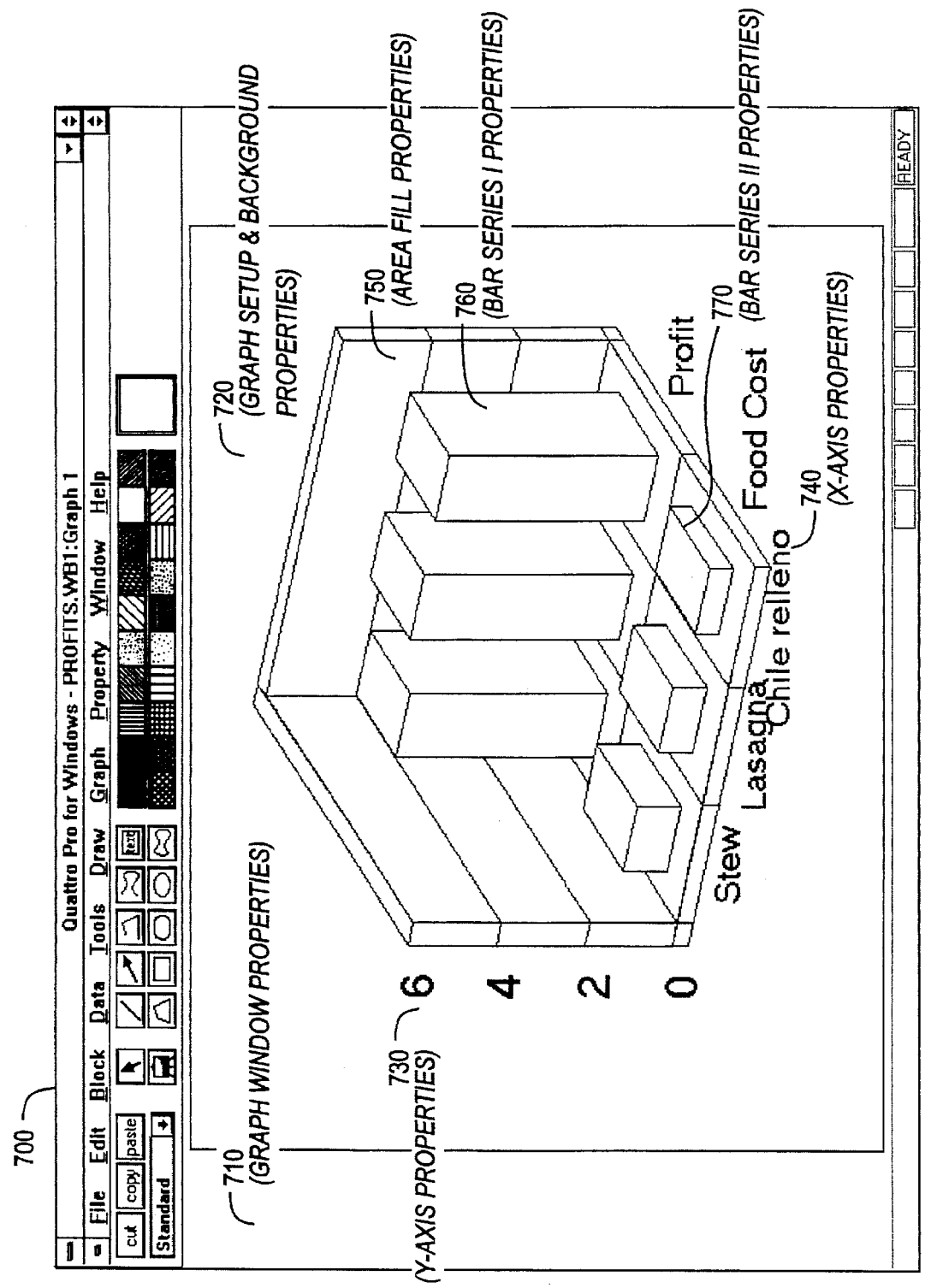
FIG. 7A is a screen bitmap illustrating a graph window of the present invention, with different graph objects available for property inspection.
Figure 7B:
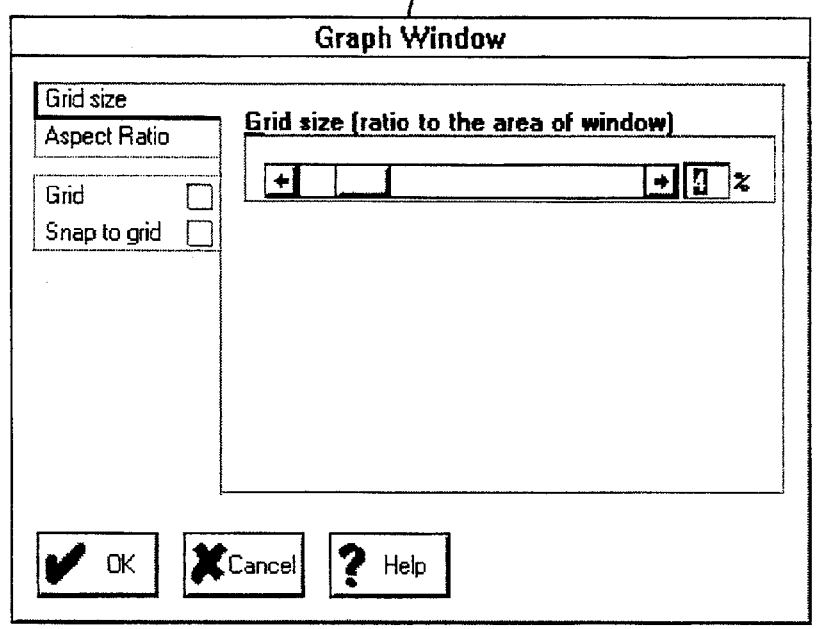
FIGS. 7B–H are bitmaps illustrating exemplary property inspectors of the present invention for the graph objects of FIG. 7A.
Figure 7C:
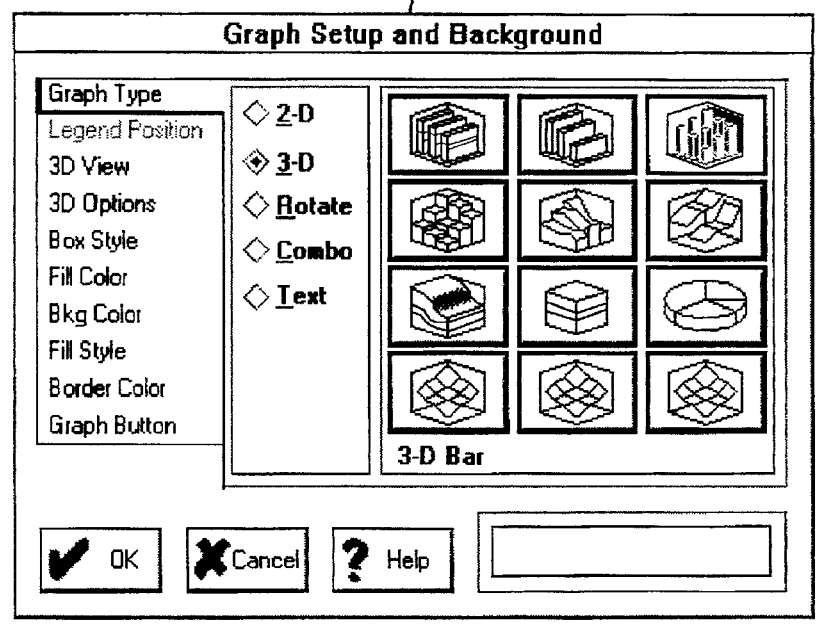
Figure 7D:
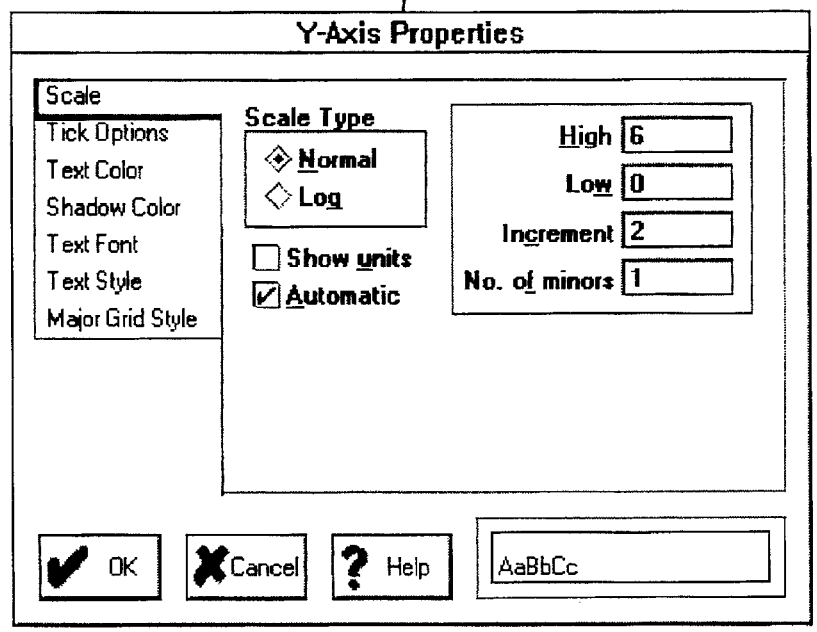
Figure 7E:
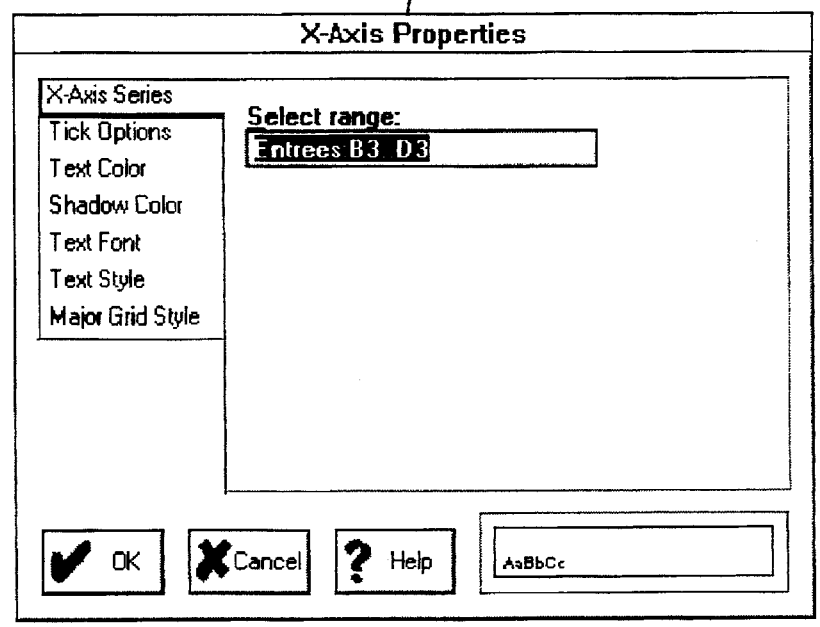
Figure 7F:
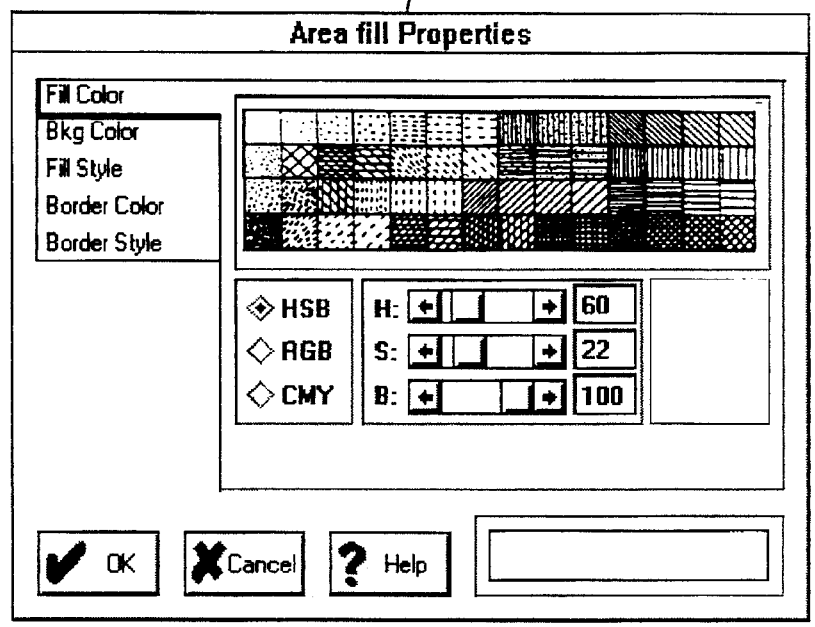
Figure 7G:
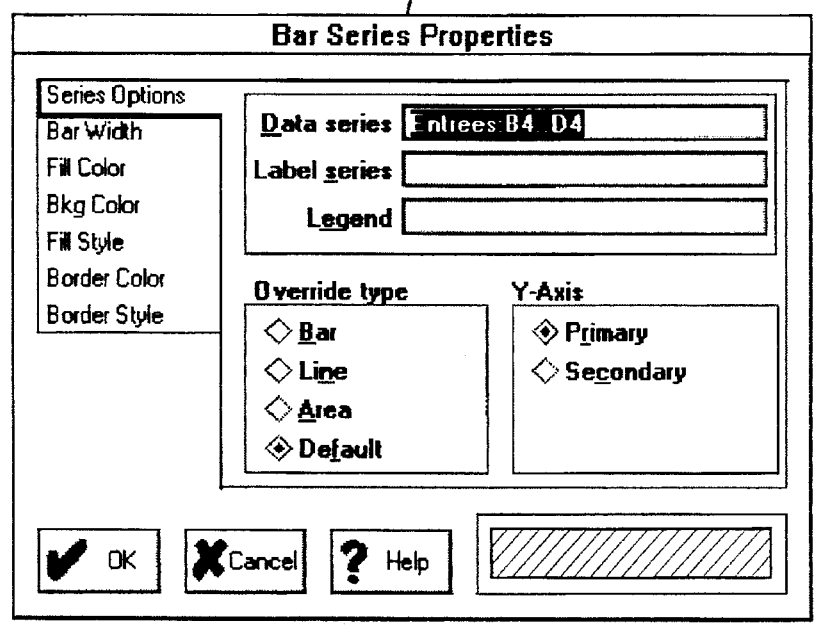
Figure 7H:
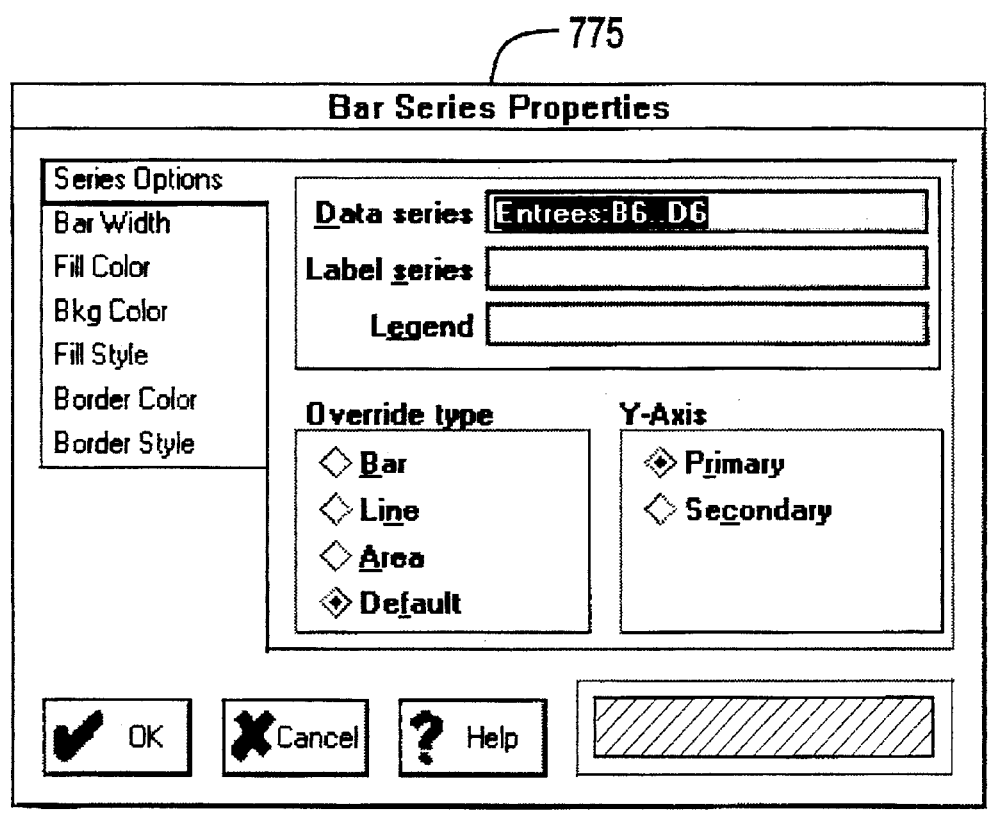

Each page object may also contain other objects, including cell, blocks of cells, graph objects, and the like, each of which may be inspected. By right clicking the active block 530, the active block property inspector 545 is opened as shown in FIG. 5E. With block properties, the user can change alignment of entries, numeric format of values, block protection, line drawing, shading, font, text color, types of data allowed in a cell, row height, column width, and whether columns or rows are revealed or hidden; inspection of a single cell occurs in a similar manner (i.e., active block is one cell). In this manner, the user may select block properties which affect the appearance of cell entries or of rows or columns; additionally, properties which affect the way data can be entered into blocks, such as protection and data entry input, may be made.

Upon invocation of property inspection, a dialog box or property inspector is displayed, preferably at or near the object of interest. A different property inspector appears depending on the type of object which is inspected. At this point, the user may then select the property that he or she wishes to change from a list of object properties. The contents of the right side of the inspector (i.e., a "pane" within the inspector) change to correspond to the property one chooses, as shown. Then, the user chooses settings for the current property. If desired, the user can then choose and set other properties for the current object. In a preferred embodiment, the property inspector includes an example box, which shows the display result of the property the user has just set, before they are applied to the actual object.

Referring now to FIGS. 6A–K, the construction and operation of a property inspector dialog box, in accordance with the present invention, is described. For purposes of illustration, the following description will present active block property inspector 600; other inspector dialogs may be implemented in a similar fashion. Shown in FIG. 6A, the active block property inspector 600 includes an object property list 601 and property settings pane 602. For an active block, for example, relevant properties include Numeric Format, Font, Shading, Alignment, Line Drawing, Protection, Text Color, Data Entry input, Row Height, Column Width, and Reveal/Hide. Property settings pane 602 include the valid options or settings which a property may take. For the property of numeric format, for example, valid settings include fixed, scientific, currency, and the like. Property setting pane 602 may further include subproperties. For example, the currency setting 602a shown may also include a decimal place setting 602b. In this manner, property inspector dialog 600 presents a notebook dialog: property list 601 serves as notebook tabs (e.g., dialog tab 601a) and property settings panes 602 serves as different pages of the notebook dialog. Thus, the user may access numerous dialog options with the efficiency of a notebook.

Also shown, property inspector dialog 600 also includes an example window 605 and dialog controls 603. As new properties are selected and set, their net effect is shown. The example element in example window 605, for example, shows the effect of selecting a numeric format of currency with two decimal places. Thus, the user may experiment with changes before they are applied to the data object. After desired property changes are entered, control components 603 are invoked to either accept ("OK button") or reject ("CANCEL button") the new property settings; if desired, help may be requested.

As shown in FIGS. 6B–K, other properties of a cell block are accessed by selecting the desired property from the property list 601. Thus the active blocks property inspector 600 changes to inspector 620 for font properties, inspector 625 for shading properties, inspector 630 for alignment properties, inspector 635 for line drawing properties, inspector 640 for cell protection properties, inspector 645 for text color properties, inspector 650 for data entry input properties, inspector 655 for row height properties, inspector 660 for column width properties, and inspector 665 for reveal/hide properties. In each instance, a new pane (i.e., one having the attributes of interest) is displayed in the inspector window.

Referring now to FIGS. 7A–H, the inspection (and setting) of properties for graphs is illustrated. Graph window

700 includes a plurality of graph objects, each of which may be customized through use of a corresponding property inspector of the present invention. To display a corresponding property inspector, the user invokes the inspector (e.g., right-clicks) for the part (object) of the graph he or she wishes to change. A right-click on the graph window object 710, for example, will invoke the graph window inspector 715; at this point, the user may inspect and set various properties of the graph window object. In a similar manner, other objects of the graph window may be inspected. For example, inspection of graph background 720 invokes inspector 725, Y-axis object 730 invokes inspector 735, X-axis 740 invokes inspector 745, area fill object 750 invokes inspector 755, bar series object 760 invokes inspector 765, and bar series object 770 invokes inspector 775.

Internal Operations

A. Introduction

Internal operations of the system 100 will now be described in detail. In general, operation is driven by methods of the present invention, which are invoked by Windows' message dispatcher in response to system or user events. The general mechanism for dispatching messages in an event-based system, such as Windows, is known in the art; see, e.g., Petzold, C., *Programming Windows*, Second Edition, Microsoft Press, 1990. Additional information can be found in Microsoft's Window Software Development Kit, including: 1) *Guide to Programming,* 2) *Reference, Vols. 1 and 2,* and 3) *Tools,* all available from Microsoft Corp. of Redmond, Wash. Of particular interest to the present invention are class hierarchies and methods of the present invention, which are implemented in the C++ programing language; see e.g., Ellis, M. and Stroustrup, B., *The Annotated C++ Reference Manual,* Addison-Wesley, 1990. Additional information about object-oriented programming and C++ in particular can be found in Borland's C++ 3.0: 1) *User's Guide,* 2) *Programmer's Guide,* and 3) *Library Reference,* all available from Borland International of Scotts Valley, Calif. The disclosures of each of the foregoing are hereby incorporated by reference.

B. Notebooks

Figure 8A:
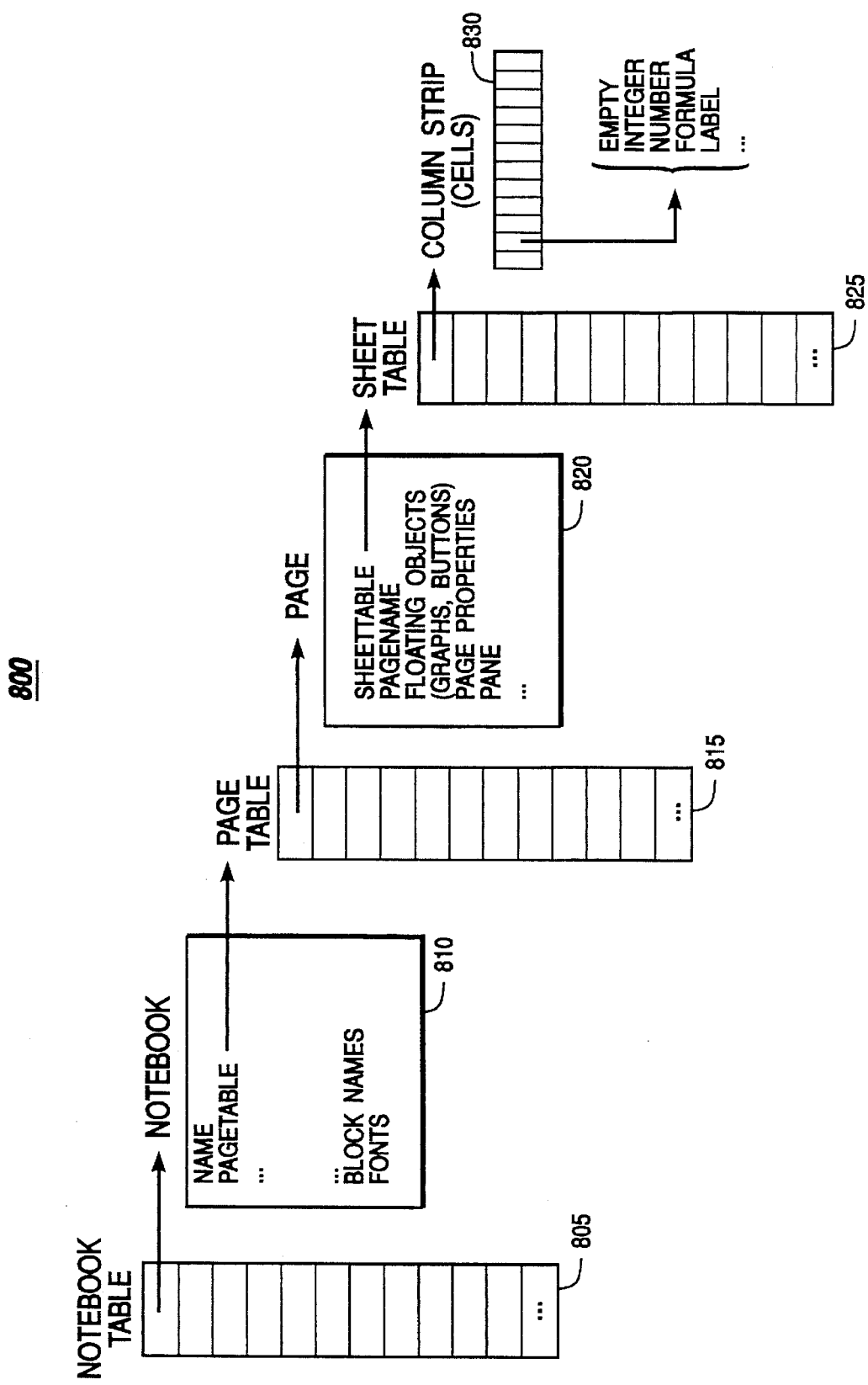
FIG. 8A is a block diagram illustrating the structure and operation of a spreadsheet notebook of the present invention.

Referring now to FIG. 8A, the internal structure and operation of spreadsheet notebooks of the present invention will be described. The spreadsheet notebook system of the present invention includes a system hierarchy 800, at the top level, having a notebook table 805 with entries or slots for accessing a plurality of notebooks. For example, the first slot addresses or points to notebook 810. In this manner, the system may track multiple notebooks.

Notebook structure 810, in turn, includes or accesses various data members for a particular notebook. For example, a "Name" field, stores the name assigned for the notebook. This name is displayed in the titlebar for the notebook and is used as the name for the corresponding disk file; the notebook name is also used to reference the notebook in formulas (e.g., contained in other notebooks). Notebook 810 also includes other data members, such as block names and fonts. Block names are text strings or labels which the user has defined for particular blocks of interest. Fonts, on the other hand, include font information (e.g., type and size) for the notebook. Other desired properties, specific to a notebook, may be included as desired. As exemplary construction of a notebook structure (class), in accordance with the present invention, is set forth hereinbelow in Appendix A.

Of particular interest in the notebook structure 810 is the Pagetable field, which includes a pointer to a page table for the notebook. Pagetable 815 includes a plurality of slots or entries for accessing individual page structures of the notebook. Each page structure, in turn, contains or accesses information of interest to an individual page. As shown, for example, page 820 (pointed to by the first slot of the pagetable) includes or accesses: a sheet table (or Graphs page), a pagename, floating objects (e.g., graphs and buttons), page properties, pane, and the like.

The Sheettable field of the page 820 points to a sheet table 825. It, in turn, includes a plurality of the slots for accessing different column strips. As shown, for example, the first entry in the sheet table 825 accesses a column strip of cells 830. In turn, column strip 830 addresses individual information cells, each of which may have one of a variety of information types, including empty, integer, number (real), formula, label, and the like. In a preferred embodiment, column strip 830 may address up to 8,000 cells; those skilled in the art, however, will appreciate that column strip 830 may be set to any desired range (depending on the limits of one's target hardware).

Figure 8B:
FIGS. 8B–C illustrate the correspondence between a page table data structure and pages which are displayed on the screen to the user.
Figure 8B:
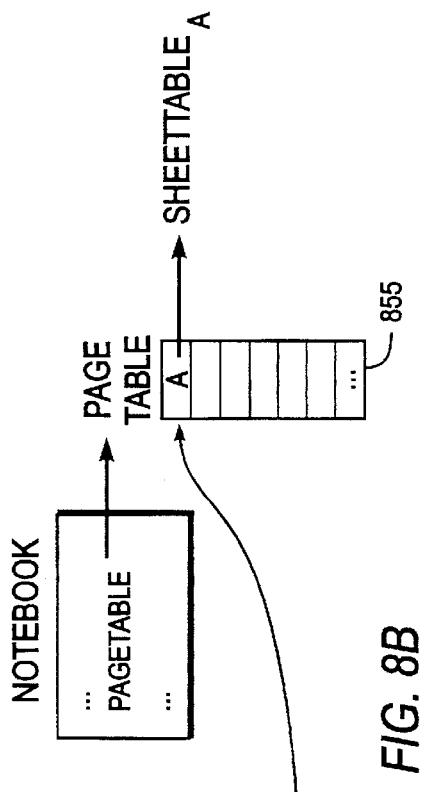
Figure 8C:
Figure 8C:
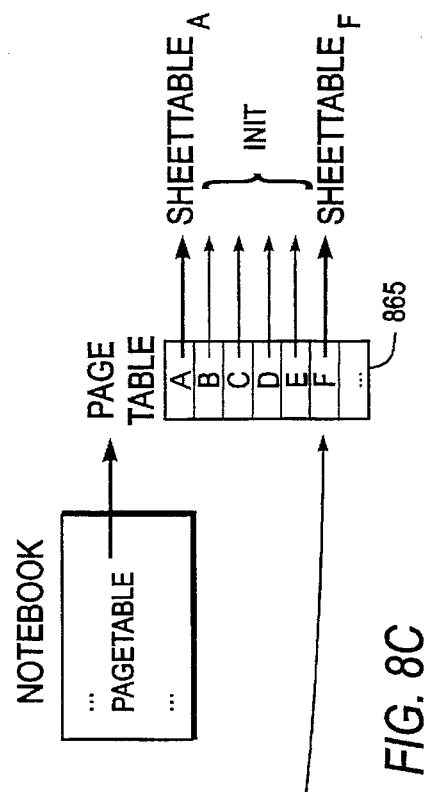

Referring now to FIGS. 8B–C, the function of the page table of the present invention is illustrated. In FIG. 8B, two images are presented: a view image and a data image. The view image illustrates what the user sees on the screen 106; at startup, for example, only a single Page A (page 850) is active. As shown by the corresponding data image supporting this view image, pagetable 855 includes only a single reference, page A. In turn, page A references sheettable$_A$, which supports the information cells required (e.g., they are currently needed for display) for the page. Thus, at startup, only a single page entry exists in the pagetable 855, even though the screen displays multiple page tabs.

Upon selection of Page F (e.g., by clicking tab F 860), the data image changes, however. As shown in FIG. 8C, remaining Pages B–F are initialized into the page table 865. In this example, Page F must now exist as a view object. Thus, Page F references supporting data structures (e.g., sheettable$_F$). The intervening Pages (B–E), on the other hand, are initialized, but only to the extent that they can serve as place holders in the pagetable 865. In this manner, the underlying page table for a notebook instantiates underlying page data structures only as needed (e.g., for viewing or referencing by other pages), but, at the same time, provides on-demand access to pages.

A particular advantage of this design is the ease in which information may be referenced and presented. Even complex data models, such as those spanning multiple dimensions, may be represented in a clear fashion. Moreover, a syntax is provided by the present invention for intuitively referencing information.

Referring now to FIGS. 8D–F, the referencing of information in a spreadsheet notebook of the present invention is now described. Shown in FIG. 8D, a three-dimensional reference (i.e., identifier for a solid block of information cells) includes a notebook, starting page, ending page, starting cell and ending cell. As shown, the notebook (which is the same as the file name) is identified preferably by delimiters, such as brackets ([]). This is followed by page name(s), which may in fact be grouped. As shown, a range of pages has been defined from '89 Income to '92 Income; these are alias names which may correspond to pages A–D, for example.

Next, one or more cells of interest are identified. For example, a range from January to ( ... ) December is shown, which serve as aliases for blocks A1 to A12, for example. The block or cell information is separated from group or page information, for example, by a colon (:) identifier.

The hierarchy of this nomenclature is shown in FIG. 8E. Specifically, a notebook references pages, which may be members of one or more user-defined groups. In turn, a page references cells, which may alternatively be referenced by alias identifiers. As shown in FIG. 8F, page and cell identifiers may be grouped to form even more succinct references. For example, Pages '89 Income to '92 Income may be renamed as Four-Year Income. Similarly, the cell range from January to December may be renamed Entire Year. In this manner, information ranges in the spreadsheet notebook of the present invention are easily named and easily visualized by the user.

Depending on the context of the system, certain identifiers may be assumed and, thus, eliminated from a reference. Unless otherwise specified, for example, the notebook identifier is assumed to be the currently active notebook. Similarly, the page identifier may be assumed to be the currently active page, unless the user specifies otherwise. Thus, a valid reference need only include as much information (identifiers) as is necessary to access the desired information.

Figure 9A:
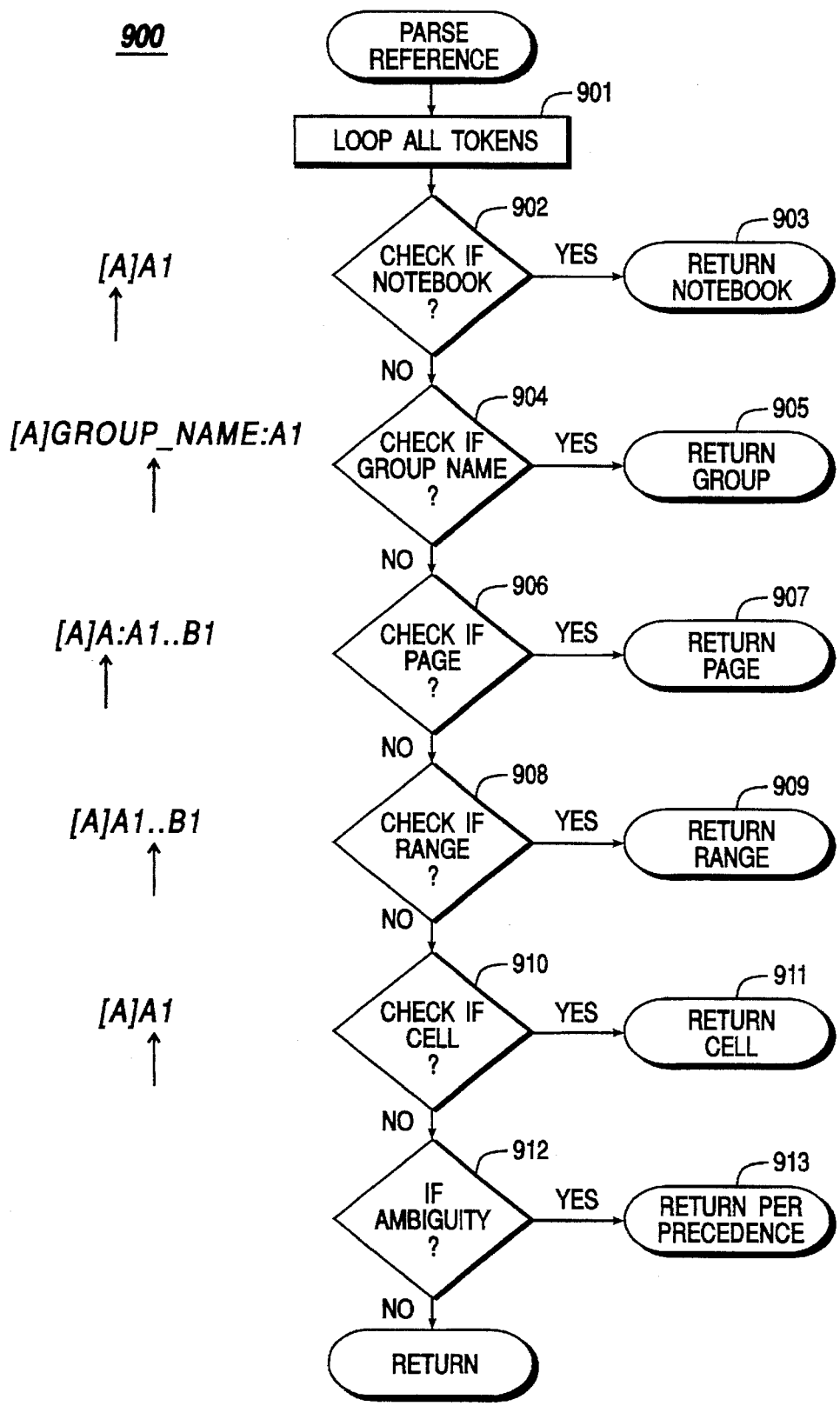
FIG. 9A is a flowchart illustrating a method of the present invention for interpreting information references.

Referring now to FIG. 9A, a method for interpreting or parsing an information reference, in accordance with the present invention, is shown. Upon receiving a reference (e.g., text string) to information in a spreadsheet notebook, the method proceeds as follows. In step 901, a loop is established to tokenize (i.e., parse) the string into individual identifiers, which may then be processed. Each token is examined as follows. In step 902, the token is checked to determine whether it is a notebook identifier. In a preferred method, a notebook identifier is delimited, for example, by bracket symbols; alternatively, a notebook identifier may be realized simply by the position of the identifier relative to other tokens in the string, or by its relationship to disk (notebook) files on mass storage 107. If the notebook is successfully identified, the notebook identifier is returned at step 903, and the method loops back to step 901 for any additional tokens.

If it is not a notebook (no at step 902), however, then in step 904 the token is examined to determine whether it is a group name. Group names may be determined by accessing group names listed for the notebook (e.g., by accessing a group name string pointer from notebook structure 810), and/or by the token's context (e.g., preceding a ":" delimiter). If a group name is identified, it is returned at step 905, and the method loops for any remaining tokens. Otherwise (no at step 904), the token is examined to determine whether it is a page. In a manner similar to that for checking group names, a page may be identified by examining a notebook's page table, with corresponding page name accessed (dereferenced). The page is returned at step 907, with the method looping back to step 901 for remaining tokens.

If a page is not found (no at step 906), however, then at step 908 the token is examined to determine whether it defines a range. A range may include a named block of cells (e.g., "entire year") or, simply, two cell addresses separated by an appropriate identifier (e.g., A1 ... B1). If a range is found, then it is returned in step 909, with the method looping for any remaining tokens. Otherwise (no at step 908), the identifier is examined to determine whether it is a cell. A token may be identified as a cell if it is of the appropriate column/row format (e.g., A1). If a cell is found, it is returned at step 911, with the method looping for any remaining tokens.

As shown (conceptually) at step 912, if any ambiguities remain, they may be resolved according to an order of precedence; for example, notebook>groupname>page and the like. At the conclusion of the method, a reference, if it is in proper form, will be successfully identified and may now be processed according to three-dimensional techniques.

Figure 9B:
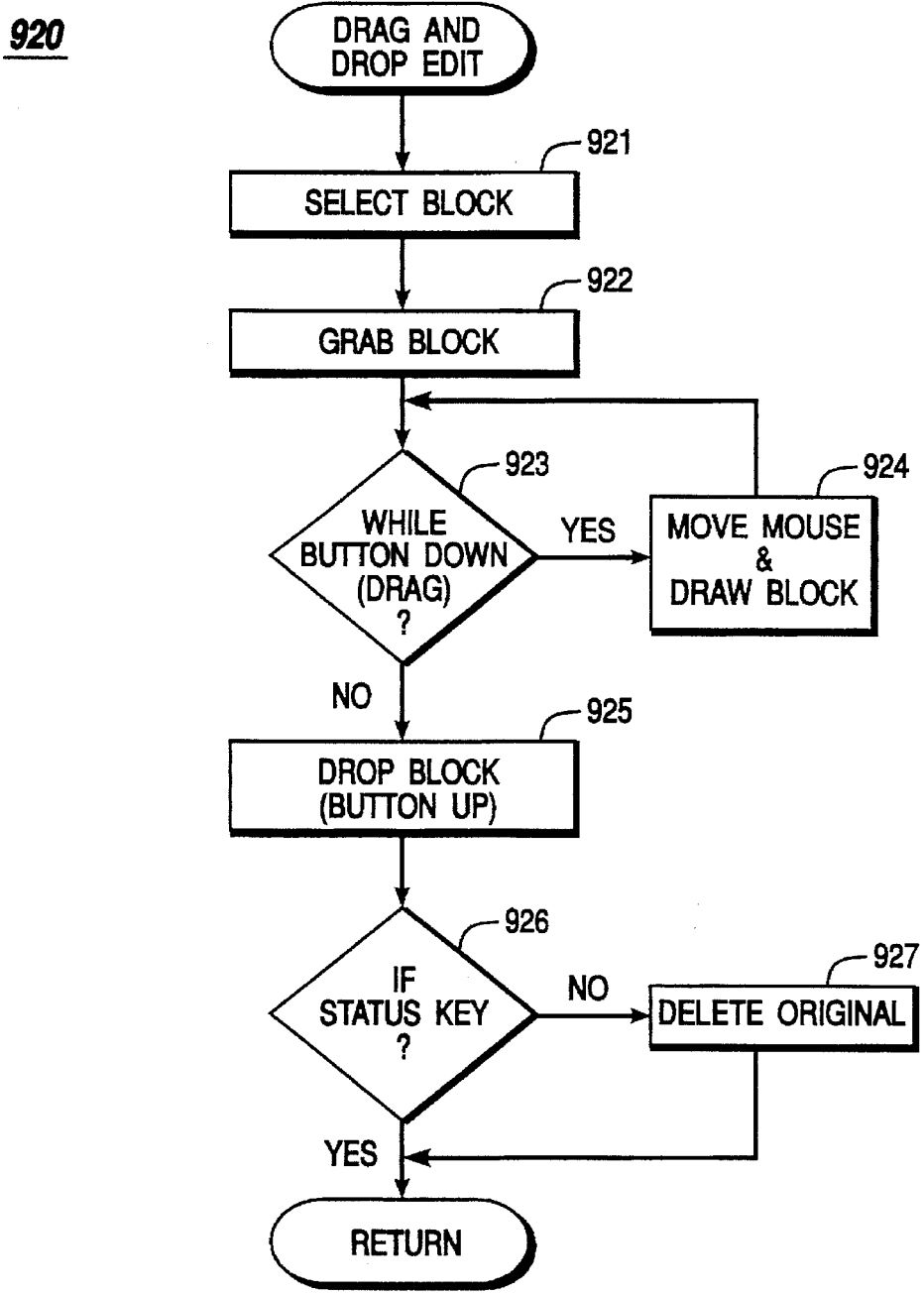
FIG. 9B is a flowchart illustrating a method of the present invention for drag and drop editing.
Figure 9C:
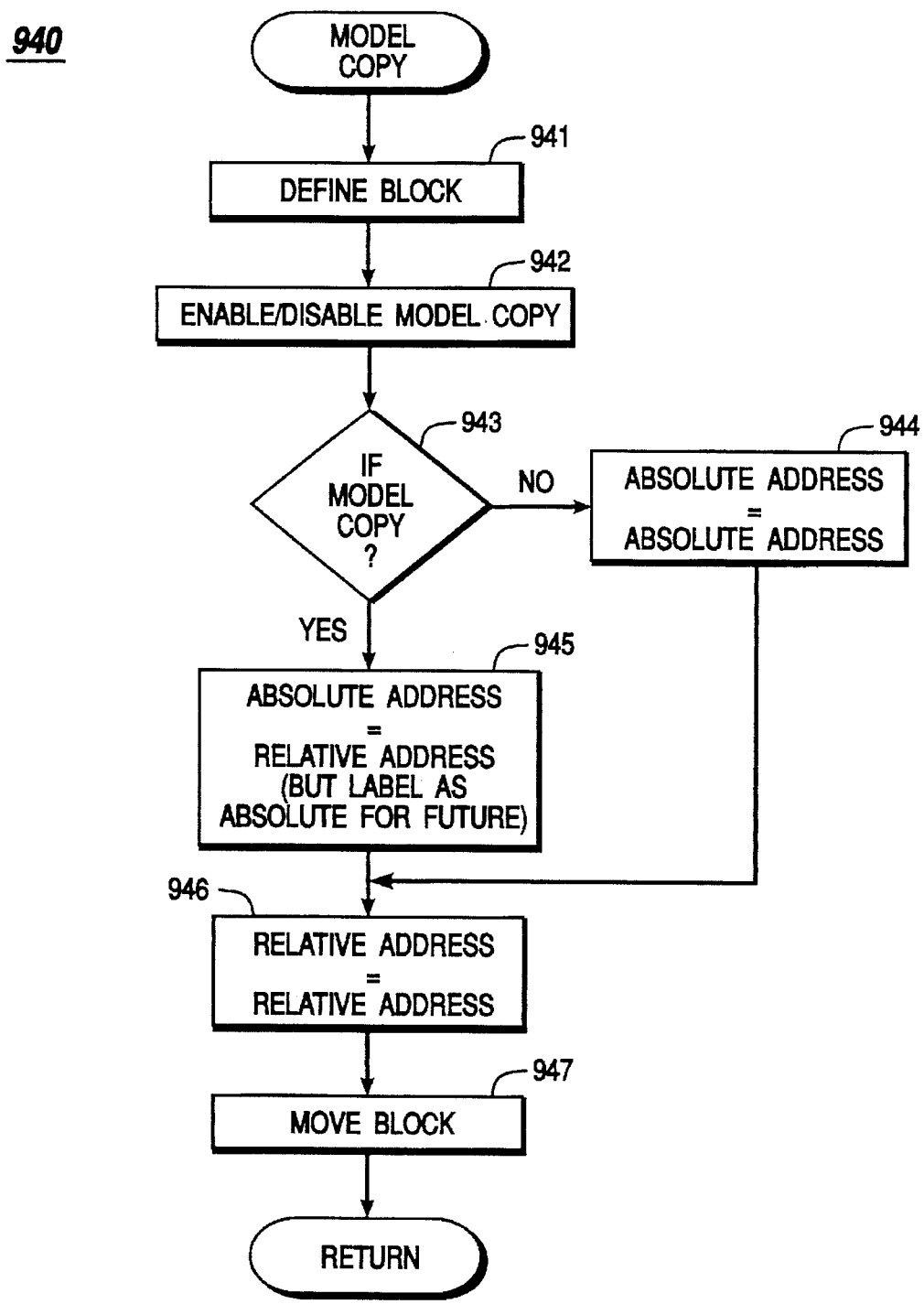
FIG. 9C is a flowchart illustrating a method of the present invention for model copying.

Referring now to FIGS. 9B–C, other methods of the present invention are illustrated. In FIG. 9B, for example, a drag-and-drop edit method 920 of the present invention is shown. Its steps are as follows. In step 901, a block of cells is defined (e.g., by dragging a mouse cursor from one corner of the block to another). After a block has been selected, it is next grabbed with the mouse cursor (i.e., position the mouse cursor within the block and depress a mouse button). In steps 923 and 924, a loop is established to "drag" the block to a new location. In particular, while the mouse button is depressed, any movement of the mouse will cause the block to follow (animated on screen, e.g., by XOR technique). At step 925, the block is "dropped" into place by releasing the mouse button (button up signal). Dropping the block causes information from the source location to be copied into the target location. By coupling the method with a status key (e.g., SHIFT- or CTRL-), the technique supports either "cut" (erase original) or "copy" (leave original) modes of operation. Thus, for example, if a status key is not active as step 926, then in step 927 the original (at the source location) is deleted. Otherwise (yes at step 926), the original remains at the source location as well.

Referring now to FIG. 9C, a model copy method 940 of the present invention is illustrated. In step 941, a block is defined or selected (e.g., dragging a selection). In step 942, model copy is enabled or disabled (as desired); alternatively, model copy may be enabled by default. In step 943 if model copy has been enabled, then in step 945 absolute address references are copied as if they were relative address references, as previously described (with reference to FIGS. 4H–J). However, the address labels will remain absolute, so that they will be treated as absolute for future copying operations. Otherwise (no at step 943), absolute addresses are treated conventionally (i.e., referencing absolute addresses) in step 944. As shown in step 946, relative addresses are not affected, i.e., they continue to be treated relatively. In step 947, the copy operation is performed, employing the addresses as just determined, after which the method concludes.

Additional methods of the present invention are set forth hereinbelow in Appendix A.

C. Property Inspection

Figure 10A:
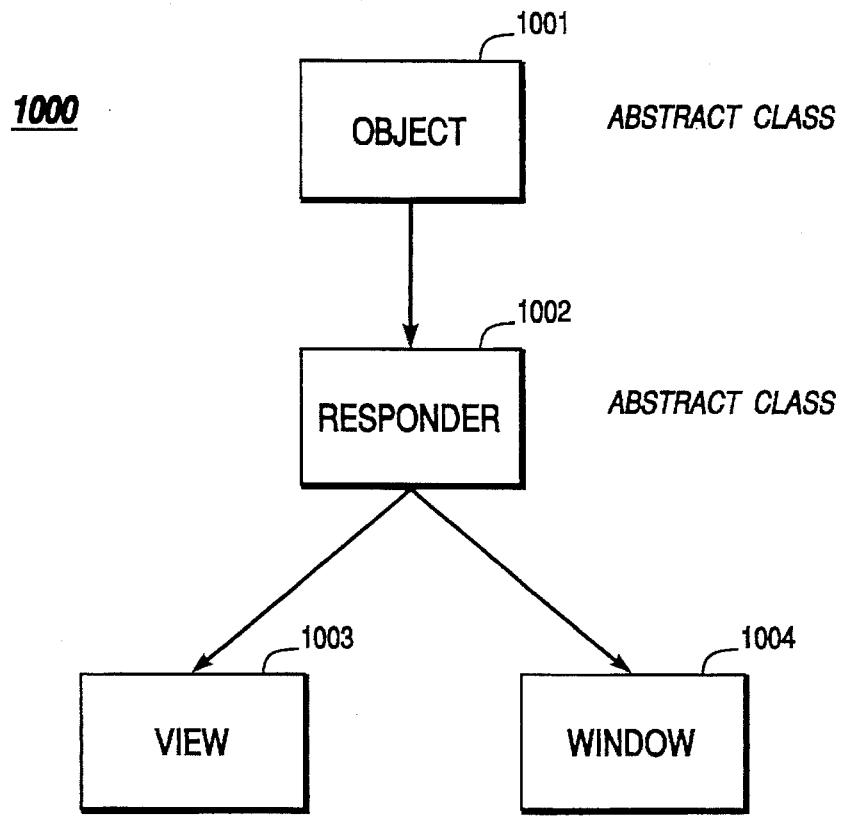
FIG. 10A is a block diagram illustrating a system class hierarchy of the present invention, which is employed for property inspection.
Figure 10B:
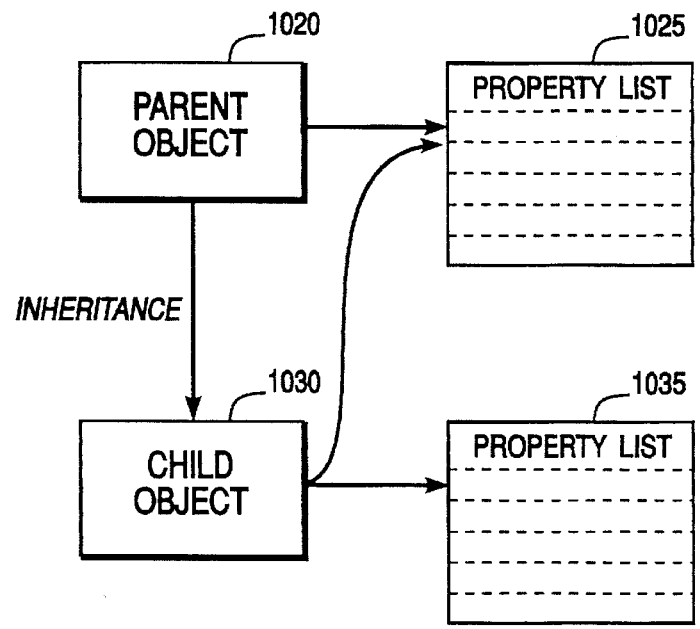
FIG. 10B is a block diagram illustrating the correspondence between a parent object and a child object, and their respective property lists.
Figure 10C:
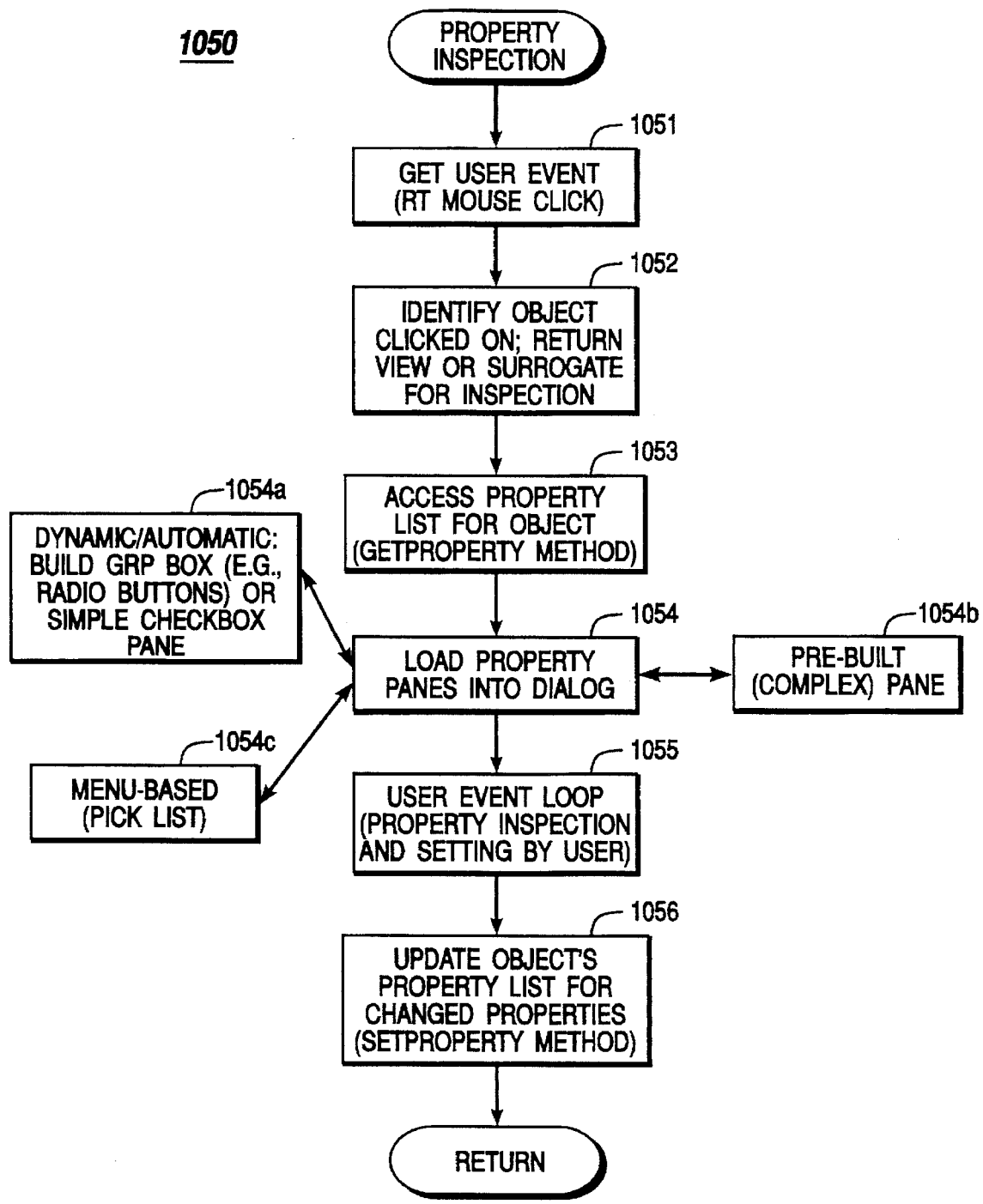
FIG. 10C is a flowchart illustrating a method for inspecting and setting properties of objects, in accordance with the present invention.

Referring now to FIGS. 10A–C, construction and operation of property inspection in accordance with the principles of the present invention will be described. As shown in FIG. 10A, user interface (UI) objects are constructed from a UI object class hierarchy 1000. As shown, class hierarchy 1000 includes as its base class an object class 1001. From object class 1001, a responder class 1002 is derived. As the child of class 1001, responder class 1002 inherits all properties of its parent and adds event handling capability. Both object class 1001 and responder class 1002 are abstract classes, i.e., objects are not instantiated from them directly. From responder class 1002, two child classes are derived: view class 1003 and window class 1004. From view class 1003, all screen objects (e.g., text, graphs, scrollbars, and the like) are created. From window class 1004, container objects are instantiated; in particular, window class 1004 provides container objects which hold the various view objects.

Associated with each class (and thus objects derived from each class) is a ClassInfo structure. ClassInfo, which is itself implemented as a separate class, contains information about a corresponding class and, thus, objects of that class. For example, it contains information about object type, name, number of properties, and the like. Of particular relevance to property inspection are two data members: a pointer to the parent and a property record pointer which points to an array of property records for an object of interest.

Referring now to FIG. 10B, the relationship between parent and child (and hence the importance of the pointer to the parent) is illustrated. In the system of the present invention, an object-oriented mechanism is employed whereby new objects may be created from existing objects (classes). As shown, for example, a child object 1030 may be derived from a parent object 1020. Also shown, each object has its own property record array or list. For example, the parent object 1020 has a property list 1025 describing its properties. Child object 1030, in turn, also has its own property list 1035; child object 1030 still inherits from parent object 1020, however. By means of the parent pointer, the child object 1030 also has direct access to its parent 1020 and, thus, the property list 1025 of the parent. In this manner, when an object is inspected, the system of the present invention may view back across the inheritance hierarchy to fetch all (ancestor) properties for the object, as needed.

The property record, on the other hand, describes an individual property for the object. The property record, which is implemented as a separate class, includes a name ID for the property and a pointer to the property object itself (which may be shared). For example, property record objects may be instantiated from the following exemplary C++ class definition:

```
class _EXPORT_ PropRecord
{
public:
    Property * pProp;      // pointer to SHARED (!) property object
    WORD    nameID;        // property name string ID
                           // (PROPSTR.HPP, PROPSTR.CPP)
    WORD    flags;         // optional information about the property
                           // ( HIDDEN, USE MENU, LINK ONLY, etc.)
    inline Property * getProp ( );
    inline LPSTR getName ( );
    inline PROPTYPE getType ( );
    inline WORD getNamesCnt ( );
    inline WORD getNameID ( );
    inline WORD getFlags ( );
}
```

The property object, in turn, includes a type ID for identifying the property and also includes a pointer to a dialog for the property. An property object may be instantiated from the following exemplary C++ class:

```
class _EXPORT_ Property
{
public:
    static DWORD dwPropErr;
    static char far conversionBuffer [MAXPROPSTR];
    PROPTYPE typeID;
    WORD namesCnt;
    LPSTR pDialog;
    Property ( WORD id );
    virtual BOOL stringToValue ( LPSTR, PROPTYPE pt = 0 );
    virtual BOOL valueToString ( LPSTR, PROPTYPE pt = 0 );
/*
Convert the passed binary value to string using the conversionBuffer
*/
    LPSTR convertToString ( LPSTR pS, PROPTYPE pt );
/*
Convert the string in conversionBuffer to binary value pointed by pS
*/
    BOOL convertToBinary ( LPSTR pS, PROPTYPE pt );
};
```

Exemplary property types may include:
prop_Undefined=0,
prop_Text,
prop_Bool,
prop_Window,
prop_Color,
prop_Bitmap,
prop_List,
prop_Word,
prop_Int,
prop_Key,
prop_Double,
. . .

The pointer to the property dialog (LPSTR pDialog), on the other hand, indicates the appropriate dialog to be displayed to the user for the current property; the dialog displays the appropriate information (e.g., pane) for the property which the user may then use for inspecting and setting attributes of that property.

Referring now to FIG. 10C, a method 1050 for property inspection, in accordance with the present invention, is illustrated; additional disclosure is provided for the inspection of an exemplary object: a spreadsheet cell. In step 1051, the user indicates that he or she desires property inspection for an object. In a preferred method of the invention, the user will right-mouse click on the object of interest (as set forth hereinabove). To inspect a spreadsheet cell, for example, the user would position the mouse cursor over the cell and click the right mouse button. In this instance, the notebook which contains that cell will receive (i.e., will be the recipient of) a right-mouse button down message. The event will be processed by routing the message to a RightMouseDown method.

In step 1052, the object which the user clicked on is identified by the RightMouseDown method. Specifically, the method invokes a RouteMouseEvent method which returns the current view object (i.e., the object which the user has clicked on). This is accomplished as follows. Every view object contains a StartInspect method which returns an actual object for inspection. The object which appears on the screen to the user (i.e., view object) is not necessarily the object which will be inspected. For example, it would be computationally too expensive to have each cell of a spreadsheet be its own object. Instead, the present invention embraces the notion of surrogate or imaginary objects which may be inspected (using the properties of the screen or view object selected). In most instances, the StartInspect method will return an object for inspection which is the same as the view object. In those instances where it is not feasible to inspect an object which the user perceives on a screen, however, the method returns a surrogate object whose properties assume the attributes of the screen object.

An additional example illustrates this point. When inspecting a block of cells, for example, StartInspect returns a current block object which is a surrogate object, i.e., it does not have a visible expression on the screen. Instead, it is a substitute object which assumes the characteristics necessary to allow inspection of the screen object of interest. In this manner, it functions as a surrogate for the object which the user observes on the screen. If desired, objects may also be blocked from inspection at this step (e.g., by setting flags); in which case, the method terminates. At the conclusion of step 1052, the object of interest, either actual or surrogate, is ready for inspection.

Next, the user interface for inspection is built by a DoUI method of the present invention. The method proceeds as follows. The first property record for the object is accessed in step 1053. Preferably, DoUI is a virtually defined method, with each object (class) designed to include method steps for accessing the property record according to that object's own particularities. The remaining property records for the object are also located (e.g., by traversing a list of records).

At step 1054, the dialog panes for each property are loaded (e.g., into memory 102, if not already present) for use by a compound dialog box. As previously described, the dialog associated with each property is accessible from the property record (by a pointer to the dialog). At this point, an empty property inspection window is displayed. Into the property inspection window, a corresponding pane for each property is loaded (substep 1054b), thus creating a display hierarchy. Using a getProperty method, each property is initially set to the attribute(s) contained in the retrieved property record; the getProperty method operates essentially the reverse of a setProperty method, which is described in detail hereinbelow. An associated screen button or label is provided for rapidly accessing a desired pane in the inspector window, in much the same fashion as one accesses pages in a notebook with tabs. In this manner, a property inspector is built from a dynamic list of properties (as opposed to a static list of properties which is determined beforehand), each of which may be rapidly accessed by the user.

While the property list loaded into an inspector window for each object is dynamically constructed, the panes supporting each property may be pre-built. For example, the pane supporting a color palette, since it is complex in design, will be built in advance.

However, the method of the present invention may dynamically build individual panes as well. Candidates for dynamic pane building include simple properties, especially those which may have only a Boolean or yes/no value. Referring back to FIG. 7B, for example, inspector 715 includes a snap-to-grid property. Instead of loading a pre-constructed pane for this property, the method of the present invention dynamically constructs an appropriate pane (in this case, a simple check box), as shown in substep 1054a. An automatic list, on the other hand, is typically a simple group box (i.e., one having a plurality of radio buttons), which is preferably constructed dynamically, as shown by the inspector window 650 of FIG. 6H. In either case, the method may build appropriate inspector dialog components on-the-fly by simply examining a particular property and discerning its possible attributes. In a similar manner, "pick" lists of properties may be constructed and displayed, as shown in substep 1054c. A property pick list serves as an index to other property lists or other functions, as desired. By dynamically building inspectors for simpler properties, the method conserves system resources.

Construction of the inspector window is completed by inserting dialog controls (e.g., "OK", "CANCEL", and "HELP") for operating the dialog. In addition, an example window is displayed for indicating various changes to the properties of an object. This is accomplished by sending a message to the inspected object setting forth the current properties in the dialog; the inspected object returns an example or sample object which may then be displayed in the window. After changing a property, the dialog tab or button (e.g., tab 601a of FIG. 6A) corresponding to that property is updated (e.g., different font or screen color) for indicating that a change has been entered.

After constructing the property inspector dialog or window, at step 1055 the method enters a user event loop where the user inspects and sets various properties of the object by accessing the property (through the screen button or tab) and setting a new attribute. At the conclusion of the user event (e.g., by selecting "OK" or "CANCEL"), the user event is terminated.

At step 1056, the property list for the object being inspected is updated for any changes which occurred to the properties during the user event (of step 1055). This is accomplished by calling a setProperty method, which conceptually loops through each pane which has changed and updates the property list, accordingly. By way of illustration, the setProperty method may be defined as:

virtual BOOL setProperty(LPSTR lpPropStr, LPSTR
        lpValueStr, PROPTYPE pt=0);

The method receives the name of a property, either passed as a text string (lpPropStr) or as a handle (pt), and a value for that property, typically passed as a text string (lpValueStr).

Figure 10D:
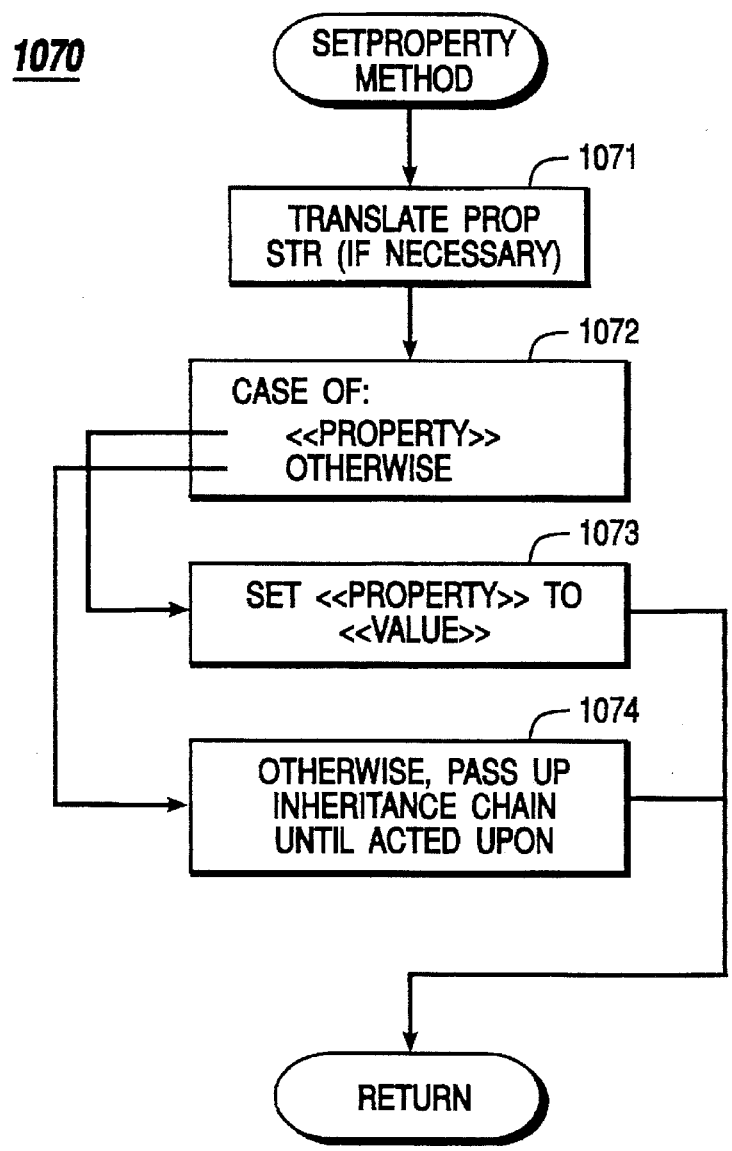
FIG. 10D is a flowchart illustrating a set property method of the present invention (substep from the method of FIG. 10C).

Referring now to FIG. 10D, the general steps of a setProperty method 1070 are illustrated. In step 1071, the property text string is translated; alternatively, the property is referenced directly bypassing a handle (i.e., integer or word value). At steps 1072–1073, the property is updated for the property value passed (e.g., by a CASE statement construct). If the property is not acted upon, it may be passed up the object's inheritance chain for action by an ancestor object, at step 1074. In this fashion, the values collected from the various property panes are used by the method to set the properties within the object.

While the foregoing outlines the general steps or framework for setProperty, the method is in fact defined as a virtual method. Thus, each class of objects may assume responsibility for setting its own properties. For an Annotate object (i.e., screen objects found in Graph windows), for example, an exemplary setProperty method may be constructed as follows:

```
BOOL Annotate::setProperty ( LPSTR lpPropStr, LPSTR lpValueStr, PROPTYPE
pt )
{
        WORD w;
        if ((w = info.propIndex (lpPropStr, pt)) < annoEndProps) {
            if (info.ppProps [w].getType( ) > prop__Compound)
                switch (w) {
                    case annoFrame:
                        getFrame (GlobalFrameProp.x,
GlobalFrameProp.y,
                                    GlobalFrameProp.w,
GlobalFrameProp.h);
                                break;
            }
            if ((info.ppProps [w].getProp( ))—>stringToValue (lpValueStr,
```

-continued

```
pt)) {
        BOOL f = TRUE;
        siwtch (w) {
                case annoFrame:
                        setFrame (GlobalFrameProp.x,
GlobalFrameProp.y,
                                        GlobalFrameProp.w,
GlobalFrameProp.h);
                        break;
                case annoHidden:
                        if (GlobalYesNoProp.index)
                                hide (TRUE);
                        else
                                show (TRUE);
                        break;
                case annoShow:
                        if (GlobalYesNoProp.index)
                                show (TRUE);
                        else
                                hide (TRUE);
                        break;
                case annoId:
                        if (pCW && pCW—>infoPtr( )—>objType ==
ot_Dialog)
                                f = ((DialView
*)pCW—>getContentView( ))—>setIdex (this, GlobalWordProp.w);
                        else
                                idx = GlobalWordProp.w;
                        break;
                case annoAttach:
                        flags.nochild = !GlobalYesNoProp.index;
                        break;
                case annoPosition:
                                *(WORD *)&flags = (*(WORD *)&flags
                                        & ~(vfPOSITION | vfLEFTREL |
vfTOPREL | vfRIGHTREL | vfBOTTOMREL
                                        | vfTOPTYPE | vfRIGHTTYPE)) |
                                flags.bottomType = flags.topType;
                                flags.leftType = flags.rightType;
                                break;
        }
        if (f)
                callConnection (lpPropStr, lpValueStr, pt);
                return f;
        }
        else
                return FALSE;
        }
        else
                return Tracker::setProperty (lpPropStr, lyValueStr, pt);
}
```

As shown, the override method processes properties specific for Annotate (e.g., change frame, ID, position, and the like). In the event that a property is not identified, the property is passed up the inheritance chain for appropriate processing (by a parent's setProperty method). In this manner, an individual object (e.g., an Annotate object) in the system is designed to know how to get (getProperty) and set (setProperty) its own properties.

After the update of step 1056, the method 1050 concludes. At this point, the system is ready for another inspection. Alternatively, the user may undertake other activities, as desired.

Attached hereto is a microfiche Appendix A containing C++ source code listings, which provide a description of the invention suitable for use in a general purpose digital computer system, such as an IBM-compatible personal computer. A suitable compiler for compiling and linking C++ code is available from Borland International.

While the invention is described in some detail with specific reference to a single preferred embodiment and certain alternatives, there is no intent to limit the invention to that particular embodiment or those specific alternatives. For example, the property inspection of the present invention has been illustrated with mouse devices. Those skilled in the art, however, will appreciate that other input devices, including trackballs, joysticks, light pens, and the like, may be employed. Moreover, the present invention may be advantageously implemented in a variety of UI platforms other than Windows, including Macintosh, X-Windows, Motif, NextStep, OS/2, and the like. Thus, the true scope of the present invention is not limited to any one of the foregoing exemplary embodiments but is instead defined by the following claims.

Source Code Appendix A
Attorney Docket No. 110

Copyright © 1992 Borland International, All Rights Reserved

```
/* File:    Notebook.hpp
             ------------

Copyright (C) Borland International, 1992.  All rights reserved.

*/ ifndef    _NOTEBOOK_HPP
define    _NOTEBOOK_HPP ifndef    _SSUSUAL_HPP
include "SSUsual.hpp"
endif ifndef    _DYNARRAY_HPP
include "DynArray.hpp"
endif ifndef    _STORAGE_HPP
include "Storage.hpp"
endif ifndef       _NBDATA_HPP
include "NBData.hpp"
endif ifndef    _FLOAT_HPP
include "Float.hpp"
endif include "silk.h"

if 1 ifndef    _NBPAGE_HPP         // for class Page and class PageTable
include "NBPage.hpp"
endif ifndef    _SSATTR_HPP
include "SSAttr.hpp"
endif ifndef    _SSFONT_HPP
include "SSFont.hpp"
endif ifndef    _HOTLINK_HPP
include "Hotlink.hpp"
endif ifndef    _FMLCELL_HPP
include "FmlCell.hpp"
endif endif class _EXPORT_ FloatList;
typedef FloatList far *LPFloatList;
class _EXPORT_ GraphList;      // avoids view hierarchy includes
```

Borland Atty. Doc. No. 110

Copyright © 1992 Borland International, All Rights Reserved

```c
class _EXPORT_ NPList;

#define MAXCOLORS 16
extern DWORD        defaultColorTable[MAXCOLORS];

/* Notebook Types ---------------------------------------------------------
*/ define     NB_DDE              0x01        // a DDE notebook
define     NB_DDE1             0x02        // reserved
#define     NB_DDE2             0x04        // reserved
#define     NB_OPENED   0x08                // a notebook is opened
#define     NB_LOADVALUES       0x10        // allow to load a notebook's data
define NB_NAMELOADED   0x20    // a notebook's names are loaded define     IsDDENB(pNB)              (pNB->nbType & NB_DDE)
define     IsNormalNB(pNB)           (! IsDDE(pNB))
#define IsOpenedNB(pNB)     (pNB->nbType & NB_OPENED)
#define IsLoadedNB(pNB)     (pNB->nbType & NB_LOADVALUES)
#define     IsNameLoaded(pNB) (pNB->nbType & NB_NAMELOADED)

#define NB_OpenedNormalNB       (NB_OPENED+NB_LOADVALUES+NB_NAMELOADED)
#define NB_UnopenedNormalNB     (0)
#define     NB_DDENB              (NB_DDE)

/* Notebook ---------------------------------------------------------------
    It is an array of records containing information abount sheets.
*/ class _EXPORT_ Notebook
{
protected:
    static WORD NBCount;

public:
/* Data
*/
    /* Notebook attributes
    */
    unsigned nbType : 8;        // type of a notebook
    unsigned defaultName : 1;   // name is default i.e. not defined yet
    unsigned nbDirty : 1;       // notebook is dirty
    unsigned macroLib : 1;      // set if it is a macro library
    unsigned isNetFile : 1;     // set if it is a network file
    unsigned isAsked : 1;       // set if it is already asked thru NBEnsure
    unsigned unused: 3;

VPTR                nbName;                     /* name of a notebook */
#if 0
    SSNameTable    nameTable;          /* table of names (named items) */
define   _nameTable( pNB )   pNB->nameTable if COMMENTOUT
    VPHotlink     hotlink;          /* VPTR to a hotlink list */
#   define   _hotlink( pNB )     pNB->hotlink
endif else
```

Borland Atty. Doc. No. 110

Copyright © 1992 Borland International, All Rights Reserved

```
        DynArray      nameTable;        /* table of names (named items) */
#       define   _nameTable( pNB )   (*((SSNameTable FAR *)&pNB->nameTable))
#if COMMENTOUT
        VPTR          hotlink;          /* VPTR to a hotlink list */
#       define   _hotlink( pNB )     (*((VPHotlink FAR *)&pNB->hotlink))
endif endif

// above is the minimum requirement for a DDE notebook

PASSWORD      password;         /* password */
#if 0
        PageTable     pageTable;        /* an array of notebook pages
*/
        SSAttrTable   attrTable;        /* shared cell attribute table
*/
        SSFontTable   fontTable;        /* font table */
        VPArray              styleTable;        /* style table */ define   _pageTable( pNB )    pNB->pageTable
define   _attrTable( pNB )    pNB->attrTable
#       define   _fontTable( pNB )    pNB->fontTable
#       define        _styleTable( pNB )      pNB->styleTable
#else
        VPTR          pageTable;        /* an array of notebook pages
*/
        DynArray      attrTable;        /* shared cell attribute table
*/
        DynArray      fontTable;        /* font table */
        VPTR          styleTable;       /* style table */
#       define   _pageTable( pNB )    (*((PageTable FAR *)&pNB->pageTable))
#       define   _attrTable( pNB )    (*((SSAttrTable FAR *)&pNB->attrTable))
#       define   _fontTable( pNB )    (*((SSFontTable FAR *)&pNB->fontTable))
#       define        _styleTable( pNB )      (*((VPArray FAR
*)&pNB->styleTable))
endif // above is the minimum requirement for a UNOPENED notebook /* Recalc info
*/
        unsigned calcMode : 2;        /* recalc mode */
        unsigned calcOrder      : 2;    /* recalc order */
        unsigned                : 2;    /* CFS_VOLATILE & CFS_CIRCULAR */
        unsigned calcEval : 1;       /* eval for row/col order = CFS_EVALUATE */
        unsigned calcRelink : 1;     /* relink for row/col order = CFS_RELINK
*/
        unsigned                : 8;
        WORD          calcIter;         /* recalc iteration */
#if 1
        FmlCell  calcWatchFml;          /* Watch formula */ define   _calcWatchFml( pNB )   pNB->calcWatchFml
else
        VPTR          calcWatchFml;     /* Watch formula */ define   _calcWatchFml( pNB )   (*((FmlCell FAR *)&pNB->calcWatchFml))
```

Borland Atty. Doc. No. 110

Copyright © 1992 Borland International, All Rights Reserved

```
endif
        int         nbFile;                     /* for network files */

/*    Page Link
        */
        BOOL    bPageLinkOn;          /* Page Link on/off */
        VPTR    vpPageLinkTable;  /* Page Link table */ private:
        GraphList       *pGraphList;
        LPNPList        lpNPList;

public:
        long                hClientDoc;      // Ole Handle of the doc from
OleRegisterDoc
        long                OLEObjectCounter; // OLE object counter
        DWORD               colorTable[MAXCOLORS];  // Palette used in this
notebook
        WORD                floatNextObject[ FTYPE_COUNT];
        WORD                wDialogNumber;

/*    Notebook Data Records
        */
        FillRec         dataFill;
        ParseRec        dataParse;
        RegressRec      dataRegress;
        MatrixRec       dataMatrix;
     TableRecord dataTable;
     DistRecord  dataDist;
     QueryRecord dataQuery;
        SortRecord      dataSort;
        OptimizerRec            dataOptimizer;
        SolveForRec             dataSolveFor;
        NamedStyleRec dataStyle;

/*
        List of LinkRange objects linked from objects (only for runtime)
*/
        List              * linkRangeList;

#       ifdef DEBUG
        void SelfTest();
#       endif

/* Constructor/Destructor
*/
        Notebook();    /* do nothing - use InitNotebook to do initialization */ static WORD NB_SizeOf( WORD type );
        /* Return the size of a notebook of a given type.
        */

BOOL InitNotebook( WORD type, NBIndex nbIndex );
        /* Initialize all variables.
        NOTE: The name is not set up yet, so it is not a valid notebook yet.
        Return FALSE if fail to initialize its fields.
        */
```

Copyright © 1992 Borland International, All Rights Reserved

```
      void FreeNotebook( BOOL bFreeNames );
      /* Free all storage associated to this notebook.
      ** If bFreeNames == TRUE, free notebook's name and name records.
      ** Otherwise, free unused name records only.
      */

/* Functions for notebook itself
*/
      LPSTR GetName();
      /* Get the name of notebook.
      */

BOOL SetName( LPSTR pName );
      /* Change the name of notebook.
            If pName == NULL, use the default name.
      */ void SetDirty();      // set dirty bit
      BOOL IsDirty();       // check whether the NB is dirty or not LPSSAttrTable GetAttrTable();
      LPSSFontTable GetFontTable();

#if COMMENTOUT
      LPSTR GetData( WORD wData );
      /* Right now only "dFill".
      */
endif /* Functions for its sheets
*/
      LPPageTable GetPageTable();
      /* Directly access functions supported by class PageTable.
      */

//LPPage NewPage( PageIndex pIdx );
      /* Create a page of the specified index.
            Return NULL if failed.
      */

LPPage GetPagePtr( PageIndex pIdx );
      /* Return the address of the Page object whose index is "pIdx".
            Return NULL if it doesn't exist.
      */

LPSSheet GetSheetPtr( PageIndex pIdx );
      /* Get the spreadsheet on the specified page.
            Return NULL if not a spreadsheet page.
      */

PageIndex PageIndexOf( LPPage pPage );
      /* Return the PageIndex of the Page object pointed by "pPage".
      */

WORD NumOfPages();
      /* Return the number of existing pages.
      */

GraphList FAR *GetGraphList( void );
```

Copyright © 1992 Borland International, All Rights Reserved

```
    /* Return pointer to graph list.
    */

LPFloatList GetFloatPtr( PageIndex pgi);
    /* Get the FloatList of a specific page in the NoteBook.
    */

LPNPList GetNPList( void );
    /* Return pointer to print settings */
};
typedef Notebook FAR *  LPNotebook;

LPSTR PageToName( LPNotebook pNB, PageIndex pIdx,
                        LPSTR pName, WORD wMax );
/* Copy the page name to pName.
    Where wMax is the max size of pName.
    Return the pointer to the end of the converted string pointed
      by pName.
*/

LPSTR ConvertPgNm( LPNotebook pNB, char cEnd, LPSTR pName,
                        PageIndex FAR * ppIdx );
/* Convert a name to a page index by matching the page name.
    Return the pointer to the position just immediately following
    the sucessful conversion.

cEnd is the char following the matched page name
    It can be a '\0' or PageSubfix.
*/ define NameToPage( pNB, pName, ppIdx )          \
            ConvertPgNm( pNB, '\0', pName, ppIdx )
/* Convert a name to a page index by matching the entire
    name, pointed by pName, with names of pages.
*/ define    StrToPage( pNB, pName, ppIdx )         \
            ConvertPgNm( pNB, PageSubfix, pName, ppIdx );
/* Convert the first segment, ended at PageSubfix, in pName
    to a page index if it matches one of page names.
*/

/* NBTable ------------------------------------------------------
    It is a table of special records containing pointers to notebooks.
*/ typedef struct {
    VPTR         vpNB;
    unsigned     currIndex   : 15;
    unsigned     used        : 1;
} NBRec;
typedef NBRec FAR *           LPNBRec;

class _EXPORT_ NBTable : public DynArray
{
public:
/* Functions
```

Borland Atty. Doc. No. 110

Copyright © 1992 Borland International, All Rights Reserved

```c
*/
    ~NBTable();
    /* Free all notebooks in the table.
    */

NBIndex NewNotebook( LPSTR pName );
    /* Create a new notebook of type NB_OPEN.
         If pName == NULL, use the default name created by NBCount.
    */

NBIndex NewNotebook( LPSTR pName, WORD type );
    /* Create a new notebook of a given notebook type.
         If type == NB_OPEN && pName == NULL,
      use the default name created by NBCount.
       If type != NB_OPEN, pName should point to a valid name.
    */ void DelNotebook( NBIndex nIndex );
    /* Delete a notebook.
    */

BOOL EraseNotebook( NBIndex nIndex );
    /* Erase a notebook and its windows.
    */ void CloseRelatives( NBIndex nIndex );
    /*    Close/delete anything relative to the specified notebook.
    **    Call it before removing a notebook by delete, erase, or ...
    */

LPNotebook GetNBPtr( NBIndex nIdx );
    /* Return the pointer to the notebook of the specified NBIndex.
    */ void SetDirty( NBIndex nIdx );
    // set dirty bit of a notebook

BOOL IsDirty( NBIndex nIdx );
    // check whether a notebook is dirty or not

BOOL SetNBName( NBIndex nIdx, CONST LPSTR pNBName );
    /* Set the name of a notebook to pNBName.
         Return FALSE if the pNBName is already used by other notebooks.
    */

LPSTR NBToName( NBIndex nIdx, LPSTR pName, WORD wMax );
    /* Copy the notebook name to pName.
    Where wMax is the max size of pName.
         Return the pointer to the end of the converted string pointed
         by pName.
    */

NBIndex NameToNB( LPSTR pName );
    /* Convert a name to a notebook index by matching the entire
         name, pointed by pName, with names of notebooks.
    Return the notebook index of a matched notebook.
    Return NBIDX_NULL if not found.
    */
```

Borland Atty. Doc. No. 110

Copyright © 1992 Borland International, All Rights Reserved

```
    void ClearFlags();
    /* Clear all flags in the notebook table and name tables.
    */ void MarkUse( NBIndex nbIndex );
    /* Mark a notebook is in use because someone reference it.
    */

NBIndex LoadExtNBRef( NBIndex niDep, NBIndex oldNBIndex, LPSTR pName );
    /*    Load an external notebook reference.
    */

NBIndex PtrToNB( LPNotebook pNB);
    /* From a pointer to a notebook return the index. */

LPNotebook OleDocToNBPtr( long hOleDoc);
    /* Find a Notebook from the OLE client doc handle */
};

LPFloatList _export GetFloatPtrFromNB( LPNotebook pNB, PageIndex pgi);
LPSTR _export GetNameFromNB( LPNotebook pNB);
LPSTR _export GetGraphListFromNB( LPNotebook pNB);

extern NBTable         GblNBTable;

#endif
```

Borland Atty. Doc. No. 110

Copyright © 1992 Borland International, All Rights Reserved

```cpp
/* File:    Notebook.cpp
            ------------

Copyright (C) Borland International, 1992.  All rights reserved.

*/ include "Notebook.hpp"

ifndef     _SSREFS_HPP
#include    "SSRefs.hpp"
endif ifndef     _STRUTIL_HPP
include    "StrUtil.hpp"
endif include    <stdlib.h> ifndef     _NBPAGE_HPP           // for class Page and class PageTable
include    "NBPage.hpp"
endif ifndef     _SSATTR_HPP
include    "SSAttr.hpp"
endif ifndef     _NBSTYLES_HPP
include    "NBStyles.hpp"
endif ifndef     _SSFONT_HPP
include    "SSFont.hpp"
endif ifndef     _SSNAME_HPP
include    "SSName.hpp"
endif ifndef     _HOTLINK_HPP
include    "Hotlink.hpp"
endif ifndef     _PROGRAM_HPP
include    "Program.hpp"
endif ifndef     _CDESK_HPP
include    "CDesk.hpp"
endif ifndef     _DDELINK_HPP
include    "DDELink.hpp"
endif ifndef     _FMLCELL_HPP
include    "FmlCell.hpp"
#endif
```

Borland Atty. Doc. No. 110

Copyright © 1992 Borland International, All Rights Reserved

```
#ifndef   _RECALC_HPP
#include "Recalc.hpp"
endif ifndef  _MACKERNEL_HPP
include "MacKernel.hpp"
endif ifndef       _MACDEBUG_HPP
include "MacDebug.hpp"
endif ifndef       _GRAPHLST_HPP
include "Graphlst.hpp"
endif ifndef       _FILEUTIL_HPP
include "FileUtil.hpp"
endif ifndef       _FORMAT_HPP
include "Format.hpp"
endif ifndef       _PROGSVC_HPP
include "ProgSvc.hpp"
endif ifndef       _PRINTSET_HPP
include "Printset.hpp"
endif ifndef       _PRINTER_HPP
include "Printer.hpp"
endif ifndef  _OLESHORT_HPP
include    "OleShort.Hpp"
endif ifndef  _CLIPTEXT_HPP
include "ClipText.hpp"
endif ifndef       _CLIP_HPP
include "Clip.hpp"
endif ifndef  _FONT_HPP
include "Font.hpp"
endif ifndef   _STATUSBAR_HPP
include "StatusBar.hpp"
endif ifndef   _STRTABLE_HPP
include "strtable.hpp"
#endif
```

Copyright © 1992 Borland International, All Rights Reserved

```cpp
#ifndef _PAGELINK_HPP
#    include "PageLink.hpp"
endif ifndef _MACRO_HPP
include "Macro.hpp"
endif define STRINGS
include "resource.h"

#include "Messages.h"

/* External Variables ---------------------------------------------
*/

// Was moved to GLOBQPW.CPP   NBTable     GblNBTable;

/* Notebook -------------------------------------------------------
     It is an array of records containing information abount sheets.
*/

WORD  Notebook::NBCount = 0;

#ifdef DEBUG
void Notebook::SelfTest()
{
     if ( DoSelfTest ) {
          assert( nbName.IsValid() );
     }
}
endif Notebook::Notebook()
{} pragma codeseg INIT1_TEXT
WORD Notebook::NB_SizeOf( WORD type )
/* Return the size of a notebook of a given type.
*/
{
     WORD wSize;

if ( type == NB_OpenedNormalNB ) return sizeof( Notebook );

wSize = sizeof(WORD)                    // flags
               + sizeof(VPTR)                // nbName
               + sizeof(DynArray);           // nameTable
     if ( !(type & NB_DDE) )
          wSize += ( 16                                        // password
                         + sizeof(GlobalHan)                   // pageTable
                         + sizeof(DynArray)                    // attrTable
                         + sizeof(DynArray)                    // fontTable
                         + sizeof(VPTR) );       // styleTable
     return wSize;
}
pragma codeseg NOTEBOOK_TEXT
```

Copyright © 1992 Borland International, All Rights Reserved

```
#pragma codeseg INIT1_TEXT
BOOL Notebook::InitNotebook( WORD type, NBIndex nbIndex )
/* Initialize all variables.
   Because the name is not set up yet, no SelfTest here.
*/
{
       SSFONTID fid;

memset( this, 0, NB_SizeOf(type) );
       nbType = type;
       defaultName = TRUE;

if ( ! (type & NB_DDE) ) {
              _attrTable(this).InitSSAttrTable();
              InitStyleTable( this );
              _fontTable(this).Initialize( );
              fid = _fontTable(this).SetFont( &(PredefFonts[NBKFONT]));
              assert(fid == SSC_HELVSTDFONTID);
              fid = _fontTable(this).SetFont( &(PredefFonts[NBKHEAD1FONT]));
              assert(fid == SSC_HELVHEAD1FONTID);
              fid = _fontTable(this).SetFont( &(PredefFonts[NBKHEAD2FONT]));
              assert(fid == SSC_HELVHEAD2FONTID);
       } if ( type == NB_OpenedNormalNB ) {

// Turn on ModeOn and redraw mode for QPro compatibility
              MacroFlagOn( MS_ModeOn );

WORD  i;

hClientDoc = 0;
              pGraphList = new GraphList(nbIndex);
              for (i = 0; i < FTYPE_COUNT;)
                     floatNextObject[i++] = 1;
              wDialogNumber = 1;
              OLEObjectCounter = 1;
              lpNPList = new NPList;
              calcMode  = CALC_BACKGROUND;
              calcOrder = CALC_NATURAL;
              calcIter  = 1;
              if ( _calcWatchFml(this).NewWatchFml( nbIndex ) == NULL )
                     return FALSE;
              _calcWatchFml(this).GetPtr()->state = CFS_SPECIAL | CFS_WATCH;
              FmlLink.Connect( _calcWatchFml(this) );
              MemCpy( colorTable, defaultColorTable, sizeof( colorTable));
              nbFile = NOFILE;
              bPageLinkOn = TRUE;
              ResetFillRec( &dataFill );
              ResetParseRec( &dataParse );
              ResetRegressRec( &dataRegress );
              ResetMatrixRec( &dataMatrix );
           ResetTableRecord( &dataTable );
           ResetDistRecord( &dataDist );
           ResetQueryRecord( &dataQuery );
           ResetSortRecord( &dataSort );
              ResetOptimizerRec( &dataOptimizer );
              ResetSolveForRec( &dataSolveFor );
              ResetNamedStyleRec( &dataStyle );
```

Copyright © 1992 Borland International, All Rights Reserved

```
                linkRangeList = new List (1);
        }
        return TRUE;
}
pragma codeseg NOTEBOOK_TEXT static int freeName( DAINDEX index, LPSSNameRec pNR, LPSTR pNULL )
{
        if ( pNR->vpName.IsValid() && !pNR->used ) {
                LPSSRef pRef = (LPSSRef)
((LPSSName)pNR->vpName.GetPtr())->GetRefPtr();
                if ( pRef && (pRef->hdr.type == REF_DDELINK) )
                        ((LPDDELink)pRef)->Delete();
                pNR->vpName.Dealloc();
        }
        pNR->used = FALSE;
        return 0;
} pragma codeseg INITRUN_TEXT
void Notebook::FreeNotebook( BOOL bFreeNames )
/* Free all storage associated to this notebook.
*/
{
ifdef DEBUG
        SelfTest();
endif if COMMENTOUT
        _hotlink(this).Dealloc();
#       endif
        if ( !(nbType & NB_DDE) ) {
                _pageTable(this).Dealloc();
                _attrTable(this).Dealloc();
                _fontTable(this).Dealloc();
                DeleteStyleTable( this );
                if ( nbType & NB_OPENED ) {
                        delete pGraphList;
                        pGraphList = NULL;
                        delete lpNPList;
                        lpNPList = NULL;
                        PRINTER->deleteNotebook( this );
                        _calcWatchFml(this).Unlink( FALSE );
                        _calcWatchFml(this).Dealloc();
                        ResetFillRec( &dataFill );
                        ResetParseRec( &dataParse );
                        ResetRegressRec( &dataRegress );
                        ResetMatrixRec( &dataMatrix );
                ResetTableRecord( &dataTable );
                ResetDistRecord( &dataDist );
                ResetQueryRecord( &dataQuery );
                ResetSortRecord( &dataSort );
                        ResetOptimizerRec( &dataOptimizer );
                        ResetSolveForRec( &dataSolveFor );
                        ResetNamedStyleRec( &dataStyle );
                        if ( bFreeNames ) {
                                if ( nbFile != NOFILE ) {
                                        _lclose( nbFile );
                                        nbFile = NOFILE;
```

Copyright © 1992 Borland International, All Rights Reserved

```
                        }
                }
                if (linkRangeList) {
                        linkRangeList->clear ();
                        delete linkRangeList;
                }
            }
      }

// free unused names
      _nameTable(this).Enumerate( (DAEnumFunc)freeName, NULL );

if ( bFreeNames ) {
            nbName.Dealloc();
            _nameTable(this).Dealloc();
      }

// return free space back to Windows
      CompactStorage();
}
pragma codeseg NOTEBOOK_TEXT LPSTR _export GetNameFromNB( LPNotebook pNB)
{
      return pNB->GetName();
}

LPSTR _export GetGraphListFromNB(LPNotebook pNB)
{
      return((LPSTR) pNB->GetGraphList());
} pragma codeseg INIT1_TEXT
LPSTR Notebook::GetName()
/* Get the name of a notebook.
*/
{
ifdef DEBUG
      SelfTest();
endif return nbName.GetPtr();
}
pragma codeseg NOTEBOOK_TEXT pragma codeseg INIT1_TEXT
BOOL Notebook::SetName( LPSTR pName )
/* Change the existing notebook name.
*/
{
      PATHNAME newName;

nbName.Dealloc();

if ( (defaultName = (pName == NULL)) == TRUE ) {
            WORD currCnt = NBCount;
            WORD maxLen = 8 - strlen( QPW_NB_Name );
            assert( ((int)maxLen) > 0 );
            char cntName[ 8 ];
```

Copyright © 1992 Borland International, All Rights Reserved

```
           forever {
                 itoa( ++NBCount, cntName, 10 );
                 if ( strlen(cntName) > maxLen )
                       NBCount = 0;
                 else {
                       StrCopy( StrPCopy( newName, sizeof(newName),
QPW_NB_Name ),
                                     sizeof(newName), cntName );
                       HL_FullName( NBIDX_NULL, newName );
                       if ( GblNBTable.NameToNB(newName) == NBIDX_NULL )
                             break;
                 }
                 if ( NBCount == currCnt ) {
                       // ?? set error
                       return FALSE;
                 }
           };
           pName = newName;
     }

FileStrUpper( pName );
     if (nbName.CopyBlock( strlen(pName)+1, pName )) {
           if( nbType == NB_OpenedNormalNB ) {
                 if (hClientDoc)
                       GblOleRenameClientDoc( (LHCLIENTDOC)hClientDoc,
pName);
                 else {
                       GblOleRegisterClientDoc( pName, (LHCLIENTDOC
*)&hClientDoc);
                       OleCheckOutOfDateObjects( this);
                 }
           }
           return TRUE;
     } else
           return FALSE;
}
pragma codeseg NOTEBOOK_TEXT void Notebook::SetDirty()
// set dirty bit
{
ifdef DEBUG
      SelfTest();
endif nbDirty = TRUE;
      CLIPBOARD.NotebookDirty( this);
} pragma codeseg INITRUN_TEXT
BOOL Notebook::IsDirty()
// check whether the NB is dirty or not
{
ifdef DEBUG
      SelfTest();
endif return nbDirty;
}
```

Borland Atty. Doc. No. 110

Copyright © 1992 Borland International, All Rights Reserved

```
#pragma codeseg NOTEBOOK_TEXT

LPSSAttrTable Notebook::GetAttrTable()
{
ifdef DEBUG
      SelfTest();
      assert( !(nbType & NB_DDE) );
endif return (LPSSAttrTable)(&attrTable);
} pragma codeseg INIT1_TEXT
LPSSFontTable Notebook::GetFontTable()
{
ifdef DEBUG
      SelfTest();
      assert( !(nbType & NB_DDE) );
endif return (LPSSFontTable)(&fontTable);
}
pragma codeseg NOTEBOOK_TEXT if COMMENTOUT
LPSTR Notebook::GetData( WORD wData )
/* Right now only "dFill".
*/
{
      return (&dFill);
}
endif /* Functions for its sheets
*/
#pragma codeseg INIT1_TEXT
LPPageTable Notebook::GetPageTable()
/* Directly access functions supported by class PageTable.
*/
{
ifdef DEBUG
      SelfTest();
      assert( !(nbType & NB_DDE) );
endif return (LPPageTable)(&pageTable);
}
pragma codeseg NOTEBOOK_TEXT pragma codeseg INIT1_TEXT
if COMMENTOUT
LPPage Notebook::NewPage( PageIndex pIdx )
/* Create a page of the specified index.
      Return NULL if failed.
*/
{
ifdef DEBUG
      SelfTest();
      assert( !(nbType & NB_DDE) );
```

Borland Atty. Doc. No. 110

Copyright © 1992 Borland International, All Rights Reserved

```
endif return _pageTable(this).NewPage( pIdx );
}
endif
pragma codeseg NOTEBOOK_TEXT pragma codeseg INIT1_TEXT
LPPage Notebook::GetPagePtr( PageIndex pIdx )
/* Return the address of the Page object whose index is "pIdx".
        Return NULL if it doesn't exist.
*/
{
ifdef DEBUG
        SelfTest();
        assert( !(nbType & NB_DDE) );
endif return _pageTable(this).LocatePage( pIdx );
}
pragma codeseg NOTEBOOK_TEXT LPSSheet Notebook::GetSheetPtr( PageIndex pIdx )
/* Get the spreadsheet on the specified page.
        Return NULL if not a spreadsheet page.
*/
{
ifdef DEBUG
        SelfTest();
        assert( !(nbType & NB_DDE) );
endif LPPage      pPage;
        return ( (pPage = GetPagePtr(pIdx)) != NULL ? pPage->GetSheet() : NULL
);
}

PageIndex Notebook::PageIndexOf( LPPage pPage )
/* Return the PageIndex of the Page object pointed by "pPage".
*/
{
ifdef DEBUG
        SelfTest();
        assert( !(nbType & NB_DDE) );
endif return _pageTable(this).PageIndexOf( pPage );
}

WORD Notebook::NumOfPages()
/* Return the number of existing pages.
*/
{       LPSST_INFO  pInfo;

#       ifdef DEBUG
        SelfTest();
        assert( !(nbType & NB_DDE) );
endif
```

Copyright © 1992 Borland International, All Rights Reserved

```
        if ( (pInfo = _pageTable(this).GetPtr()) != NULL )
              return (pInfo->wLast - pInfo->wFirst + 1);

return 0;
} pragma codeseg INITRUN_TEXT
GraphList FAR *Notebook::GetGraphList (void)
{
ifdef DEBUG
        SelfTest();
        assert( nbType == NB_OpenedNormalNB );
endif return pGraphList;
}
pragma codeseg NOTEBOOK_TEXT LPFloatList _export GetFloatPtrFromNB( LPNotebook pNB, PageIndex pgi)
{
        return pNB->GetFloatPtr(pgi);
} pragma codeseg INIT1_TEXT
LPFloatList Notebook::GetFloatPtr( PageIndex pgi)
/* Get the FloatList of a specific page in the NoteBook.
*/
{
    LPPage   pPg = GetPagePtr( pgi);

if (pPg)
              return pPg->lpFloat;
    else
              return NULL;
}
pragma codeseg NOTEBOOK_TEXT LPNPList Notebook::GetNPList (void)
{
ifdef DEBUG
        SelfTest();
        assert( nbType == NB_OpenedNormalNB );
endif return lpNPList;
} pragma codeseg INIT1_TEXT
LPSTR PageToName( LPNotebook pNB, PageIndex pIdx, LPSTR pName, WORD wMax )
/* Copy the page name to pName.
   Where wMax is the max size of pName.
     Return the pointer to the end of the converted string pointed
     by pName.
*/
{
        if ( pNB && !(pNB->nbType & NB_DDE) ) {
              LPPage       pPage;
              LPSTR pPageName;
```

Copyright © 1992 Borland International, All Rights Reserved

```
#           ifdef DEBUG
            pNB->SelfTest();
endif if ( (pPage = pNB->GetPagePtr(pIdx)) != NULL )
                if ( (pPageName = pPage->GetName()) != NULL )
                    return StrPCopy( pName, wMax, pPageName );
        } return SSNBCellRef::SheetToStr( pIdx, pName, wMax );
}
pragma codeseg NOTEBOOK_TEXT LPSTR ConvertPgNm( LPNotebook pNB, char cEnd, LPSTR pName,
                            PageIndex FAR * pPIdx )
/* Convert from a string to a page.
        Return the pointer to the position just immediately following
        the sucessful conversion.
*/
{
        LPSTR       pPageName;

/* Check it is a default name or not.
        */
        pPageName = SSNBCellRef::StrToSheet( pName, pPIdx );
        if ( *pPageName == cEnd )
                return pPageName;

if ( pNB && !(pNB->nbType & NB_DDE) ) { ifdef DEBUG
            pNB->SelfTest();
endif

LPSST_INFO  pInfo;
            LPPage              pPage;
            WORD        wFirst;
            LPSTR       pEnd;

/* Check it is a pre-defined name or not.
            */
            if ( (pInfo = _pageTable(pNB).GetPtr()) != NULL ) {
                wFirst = pInfo->wFirst;
                pPage = pNB->GetPagePtr( wFirst );

for (; wFirst<=pInfo->wLast; wFirst++, pPage++)
                    if ( (pPageName = pPage->GetName()) != NULL ) {
                        if ( ((pEnd = StrMatchI(pName, pPageName)) !=
NULL) &&
                                    (*pEnd == cEnd) ) {
                                *pPIdx = wFirst;
                                return pEnd;
                            }
                        }
                    }
            }

}       // pNB

*pPIdx = SS_MINPAGEIDX;
```

Copyright © 1992 Borland International, All Rights Reserved

```
        return pName;
}
/* NBTable --------------------------------------------------------------
        A notebook table is a DynArray of NBRec defined below.
*/
NBTable::~NBTable()
/* Free all notebooks in the table.
*/
{
        Dealloc();      // deallocate the notebook table
} pragma codeseg INIT1_TEXT
NBIndex NBTable::NewNotebook( LPSTR pName )
/* Create a new notebook.
        If pName == NULL, use the default name created by NBCount.
*/
{
        return NewNotebook( pName, NB_OpenedNormalNB );
}
pragma codeseg NOTEBOOK_TEXT pragma codeseg INIT1_TEXT
NBIndex NBTable::NewNotebook( LPSTR pName, WORD type )
/* Create a new notebook.
        If type == NB_OpenedNormalNB && pName == NULL,
        use the default name created by NBCount.
   If type != NB_OpenedNormalNB, pName should point to a valid name.
*/
{

WORD            wNBs;
        NBIndex         idx;
        LPNBRec         pNBR;
        NBRec       nbr;
        LPNotebook  pNB;
        VPTR            vpOldNB;
        VPTR            oldNbName;
        SSNameTable oldNmTbl;

if ( pName != NULL ) {
                idx = NameToNB(pName);
                if ( idx != NBIDX_NULL ) {
                        // already exist
                        pNBR = (LPNBRec) GetRecPtr( idx );
                        vpOldNB = pNBR->vpNB;
                        pNB = (LPNotebook) vpOldNB.GetPtr();
                        pNB->FreeNotebook( FALSE );
                        oldNbName = pNB->nbName;
                        oldNmTbl = _nameTable(pNB);
                        if ( pNB->nbType == type ) {
                                if ( pNB->InitNotebook(type,idx) ) {
                                        _nameTable(pNB) = oldNmTbl;
                                        pNB->nbName = oldNbName;
                                        pNB->defaultName = 0;
                                        return idx;
                                }
```

Copyright © 1992 Borland International, All Rights Reserved

```
                    return NBIDX_NULL;
            }
            goto newNB;
        }
    } wNBs = NumOfRecs();
    pNBR = (LPNBRec) GetFirstRecPtr();

for ( idx = 0; idx++ < wNBs; pNBR++) {
        if ( !pNBR->vpNB.IsValid() ) {
            goto newNB;    // get an empty slot
        }
    }
    if ( (wNBs == 0) && !InitDynArray(sizeof(NBRec)) )
        return NBIDX_NULL;
    memset( &nbr, 0, sizeof(nbr) );
    idx = AppendRec( (LPSTR)&nbr );    // append an empty slot
    if ( idx == NBIDX_NULL )
        return NBIDX_NULL;
    pNBR = (LPNBRec) GetRecPtr( idx );

newNB:
    if ( ! pNBR->vpNB.Alloc( Notebook::NB_SizeOf( type ) ) ) {
        pNBR->vpNB = vpOldNB;
        return NBIDX_NULL;
    } pNB = (LPNotebook) pNBR->vpNB.GetPtr();
    if ( pNB->InitNotebook(type,idx) ) {
        if ( vpOldNB.IsValid() ) {
            _nameTable(pNB) = oldNmTbl;
            pNB->nbName = oldNbName;
            pNB->defaultName = 0;
            vpOldNB.Dealloc();
            return idx;
        }
        else if ( pNB->SetName(pName) ) {
            return idx;
        }
    } pNB->FreeNotebook( TRUE );
    pNBR->vpNB.Dealloc();
    pNBR->vpNB = vpOldNB;
    return NBIDX_NULL;
}
pragma codeseg NOTEBOOK_TEXT pragma codeseg INITRUN_TEXT
void NBTable::DelNotebook( NBIndex nIndex )
/* Delete a notebook.
*/
{
    LPNBRec pNBR = (LPNBRec) GetRecPtr( nIndex );
    assert( pNBR != NULL );
    LPNotebook pNB = (LPNotebook) pNBR->vpNB.GetPtr();
    assert( pNB != NULL );
    CloseRelatives( nIndex );
```

Copyright © 1992 Borland International, All Rights Reserved

```
        if ( ! HasDependents(nIndex) ) {
              pNB->FreeNotebook( TRUE );
              pNBR->vpNB.Dealloc();
        }
        else if ( ! IsDDENB(pNB) ) {
              pNB->nbType = NB_UnopenedNormalNB;
              pNBR->vpNB.Resize( Notebook::NB_SizeOf(NB_UnopenedNormalNB) );
        }
        SB.UpdateCalcMode();
}
pragma codeseg NOTEBOOK_TEXT BOOL NBTable::EraseNotebook( NBIndex nIndex )
/* Erase a notebook and its windows.
*/
{
        LPNotebook pNB = GetNBPtr(nIndex);
        LPSTR pName;

if ( pNB->nbType == NB_OpenedNormalNB ) {
              // ?? nyi: notify OLE ??
              CloseRelatives( nIndex );
              getCDesk()->closeAllNBWins( nIndex );
              if ( !pNB->defaultName )
                    if ( !pNB->SetName(NULL) )      // fail to set a default name
                          return FALSE;
              pName = pNB->GetName();
              (void) HasDependents( nIndex );
              nIndex = NewNotebook( pName );
              pNB->defaultName = TRUE;
              if ( nIndex != NBIDX_NULL )
                    return getCDesk()->genNBWin( pName, nIndex, TRUE ) != NULL;
        }
        return FALSE;
} static int checkMacroLoc( LPSSRef pRef, NBIndex *pNI )
{
        assert(     !pRef->hdr.deleted && (pRef->hdr.type == REF_CELL) );
        if ( ((LPSSCellRef)pRef)->nbIdx == *pNI ) SSREF_DelRef( pRef->hdr );
        return CF_NONE;
} pragma codeseg INITRUN_TEXT
void NBTable::CloseRelatives( NBIndex nIndex )
/*      Close/delete anything relative to the specified notebook.
**      Call it before removing a notebook by delete, erase, or ...
*/
{
        // Tell OLE that the notebook is closed
        LPNotebook pNB = GetNBPtr( nIndex );
        if ( (pNB->nbType == NB_OpenedNormalNB) && (pNB->hClientDoc) ) {
              if (pNB->IsDirty())
                    GblOleRevertClientDoc( (LHCLIENTDOC)pNB->hClientDoc);
              GblOleRevokeClientDoc( (LHCLIENTDOC)pNB->hClientDoc);
        }

/*    remove background recalc
        */
```

Copyright © 1992 Borland International, All Rights Reserved

```
        if ( nIndex == BgNBIdx ) {
            BgNBIdx = NBIDX_NULL;
            CalcState = CALC_DONE;
            SB.UpdateCalcMode();
            CalcState = CALC_ON;
        }

/*      remove relatives from the macro
        */
        CheckMacroLocs( (CheckFunc) checkMacroLoc, &nIndex );
        if ( CurMacLoc.deleted )
            StopMacro();         // it stops macro if it is running /*      remove relatives from the clipboard
        */
        if ( (CLIPBOARD.clipInternal != NULL) &&
             (CLIPBOARD.clipInternal->clpFormat == CLP_RGDATA) )
        {
            CLIPBOARD.RenderAllformats();
            LPSelList pList = &
((ClipRgData*)CLIPBOARD.clipInternal)->dataList;
            LPSelObject pSO;
            for ( pSO = (LPSelObject) pList->GetFirstObjPtr();
                      pSO;
                      pSO = (LPSelObject) pList->NextObjPtr( pSO ) )
            {
                  // ?? nyi: handle other stuffs from the specified notebook
??
                  if ( pSO->GetSelRange() ) {
                      // it is a SSRgSel, so reset its notebook index not to
                      // get anything from the specified notebook again
                      if ( ((LPSSRgSel)pSO)->range.nbIdx == nIndex ) {
                          ((LPSSRgSel)pSO)->range.nbIdx = NBIDX_NULL;
                          CLIPBOARD.clipInternal->fDataFromCut = FALSE;
                      }
                  }
            }
        }

}
pragma codeseg NOTEBOOK_TEXT extern "C"
{
void cdecl asmGetNBPtr();
/*    Input:      ax = notebook index
**    Return:     es:si = pointer to a notebook
*/
} pragma codeseg INIT1_TEXT
LPNotebook NBTable::GetNBPtr( NBIndex nIdx )
/* Return the pointer to the notebook of the specified NBIndex.
*/
{
        if ( (_AX = nIdx) != NBIDX_NULL ) {
#           ifdef OOCGEN
            WORD   objSI;
            objSI = _SI;              // save si
```

Borland Atty. Doc. No. 110

Copyright © 1992 Borland International, All Rights Reserved

```
endif
            asmGetNBPtr();              // use GblNBTable only
#           ifdef OOCGEN
            _CX = _SI;
            _SI = objSI;
            return (LPNotebook) MAKEFP( _CX, _ES );
#           else
            return (LPNotebook) MAKEFP( _SI, _ES );
#           endif
      }
      return NULL;

#if COMMENTOUT          // because "out of memory"

#pragma inline
#define     I       asm

//    return ( (LPNotebook) ((LPNBRec) GetRecPtr( nIdx ))->vpNB.GetPtr() );

#define     SaveDS              mov dx, ds
#define     RestoreDS   mov ds, dx

I     SaveDS
I     lds         si, this          // ds:si = this ifdef DEBUG
//    check whether the table is allocated
I     cmp         word ptr [si], 0
I     jnz         __good                      // jmp if table is allocated
__error:
I     int         3
I     RestoreDS
      return NULL;
__good:
endif I     mov         ds, [si]          // ds:si = this->hGB
I     mov         ax, nIdx ifdef DEBUG
//    check whether nIdx is within the boundary
I     or          ax, ax
I     jz          __error
#pragma codeseg NOTEBOOK_TEXT
I     sub         si, si            // ds:si = this->hGB.GetPtr()
I     cmp         ax, [si]+2        // wRecs
I     ja          __error
endif //    si = ax * 6
I     dec         ax
I     shl         ax, 1
I     mov         si, ax
I     shl         ax, 1
I     add         si, ax
I     les         si, dword ptr [si+4]       // es:si = VPTR ifdef DEBUG
//    the VPTR cannot be NULL
```

Copyright © 1992 Borland International, All Rights Reserved

```
I       mov         ax, es
I       or          ax, ax
I       jz          __error
endif I       RestoreDS
        return (LPNotebook) MAKEFP( _SI, _ES );

#endif      // COMMENTOUT
} void NBTable::SetDirty( NBIndex nIdx )
// set dirty bit of a notebook
{
    GetNBPtr( nIdx )->SetDirty();
}

BOOL NBTable::IsDirty( NBIndex nIdx )
// check whether a notebook is dirty or not
{
        return GetNBPtr( nIdx )->IsDirty();
}

BOOL NBTable::SetNBName( NBIndex nIdx, CONST LPSTR pNBName )
/* Set the name of a notebook to pNBName.
        Return FALSE if the pNBName is already used by other notebooks.
*/
{
        LPNotebook  pNB;
        NBIndex             old;
        BOOL                fRet;

/* Check whether the name is already used or not.
                If yes, return whether it is used by "nIdx" or not.
        */
        if ( pNBName != NULL )
                if ( (old = NameToNB(pNBName)) != NBIDX_NULL )      // an existing name
                        return ( old == nIdx );

pNB = GetNBPtr( nIdx );
        fRet = pNB->SetName( pNBName );
        if (fRet)
                SendProgramMsg( THN_NEWNAME, nIdx, 0L );
        return fRet;
}

LPSTR NBTable::NBToName( NBIndex nIdx, LPSTR pName, WORD wMax )
/* Copy the notebook name to pName.
   Where wMax is the max size of pName.
        Return the pointer to the end of the converted string pointed
        by pName.
*/
{
        return StrPCopy( pName, wMax, GetNBPtr( nIdx )->GetName() );
}

NBIndex NBTable::NameToNB( LPSTR pName )
/* Convert a name to a notebook index by matching the entire
```

Copyright © 1992 Borland International, All Rights Reserved

```
        name, pointed by pName, with names of notebooks.
    Return the notebook index of a matched notebook.
    Return NBIDX_NULL if not found.
*/
{
        WORD    wNBs, idx;
        LPNBRec     pNBR;
        LPSTR pNbName;

wNBs = NumOfRecs();
        pNBR = (LPNBRec) GetFirstRecPtr();

for (idx = NBIDX_NULL; idx++ < wNBs; pNBR++) {
            if ( pNBR->vpNB.IsValid() ) {
                pNbName = ((LPNotebook)pNBR->vpNB.GetPtr())->GetName();
                if ( pNbName && SamePath(pName,pNbName) )
                    return (NBIndex) idx;
            }
        }
        return NBIDX_NULL;
} void NBTable::ClearFlags()
/* Clear all flags in the notebook table and name tables.
*/
{
        WORD         wNBs, idx;
        LPNBRec           pNBR;
        LPNotebook  pNB;

ClearIndexes();         // clear flags in the notebook table wNBs = NumOfRecs();
        pNBR = (LPNBRec) GetFirstRecPtr();

for (idx = NBIDX_NULL; idx++ < wNBs; pNBR++) {
            if ( (pNB = (LPNotebook)pNBR->vpNB.GetPtr()) != NULL ) {
                _nameTable(pNB).ClearIndexes();
            }
        }
} void NBTable::MarkUse( NBIndex nbIndex )
/* Mark a notebook is in use because someone reference it.
*/
{
        LPNBRec     pNBR = (LPNBRec) DynArray::GetRecPtr( nbIndex );
        assert( pNBR != NULL );
        pNBR->used = TRUE;
}

NBIndex NBTable::LoadExtNBRef( NBIndex niDep, NBIndex oldNBIndex, LPSTR pName
)
/*      Load an external notebook reference.
*/
{
        NBIndex     nbIndex;
        char   name[ MAXSTRL ];
```

Copyright © 1992 Borland International, All Rights Reserved

```
        if ( !pName || (*pName == EOS) ) {
                nbIndex = niDep;
        }
        else {
                StrCopy( name, sizeof(name), pName );
                HL_FullName( niDep, name );
                if ( (nbIndex = NameToNB(name)) == NBIDX_NULL ) {
                        nbIndex = NewNotebook( name,
                                                IsDDEName(name) ? NB_DDENB :
NB_UnopenedNormalNB );
                }
                else {
                        LPNotebook pNB = GblNBTable.GetNBPtr( nbIndex );
                        if ( !(pNB->nbType & NB_OPENED) )
                                pNB->nbType &= ~NB_LOADVALUES;           // stop
loading values
                }
        }
        if ( (nbIndex != NBIDX_NULL) && AssignIndex(oldNBIndex,nbIndex) ) {
                // don't mark "used" here, it is done in NBLoad.FixupRef
                //((LPNBRec) GblNBTable.GetRecPtr( nbIndex ))->used = TRUE;
                return nbIndex;
        }
        return NBIDX_NULL;
}

NBIndex NBTable::PtrToNB( LPNotebook pNB)
/* From a pointer to a notebook return the index. */
{
        WORD    wNBs, idx;
        LPNBRec      pNBR;

wNBs = NumOfRecs();
        pNBR = (LPNBRec) GetFirstRecPtr();

for (idx = NBIDX_NULL; idx++ < wNBs; pNBR++) {
                if ( pNBR->vpNB.IsValid() && (LPNotebook)pNBR->vpNB.GetPtr() ==
pNB)
                return (NBIndex) idx;
        }
        return NBIDX_NULL;
}

LPNotebook NBTable::OleDocToNBPtr( long hOleDoc)
/* Find a Notebook from the OLE client doc handle */
{
        WORD    wNBs, idx;
        LPNBRec      pNBR;
        LPNotebook pNB;

wNBs = NumOfRecs();
        pNBR = (LPNBRec) GetFirstRecPtr();

for (idx = NBIDX_NULL; idx++ < wNBs; pNBR++) {
                if ( pNBR->vpNB.IsValid() ) {
                        pNB = (LPNotebook)pNBR->vpNB.GetPtr();
                        if (pNB->hClientDoc = hOleDoc)
                                return pNB;
                }
```

Copyright © 1992 Borland International, All Rights Reserved

```
    }
    return NULL;
}
```

Copyright © 1992 Borland International, All Rights Reserved

```
/* File:   NBPage.hpp
           ----------

Copyright (C) Borland International, 1992.  All rights reserved.

*/ ifndef   _NBPAGE_HPP
define   _NBPAGE_HPP ifndef   _SSUSUAL_HPP
include "SSUsual.hpp"
endif ifndef   _SSHEET_HPP
include "SSheet.hpp"
endif ifndef   _STORAGE_HPP
include "Storage.hpp"
endif ifndef   _SSATTR_HPP
include "SSAttr.hpp"
endif ifndef   _SSRC_HPP
include "SSRC.hpp"
#endif

/* Forwards */
class _EXPORT_ FloatList;
typedef FloatList far *LPFloatList;

/* Sheet-wide attributes */
typedef struct {
     BYTE displayZeroes;
     BYTE iLineColor;
     ALIGNMENT labelAlign;
     ALIGNMENT valueAlign;
     CCLRINFO cclrInfo;
} PageAttrs;
typedef PageAttrs FAR * LPPageAttrs;

typedef struct {
     StyleID styleID;
} PANEDEF;
typedef PANEDEF FAR *    LPPANEDEF;

class _EXPORT_ PaneAttrs {
public:
     PANEDEF pnDef;
     SSRc ssRC;
public:
     PaneAttrs( BOOL fFirst );
     ~PaneAttrs( );
     PaneAttrs *clone( BOOL fSSRCDup, BOOL fFirst );
     void fileLoad ( LONG lParam );
```

Copyright © 1992 Borland International, All Rights Reserved

```
        void fileSave ( BOOL fFirstPane, LONG lParam );
        void loadEnd( LPNotebook lpNB, LPPage lpPG );
};
typedef PaneAttrs FAR * LPPaneAttrs;

/* Page Type -------------------------------------------------------------
*/ typedef  enum {
    PAGE_SHEET,              // spreadsheet page
    PAGE_GRAPH               // graph page
} PageType;

/* Page --------------------------------------------------------------
    It shows the structure of a page in a notebook.
*/
class _EXPORT_ Page
{
public:
/* Data
*/
        SSheet          sheet;                  // spreadsheet
        unsigned        pgType : 8;        // the type of page
        unsigned        protEnable : 1;    // (TRUE,FALSE) = (enable,disable) protection
        unsigned        brDirty : 1;       // TRUE - recalc the last, bottom-right, cell
        unsigned        bHasDirtyFml : 1;  // contain dirty fmls in the page
        VPTR            pgName;                  // name of this page
        POINT           brCell;            // bottom-right (last) cell PageAttrs       pgAttrs;           // default attrs for this page
        LPPaneAttrs     lpPNAttrs1;        // default pane attrs + row/col info
        LPPaneAttrs     lpPNAttrs2;        // ditto, for second pane LPFloatList     lpFloat;                 // List of FloatObject on sheet /* Constructor/Destructor
*/
        Page();    // call InitPage() to initialize all variables void InitPage();
        /* Initialize all variables.
        */ void FreePage();
        /* Free all storage associated to this page.
        */

/* Functions
*/
        LPSTR GetName();
        /* Get the name of a page.
        Return NULL if the name is not defined.
        */

BOOL SetName( LPSTR pName );
```

Copyright © 1992 Borland International, All Rights Reserved

```
    /* Change the existing name.
    */

PageType GetType();
    /* Get the type of page.
    */ void SetType( PageType type );
    /* By default any page is a spreadsheet page.
         Use this function to change the page type.
    */

LPSSheet GetSheet();
    /* Return pointer to the spreadsheet.
         Return NULL if not a spreadsheet page.
    */

POINT GetLastCell();
  /* Return the last cell of a page.
     Right now, it works for spreadsheet pages only.
  */ private:
    void InitPgAttrs( void );
    /* Initialize page-wide default attributes for this page
    */
};

typedef Page FAR *    LPPage;

/* PageTable -------------------------------------------------------
       A table of Page objects in a notebook.
*/ class _EXPORT_ PageTable : public SSArray
{
public:
/* Inherit
*/
#    define FreePageTable()      FreeSSArray()
      /* Free the table.
      */

//BOOL AllocPages( PageIndex wStart, PageIndex wEnd );
      /* Allocate pages from "wStart" to "wEnd".
      */

//LPPage NewPage( PageIndex pIdx );
      /* Create a page of the specified index.
      */ void InsMovePages( PageIndex wStart, PageIndex wEnd );
      /* Move pages from "wStart" to "wEnd" for insertion.
      */ void DeletePages( PageIndex wStart, PageIndex wEnd );
      /* Free all allocations of pages from "wStart" to "wEnd", and
           Delete pages from "wStart" to "wEnd".
```

Copyright © 1992 Borland International, All Rights Reserved
*/

```
    void FreePages( WORD wFirstPage, WORD wLastPage );
    /* Free all allocations of pages from "wFirstPage" to "wLastPage".
    */ void Dealloc();
    /* Dealloc all pages in the page table and itself.
    */

LPPage LocatePage( PageIndex pIdx );
    /* Return the address of the Page object whose index is "pIdx".
         Return NULL if it doesn't exist.
    */

PageIndex PageIndexOf( LPPage pPage );
    /* Return the PageIndex of the Page object pointed by "pPage".
    */ if COMMENTOUT
    LONG SendMsg( WORD wMsg, WORD wParam, LONG lParam );
    /* Clear flag first, then send message to every object in the list
         until reach the end of list or an object sets flag.
         NOTE:
               The caller needs to check whether or not the message
               was processed by function WasMsgProcessed().
    */

LONG BroadcastMsg( WORD wMsg, WORD wParam, LONG lParam );
    /* Send message to all objects in the list no matter they process
         it or not, and then clear flag.
    */
endif
};
typedef PageTable FAR *       LPPageTable;

/* Page initialization call back from InitRecs, SSARRAY */
extern void InitPages( LPSTR lpStart, WORD wSize, int wStart, int wEnd );

BOOL AllocPages( NBIndex nbIndex, PageIndex wStart, PageIndex wEnd );
/* Allocate pages from "wStart" to "wEnd".
*/

LPPage NewPage( NBIndex nbIndex, PageIndex pIdx );
/* Create a page of the specified index.
*/

BOOL InsAllocPages( NBIndex nbIndex, PageIndex wLast, PageIndex wStart,
PageIndex wEnd );
/* Allocate pages from "wStart" to "wEnd" for insertion.
*/

BOOL SetPageName( NBIndex nbIndex, PageIndex pIdx, LPSTR pPageName, BOOL
fCheckOnly );
/* Set the name of a page to pPageName.
     Return FALSE if the pPageName is the default page names like
     A, B, ... or is already used by other pages.
   If fCheckOnly is TRUE, only checks name for validity, doesn't
   actually do it.
```

Copyright © 1992 Borland International, All Rights Reserved
*/
BOOL _export IsIllegal( LPSTR pName );
endif

Copyright © 1992 Borland International, All Rights Reserved

```
/* File:    NBPage.cpp
            ---------
Copyright (C) Borland International, 1992.  All rights reserved.
*/ include "NBPage.hpp"

ifndef   _NOTEBOOK_HPP
#include "Notebook.hpp"
endif ifndef   _STRUTIL_HPP
include "StrUtil.hpp"
endif ifndef   _SSCREF_HPP
include "SSCRef.hpp"
endif ifndef   _RECFMTS_HPP
include "RecFmts.hpp"
endif ifndef   _FILEDR_HPP
include "FileDr.hpp"
endif ifndef   _NBLOAD_HPP
include "NBLoad.hpp"
endif ifndef   _NBSAVE_HPP
include "NBSave.hpp"
endif ifndef   _NBSTYLES_HPP
include "NBStyles.hpp"
endif ifndef   _PROGRAM_HPP
include "Program.hpp"
endif ifndef   _FLOAT_HPP
include "Float.hpp"
endif ifndef   _FLOATLIS_HPP
include "Floatlis.hpp"
endif ifndef   _FORMULA_HPP
include "Formula.hpp"
endif ifndef   _PROGSVC_HPP
include "ProgSvc.hpp"
endif
```

Copyright © 1992 Borland International, All Rights Reserved

```
#ifndef  _PAGELINK_HPP
#include "PageLink.hpp"
endif include "messages.h"
define STRINGS
include "resource.h"

/* PaneAttrs ----------------------------------------------------------
      Has all information associate with a given pane: default attributes,
      and all row:col information
*/
#pragma codeseg INIT1_TEXT
PaneAttrs::PaneAttrs( BOOL fFirst ) : ssRC(fFirst)
{
      // ssrc constructor called explicitly, so we need only initialize
      // pndef. Unused now, except for machine-generated default styles
      pnDef.styleID = STYLE_NORMAL;
}
pragma codeseg NBPAGE_TEXT pragma codeseg INITRUN_TEXT
PaneAttrs::~PaneAttrs( )
{
      // ssrc destructor called explicitly, so do nothing
}
pragma codeseg NBPAGE_TEXT PaneAttrs *PaneAttrs::clone(BOOL fSSRCDup, BOOL fFirst)
{
      PaneAttrs * pP = new PaneAttrs(fFirst);
      if (pP) {
            MemCpy( &(pP->pnDef), &(pnDef), sizeof(PANEDEF) );
            pP->ssRC.replace( &ssRC, fSSRCDup );
      }
      return pP;
} void PaneAttrs::fileLoad ( LONG lParam )
{
      LPNBLdRec lpLdRec;
      WORD recType;
      RB_PaneAttrs *pA;

lpLdRec = (LPNBLdRec)lParam;
      recType = lpLdRec->recType;

switch (recType) {
      case RT_Pane1DefAttrs:
      case RT_Pane2DefAttrs:
            pA = (RB_PaneAttrs *)(lpLdRec->lpRec);
            pnDef.styleID = pA->styleID;
            break;
      case RT_DefColWidth1:
      case RT_DefColWidth2:
      case RT_DefRowHeight1:
      case RT_DefRowHeight2:
      case RT_Pane1Col:
```

Borland Atty. Doc. No. 110                                              35

Copyright © 1992 Borland International, All Rights Reserved

```
        case RT_Pane2Col:
        case RT_Pane1Row:
        case RT_Pane2Row:
        case RT_Pane1RowRange:
        case RT_Pane2RowRange:
        case RT_MaxFont1:
        case RT_MaxFont2:
        case RT_MaxFont1Range:
        case RT_MaxFont2Range:
        case RT_Pane1HiddenCol:
        case RT_Pane1HiddenRow:
        case RT_Pane2HiddenCol:
        case RT_Pane2HiddenRow:
        case RT_RowHeightThor:
                ssRC.fileLoad( lParam );
                break;
        }
} void PaneAttrs::fileSave ( BOOL fFirstPane, LONG lParam )
{
        LPFileDriver pFD;
        RB_PaneAttrs rb_PaneAttrs;

/* Probably a better MemCpy-type way to do this */
        pFD = (LPFileDriver)lParam;
        rb_PaneAttrs.styleID = pnDef.styleID;
        pFD->WriteRec( fFirstPane ? RT_Pane1DefAttrs : RT_Pane2DefAttrs,
                        sizeof(RB_PaneAttrs), (LPSTR)&rb_PaneAttrs);

/* Pass along the rest to SSRC */
        ssRC.fileSave( fFirstPane, lParam );
} void PaneAttrs::loadEnd ( LPNotebook lpNB, LPPage lpPG )
{
        ssRC.loadEnd(lpNB, lpPG);
}

/* Page -------------------------------------------------------------
        It is a general description of a notebook page structure.
*/

Page::Page()
{} pragma codeseg INIT1_TEXT
void Page::InitPage()
/* Initialize all variables.
*/
{
        sheet = SSheet();
        pgType = PAGE_SHEET;
        protEnable = FALSE;
        brDirty = TRUE;
        pgName.Reset();
```

Copyright © 1992 Borland International, All Rights Reserved

```
        InitPgAttrs();
        lpPNAttrs1 = new PaneAttrs( TRUE );
        lpPNAttrs1->ssRC.init(SSC_HELVSTDFONTID);
        lpPNAttrs2 = NULLP;
        lpFloat = new FloatList();

}
pragma codeseg NBPAGE_TEXT pragma codeseg INITRUN_TEXT
void Page::FreePage()
/* Free all storage associated to this page.
*/
{
        LPSSheet pSheet;

if ( pgType == PAGE_SHEET ) {
                if ( (pSheet = GetSheet()) != NULLP)
                        pSheet->Dealloc();
        }
        pgName.Dealloc();
        if (lpPNAttrs1)
                delete lpPNAttrs1;
        if (lpPNAttrs2)
                delete lpPNAttrs2;
        if (lpFloat)
                delete lpFloat;
}
pragma codeseg NBPAGE_TEXT pragma codeseg INIT1_TEXT
LPSTR Page::GetName()
/* Get the name of a page.
*/
{
        return pgName.GetPtr();
}
pragma codeseg NBPAGE_TEXT BOOL Page::SetName( LPSTR pName )
/* Change the existing name.
*/
{
        pgName.Dealloc();
        return pgName.CopyBlock( strlen(pName)+1, pName );
}

PageType Page::GetType()
/* Get the type of page.
*/
{
        return (PageType) pgType;
} void Page::SetType( PageType type )
/* By default any page is a spreadsheet page.
        Use this function to change the page type.
*/
{
```

Copyright © 1992 Borland International, All Rights Reserved

```
        pgType = type;
} pragma codeseg INIT1_TEXT
LPSSheet Page::GetSheet()
/* Return pointer to the spreadsheet.
        Return NULL if not a spreadsheet page.
*/
{
        return ( pgType == PAGE_SHEET ? &sheet : NULL );
}
pragma codeseg NBPAGE_TEXT pragma codeseg INIT1_TEXT
POINT Page::GetLastCell()
/* Return the last cell of a page.
*/
{
    if ( brDirty ) {
        assert( pgType == PAGE_SHEET );
        brCell = sheet.LastCell( SSC_INFOBOUND ).ToPoint();
//      brDirty = FALSE;
    }
    return brCell;
}
pragma codeseg NBPAGE_TEXT pragma codeseg INIT1_TEXT
void Page::InitPgAttrs( void )
{
        memset( &pgAttrs, 0, sizeof(pgAttrs) );

pgAttrs.displayZeroes = TRUE;
        pgAttrs.iLineColor = BLACK;
        pgAttrs.labelAlign = ALIGN_LEFT;
        pgAttrs.valueAlign = ALIGN_RIGHT;
        pgAttrs.cclrInfo.cclrBound.fEnabled = FALSE;
        pgAttrs.cclrInfo.iclrBelow = RED;
        pgAttrs.cclrInfo.iclrNormal = BLACK;
        pgAttrs.cclrInfo.iclrAbove = GREEN;
        pgAttrs.cclrInfo.iclrERR = RED;

pgAttrs.cclrInfo.cclrBound.condUpperBound = 1e300;
        pgAttrs.cclrInfo.cclrBound.condLowerBound = 0;
}
pragma codeseg NBPAGE_TEXT /* PageTable --------------------------------------------------------
        A table of Page objects in a notebook.
*/ define    PAGESIZE        sizeof(Page)

pragma codeseg INIT1_TEXT
BOOL AllocPages( NBIndex nbIndex, PageIndex wStart, PageIndex wEnd )
{
        LPNotebook pNB = GblNBTable.GetNBPtr(nbIndex);
```

Borland Atty. Doc. No. 110

Copyright © 1992 Borland International, All Rights Reserved

```
        if ( _pageTable(pNB).AllocRecs( PAGESIZE, wStart, wEnd, InitPages ) ) {
             if ( IsOpenedNB(pNB) )
                  SendProgramMsg( THN_UPDATEPAGEPTR, nbIndex, 0 );
             return TRUE;
        }
        return FALSE;
} if COMMENTOUT
BOOL PageTable::AllocPages( PageIndex wStart, PageIndex wEnd )
/* Allocate pages from "wStart" to "wEnd".
*/
{
      return AllocRecs( PAGESIZE, wStart, wEnd, InitPages );
}
endif
pragma codeseg NBPAGE_TEXT pragma codeseg INIT1_TEXT
LPPage NewPage( NBIndex nbIndex, PageIndex pIdx )
{
      return AllocPages(nbIndex, pIdx, pIdx) ?
                _pageTable(GblNBTable.GetNBPtr(nbIndex)).LocatePage(pIdx) :
                NULL;
} if COMMENTOUT
LPPage PageTable::NewPage( PageIndex pIdx )
/* Create a page of the specified index.
*/
{
      return ( AllocPages(pIdx, pIdx) ? LocatePage(pIdx) : NULL );
}
endif
pragma codeseg NBPAGE_TEXT void PageTable::DeletePages( PageIndex wStart, PageIndex wEnd )
/* Free all allocations of pages from "wStart" to "wEnd", and
     Delete records from "wStart" to "wEnd".
*/
{
      FreePages( wStart, wEnd );
      DeleteRecs( FALSE, PAGESIZE, wStart, wEnd, InitPages );
} pragma codeseg INITRUN_TEXT
void PageTable::FreePages( WORD wFirstPage, WORD wLastPage )
/* Free all allocations of pages from "wFirstPage" to "wLastPage".
*/
{     LPPage          pPage;
      LPSSheet        pSheet;

if ( ULBounds( wFirstPage, wLastPage ) != NULL ) {
           pPage = LocatePage( wFirstPage );
           for (; wFirstPage<=wLastPage; wFirstPage++, pPage++)
                pPage->FreePage( );
      }
}
pragma codeseg NBPAGE_TEXT
```

Borland Atty. Doc. No. 110

Copyright © 1992 Borland International, All Rights Reserved

```
#pragma codeseg INITRUN_TEXT
void PageTable::Dealloc()
/* Dealloc all pages in the page table and itself.
*/
{
    FreePages( SS_MINPAGEIDX, SS_MAXPAGEIDX );
    SSArray::Dealloc();
}
pragma codeseg NBPAGE_TEXT pragma codeseg INIT1_TEXT
LPPage PageTable::LocatePage( PageIndex pIdx )
/* Return the address of the Page object whose index is "pIdx".
    Return NULL if it doesn't exist.
*/
{
    return (LPPage) LocateRec( PAGESIZE, pIdx );
}
pragma codeseg NBPAGE_TEXT PageIndex PageTable::PageIndexOf( LPPage pPage )
/* Return the PageIndex of the Page object pointed by "pPage".
*/
{
    return (PageIndex) RecIndex( PAGESIZE, (LPSTR) pPage );
} if COMMENTOUT
LONG PageTable::SendMsg( WORD wMsg, WORD wParam, LONG lParam )
/* Clear flag first, then send message to every object in the list
    until reach the end of list or an object sets flag.
    NOTE:
        The caller needs to check whether or not the message
        was processed by function WasMsgProcessed().
*/
{
    return 0;
}
LONG PageTable::BroadcastMsg( WORD wMsg, WORD wParam, LONG lParam )
/* Send message to all objects in the list no matter they process
    it or not, and then clear flag.
*/
{
    return 0;
}
endif /* Page initialization call back from InitRecs, SSARRAY */
pragma codeseg INIT1_TEXT
pubproc void InitPages( LPSTR lpStart, WORD wSize, int wStart, int wEnd )
{
    LPPage pPage = (LPPage)lpStart;
    for ( /* nothing */; wStart <= wEnd; wStart++, pPage++)
        pPage->InitPage();
}
pragma codeseg NBPAGE_TEXT BOOL InsAllocPages( NBIndex nbIndex, PageIndex wLast, PageIndex wStart,
PageIndex wEnd )
```

Copyright © 1992 Borland International, All Rights Reserved

```
/* Allocate pages from "wStart" to "wEnd" for insertion.
*/
{
        if ( GblNBTable.GetNBPtr(nbIndex)->GetPageTable()->InsAllocRecs(
                FALSE,    sizeof(Page), SS_MAXPAGEIDX, wLast, wStart, wEnd,
                InitPages) ) {
                SendProgramMsg( THN_UPDATEPAGEPTR, nbIndex, 0 );
                return TRUE;
        }
        return FALSE;
} void PageTable::InsMovePages( PageIndex wStart, PageIndex wEnd )
/* Move pages from "wStart" to "wEnd" for insertion.
*/
{
        InsMoveRecs( FALSE, sizeof(Page), SS_MAXSHEET, wStart, wEnd, InitPages
);
}

BOOL SetPageName( NBIndex nbIndex, PageIndex pIdx, LPSTR pPageName, BOOL
fCheckOnly )
/* Set the page name
*/
{
        LPNotebook    pNB;
        LPPage        pPage;
        PageIndex     old;

pNB = GblNBTable.GetNBPtr( nbIndex );

#       ifdef DEBUG
        assert( pNB && !(pNB->nbType & NB_DDE) );
endif assert( pPageName != NULL );

//      check for group name conflicts
        PageIndex   pgIdxFirst, pgIdxLast;
        if (GetPageLink( pNB, pPageName, pgIdxFirst, pgIdxLast )) {
                SetGlobErr(eid_ssdeGROUPNAMECLASH);
                return FALSE;
        } if (IsIllegal( pPageName )) {
                SetGlobErr( eid_IllegalPageName );
                return FALSE;
        }

/* Check the page name is existing or not.
              If existing, return TRUE if it equals to the page name of pIdx.
        */
        if ( NameToPage( pNB, pPageName, &old ) != pPageName ) {
                if (pIdx == old) {
                        //      DFL:   added this code to reset page name to default
                        char   sOldName[MAXNAME];
                        PageToName( pNB, old, sOldName, MAXNAME-1 );
                        if (!strcmp( pPageName, sOldName ))
                                return TRUE;
```

Copyright © 1992 Borland International, All Rights Reserved

```
           }
           else {
                 SetGlobErr( eid_DupPageName );
                 return FALSE;
           }
     } if ( (pPage = pNB->GetPagePtr( pIdx )) == NULL )
           if ( (pPage = NewPage( nbIndex, pIdx )) == NULL ) {
                 SetGlobErr( eid_NoPageName );
                 return FALSE;
           } return fCheckOnly ? TRUE : pPage->SetName( pPageName );
}
//    utility function BOOL _export IsIllegal( LPSTR pName )
{
     if (!*pName)
           return TRUE;

char   *sIllegal = ":;,.@+-/*=#$()<>{}[]&^\" ";
     char   *pIllChar = sIllegal;
     while (*pIllChar) {
           if (!strchr( pName, *pIllChar ))
                 ++pIllChar;
           else
                 return TRUE;
     }
     return FALSE;
}
```

Copyright © 1992 Borland International, All Rights Reserved

```
/* File:    Inspect.hpp
             ----------

Copyright (C) Borland International, 1992.  All rights reserved.

*/ if   !defined (_INSPECT_HPP)
define        _INSPECT_HPP    1 if   !defined (_COMMAND_HPP)
include       "Command.hpp"
endif class _EXPORT_ PropRecord;
class _EXPORT_ Object;
class _EXPORT_ SList;
class _EXPORT_ List;
class _EXPORT_ RadioButton;
class _EXPORT_ DialView;
class _EXPORT_ String;
class _EXPORT_ Annotate;
class _EXPORT_ View;

define MAXPROPNUM      40 class _export Inspect : public Command
{
protected:
      Object * pInspected;
      POINT where;
      WORD wProperties;
      WORD propertyIDs [MAXPROPNUM];
      String * values [MAXPROPNUM];
      String * oldValues [MAXPROPNUM];
      void * lpUndo;
      List * pList;
      List * pControlList;    // list of pane radiobuttons in compound dialog
      List * pPaneList;       // list of dialog panes in compound dialog
      DialView * pMainDialView;
      WORD wActive;                    // ordinal number of active pane
      View * pOrgView;
protected:
      DEFCLASSINFO(Inspect);
public:
      Inspect ( Object * pO, POINT p );
      Inspect ();

virtual ~Inspect( );

void resetValues ();

virtual LONG msg( WORD wMsg, WORD wParam, LONG lParam );
      virtual BOOL doUI( void );
      virtual BOOL doUIFromMacro ( void );

virtual BOOL doGuts( void );

virtual UNDO_ACTION undoable(void);
```

Borland Atty. Doc. No. 110

Copyright © 1992 Borland International, All Rights Reserved

```
    /* Return UNDO_SAVE.
    */ virtual BOOL saveUndo (LPSTR undoText);

virtual BOOL undoIt (void);

virtual BOOL redoIt (void);

virtual BOOL freeUndo (void);

virtual BOOL writeMacroArgs (LPSTR lpStr, WORD wMaxSz);

virtual BOOL setProperty( LPSTR lpPropStr, LPSTR lpValueStr, PROPTYPE pt
= 0 );
    virtual BOOL getProperty( LPSTR lpPropStr, LPSTR lpValueStr, PROPTYPE pt
= 0 );

// AL : 12-31-91 02:32pm
    inline List * getControlList() { return pControlList; }
    inline List * getPaneList() { return pPaneList; }
    inline DialView * getMainDialView() { return pMainDialView; } private:
    void setDirty (BOOL);    // set dirty flags for window if applicable
    void pagePrev ();  // goto previous page in compound dialog
    void pageNext ();  // goto next page in compound dialog
    void setCurrent (WORD); // set current page
    Annotate * checkCurrent ();    // check current page for valid settings
    Annotate * checkValue (DialView *, WORD); // check dialview for valid
settings
    void init ();      // initialize values
};

class _export Cmd_InspectPage : public Inspect
{
protected:
    DEFCLASSINFO(Cmd_InspectPage);
public:
    Cmd_InspectPage ( Object * pO, POINT p );
    Cmd_InspectPage ();
    virtual ~Cmd_InspectPage( );

virtual BOOL doUIFromMacro ( void );
    virtual UNDO_ACTION undoable(void);
    virtual BOOL saveUndo (LPSTR undoText);
    virtual BOOL undoIt (void);
    virtual BOOL redoIt (void);
    virtual BOOL freeUndo (void);
};

class _export Cmd_InspectNBWin : public Inspect
{
protected:
    DEFCLASSINFO(Cmd_InspectNBWin);
public:
    Cmd_InspectNBWin ( Object * pO, POINT p );
    Cmd_InspectNBWin ();
    virtual ~Cmd_InspectNBWin( );
```

Copyright © 1992 Borland International, All Rights Reserved

```cpp
        virtual BOOL doUIFromMacro ( void );
};

class _export Cmd_InspectDialogWin : public Inspect
{
protected:
        DEFCLASSINFO(Cmd_InspectDialogWin);
public:
        Cmd_InspectDialogWin ( Object * pO, POINT p );
        Cmd_InspectDialogWin ();
        virtual ~Cmd_InspectDialogWin( );

virtual BOOL doUIFromMacro ( void );
};

class _EXPORT_ Cmd_InspectGraphWin : public Inspect
{
protected:
        DEFCLASSINFO(Cmd_InspectGraphWin);
public:
        Cmd_InspectGraphWin ( Object * pO, POINT p );
        Cmd_InspectGraphWin ();
        virtual ~Cmd_InspectGraphWin( );

virtual BOOL doUIFromMacro ( void );
};

#endif       // _INSPECT_HPP
```

Copyright © 1992 Borland International, All Rights Reserved

```
/*
** INSPECT.CPP
**
** Copyright (C) 1992 by Borland International Inc.  All rights reserved.
**
*/ define _INSPECT_CPP    1 include "Inspect.hpp"
include "Macro.hpp"
#include "CmdSvc.hpp"
#ifndef     _PROPERTY_HPP
#       include "Property.hpp"
#endif
#ifndef _PROGRAM_HPP
#       include "Program.hpp"
endif
#ifndef _PROFILE_HPP
#       include "Profile.hpp"
#endif
#ifndef _SSVIEW_HPP
#       include "SSview.hpp"
#endif
#ifndef _DIALOG_HPP
#       include "Dialog.hpp"
#endif
#ifndef _UNDOABLE_HPP
#       include "undoable.hpp"
#endif
#ifndef _LIST_HPP
#       include "List.hpp"
#endif
#ifndef _SLIST_HPP
#       include "SList.hpp"
#endif
#ifndef _RESOURCE_HPP
#       include "Resource.hpp"
#endif
#ifndef _OBJPROP_HPP
#       include "ObjProp.hpp"
#endif
#ifndef _SELPROP_HPP
#       include "SelProp.hpp"
#endif
#ifndef _SPINSP_HPP
#       include "SpInsp.hpp"
#endif
#ifndef _STRUTIL_HPP
#       include "StrUtil.hpp"
endif include "messages.h"
define STRINGS
include "resource.h"

include <mem.h> enum
```

Copyright © 1992 Borland International, All Rights Reserved

```
{
    inspProp = 0,
    inspValue,
    inspInspected,
    inspEndProps
};

static PropRecord inspProps [] =
{
    { &GlobalTextProp, str_Property_Name, recHIDEFROMPROPMENU },
    { &GlobalTextProp, str_Property_Value, recHIDEFROMPROPMENU },
    { &GlobalObjProp, str_Inspected, recHIDEFROMPROPMENU },
};

static InletRecord insInlets [] =
{
    { IN_CHECK, istr_Check, 0 },
};

#if (sizeof (inspProps) / sizeof (PropRecord) - inspEndProps)
#    error "Inspect property number doesn't match"
endif CLASSINFOMETHODS(Inspect);
CLASSINFO(Inspect,Command,objCOMMAND,inspProps,NULLP,insInlets);

#pragma codeseg INIT1_TEXT
Inspect::Inspect ( Object * pO, POINT p ) : Command ( )
{
    pInspected = pO;
    pOrgView = NULLP;
    where = p;
    init ();
}
pragma codeseg INSPECT_TEXT pragma codeseg INIT1_TEXT
Inspect::Inspect () : Command ( )
{
    pInspected = NULLP;
    pOrgView = NULLP;
    GetCursorPos (&where);
    init ();
}
pragma codeseg INSPECT_TEXT pragma codeseg INIT1_TEXT
void Inspect::init ()
{
    wProperties = 0;
    setmem (propertyIDs, sizeof (propertyIDs), 0);
    setmem (values, sizeof (values), 0);
    setmem (oldValues, sizeof (oldValues), 0);
    lpUndo = NULLP;
    pList = NULLP;
    pControlList = NULLP;
    pPaneList = NULLP;
    pMainDialView = NULLP;
```

Borland Atty. Doc. No. 110

Copyright © 1992 Borland International, All Rights Reserved

```
        wActive = LASTPOS;
}
pragma codeseg INSPECT_TEXT

Inspect::~Inspect( )
{
        resetValues ();
} void Inspect::resetValues ()
{
        pOrgView = NULLP;
        String ** ppS = values;
        WORD w = MAXPROPNUM;
        while (w--) {
                if (*ppS) {
                        delete *ppS;
                        *ppS = NULLP;
                }
                ppS++;
        }
        wProperties = 0;
        wActive = LASTPOS;
}

BOOL Inspect::doUIFromMacro (void)
{
        char buf [MAXPROPSTR];

BOOL f = FALSE;
        pInspected = GetCurObject (FALSE, &pOrgView);
        if (pInspected) {
                GetStrArg (buf);
                if (!GetGlobErr()) {
                        PROPTYPE pt;
                        propertyIDs [0] = pInspected->infoPtr()->stringToNameID
(buf, pt);
                        if (propertyIDs [0]) {
                                GetStrArg (buf);
                                if (!GetGlobErr()) {
                                        values [0] = new String (buf);
                                        if (values [0]) {
                                                wProperties = 1;
                                                f = TRUE;
                                        }
                                }
                        }
                }
        }
        return f;
}

BOOL Inspect::doGuts( void )
{
        BOOL f = TRUE;

for (WORD w = 0; w < wProperties; w++) {
                if (values [w]) {
                        if (!pInspected->setProperty (LP_STR (propertyIDs [w]),
```

Copyright © 1992 Borland International, All Rights Reserved

```
(*values [w])(), 0)) {
                        SetGlobErr (eid_SetProperty);
                        f = FALSE;
                        break;
                }
        }
    }
    if (pOrgView)
        pOrgView->endInspect (pInspected);
    setDirty(TRUE);
    return f;
}

UNDO_ACTION Inspect::undoable (void)
{
    if ((pInspected->type() == ot_LinkRange) || (pInspected->type() ==
ot_CurrRange))
        return UNDO_SAVE_ON;
    else
        return UNDO_SAVE;
}

BOOL Inspect::saveUndo (LPSTR undoText)
{
    BOOL fTrash = FALSE;

if ( ((type() == ot_Inspect) || (type() == ot_CmdSetObjectProperty)) &&
        ((pInspected->type() == ot_LinkRange) || (pInspected->type() ==
ot_CurrRange))
        ) {        /* use LIAW undoable logic */
        CurrRange * pCR = (CurrRange *)pInspected;
        if (pCR->saveUndo( &lpUndo, NULLP )) {
            for (WORD w = 0; w < wProperties; w++) {
                if (values [w]) {
                    if (!pCR->updateUndo(lpUndo, LP_STR (propertyIDs
[w]))) {
                        fTrash = TRUE;
                        break;
                    }
                } /* pS */
            } /* for w */
            if (fTrash) {
                pCR->freeUndo (lpUndo);
                lpUndo = NULLP;
            }
        }
        else // saveUndo
            fTrash = TRUE;
    } /* if CurrRange */
    else {
        for (WORD w = 0; w < wProperties; w++) {
            char buf [MAXPROPSTR];

if (pInspected->getProperty (LP_STR (propertyIDs [w]), buf,
0)) {
                oldValues [w] = new String (buf);
                if (!oldValues [w]) {
                    fTrash = TRUE;
```

Borland Atty. Doc. No. 110                                                          49

Copyright © 1992 Borland International, All Rights Reserved

```
                        break;
                }
        }
        }
        lpUndo = NULLP;
    }
    return fTrash ? FALSE : Command::saveUndo(undoText);
}

BOOL Inspect::undoIt (void)
{
    BOOL f;

if (lpUndo == NULLP) {
// if we had to call endInspect in doGuts we have to get the current object
        if (pOrgView)
            pInspected = GetCurObject (FALSE, &pOrgView);
        setDirty (FALSE);
        for (WORD w = 0, f = TRUE; w < wProperties && f; w++) {
            if (values [w]) {
                f = pInspected->setProperty (LP_STR (propertyIDs [w]),
(*oldValues [w])(), 0);
                if (!f) {
                    SetGlobErr (eid_SetProperty);
                    break;
                }
            }
        }
        if (pOrgView)
            pOrgView->endInspect (pInspected);
    }
    else
        f = ((CurrRange *)pInspected)->undoIt(lpUndo);
    return f;
}

BOOL Inspect::redoIt (void)
{
    BOOL f;

if (lpUndo == NULLP) {
        if (pOrgView)
            pInspected = GetCurObject (FALSE, &pOrgView);
        setDirty(TRUE);
        for (WORD w = 0, f = TRUE; w < wProperties && f; w++) {
            if (values [w]) {
                f = pInspected->setProperty (LP_STR (propertyIDs [w]),
(*values [w])(), 0);
                if (!f) {
                    SetGlobErr (eid_SetProperty);
                    break;
                }
            }
        }
        if (pOrgView)
            pOrgView->endInspect (pInspected);
    }
    else
        f = ((CurrRange *)pInspected)->redoIt(lpUndo);
```

Copyright © 1992 Borland International, All Rights Reserved

```
        return f;
}

BOOL Inspect::freeUndo (void)
{
        String ** ppS = oldValues;
        WORD w = wProperties;
        while (w--) {
                if (*ppS) {
                        delete *ppS;
                        *ppS = NULLP;
                }
                ppS++;
        }
        if ( lpUndo ) {
                ((CurrRange *)pInspected)->freeUndo(lpUndo);
                lpUndo = NULLP;
        }
        return TRUE;
}

/* Basic SETPROPERTY writes out prop, buff.  Otherwise the
** property is embedded in the . syntax.
*/
BOOL Inspect::writeMacroArgs (LPSTR lpStr, WORD wMaxSz)
{
        char buf [MAXPROPSTR];
        BOOL fInspect = type() == ot_Inspect;

ResetRecordCmd( );
        for (WORD w = 0; w < wProperties; w++) {
                String * pS = values [w];
                if (pS) {
                        pInspected->infoPtr()->nameIDToString (propertyIDs [w],
buf);
                        if (fInspect) {
                                RecordCmdBeg (infoPtr(), 0);
                                PutStrArg (buf);
                        }
                        else
                                RecordCmdBegProp (infoPtr(), LP_STR (propertyIDs
[w]));

PutStrArg ((*pS)());
                        RecordCmdEnd ();
                }
        }
        return FALSE;
}

BOOL Inspect::setProperty( LPSTR lpPropStr, LPSTR lpValueStr, PROPTYPE pt )
{
        WORD w;

if ((w = info.propIndex (lpPropStr, pt)) < inspEndProps) {
                if ((info.ppProps [w].getProp())->stringToValue (lpValueStr, pt))
{
                        switch (w) {
                                case inspProp:
```

Borland Atty. Doc. No. 110                                                                                                                       51

Copyright © 1992 Borland International, All Rights Reserved

```
                            if (pInspected) {
                                    PROPTYPE pt;
                                    propertyIDs [0] =
pInspected->infoPtr()->stringToNameID (lpValueStr, pt);
                                    wProperties = 1;
                            }
                            break;
                    case inspValue:
                            if (pInspected && wProperties)
                                    values [0] = new String (lpValueStr);
                            break;
                    case inspInspected:
                            pInspected = GlobalObjProp.pObject;
                            resetValues ();
                            break;
                }
                return TRUE;
            }
            else if (w == inspInspected) {     // clear inspected object
                    pInspected = NULLP;
                    return TRUE;
            }
        }
        return FALSE;
}

BOOL Inspect::getProperty( LPSTR lpPropStr, LPSTR lpValueStr, PROPTYPE pt )
{
        WORD w;

if ((w = info.propIndex (lpPropStr, pt)) < inspEndProps) {
                switch (w) {
                    case inspProp:
                            if (pInspected && wProperties)
                                    pInspected->infoPtr()->nameIDToString
(propertyIDs [0], lpValueStr);
                            break;
                    case inspValue:
                            if (pInspected && values [0])
                                    StrCopy (lpValueStr, MAXPROPSTR, (*values
[0])());
                            break;
                    case inspInspected:
                            GlobalObjProp.pObject = NULLP;        // so it returns
blank
                            break;
                }
                (info.ppProps [w].getProp())->valueToString (lpValueStr, pt);
                return TRUE;
        }
        return FALSE;
} void Inspect::setDirty (BOOL f)
{
        WORD oFlags;
        Window * pW;

// Check if the object being inspected is in grapwin - then redraw blobs
```

Borland Atty. Doc. No. 110                                                52

Copyright © 1992 Borland International, All Rights Reserved

```
    if (pInspected) {
        if ((oFlags = pInspected->prop()) & objSPINSP)  // subInspector
            pW = ((View *) ((subInspector *)pInspected)->lpGraph)->pCW;
        else if (oFlags & objVIEW)                                       // view
            pW = ((View *) pInspected)->pCW;
        else if (oFlags & objWINDOW)                                     // window
            pW = (Window *)pInspected;
        else
            pW = NULLP;
        if (pW)
            pW->setDirty (f);
    }
}
```

What is claimed is:

1. In a computer system, a method for providing a user access to values of properties of objects appearing on screen, the method comprising:

(a) displaying a plurality of objects on screen, at least some of the objects having properties whose values can be set by the user;

(b) requesting properties of a particular object of interest, by positioning a screen cursor at or near the particular object and requesting inspection of the properties of the particular object;

(c) in response to the request for properties of the particular object, displaying a property dialog for the particular object, said property dialog including (i) a list of properties corresponding to a plurality of properties for the particular object, and (ii) at least one property pane corresponding to at least one property for the particular object, each property pane including one or more screen controls for getting and setting values for the corresponding property of the particular object;

(d) receiving user input for selecting one of said properties from the list; and (e) in response to said user input, displaying the property pane that corresponds to the selected property while continuing to display the list of properties.

2. The method of claim 1, wherein said displaying in step (e) is done so as to at least partially obscure other property panes of the property dialog.

3. The method of claim 2, wherein the selected property pane is displayed so as to substantially obscure all other property panes.

4. The method of claim 1, wherein at least one of the property panes is constructed dynamically upon receipt of said request.

5. The method of claim 1, wherein at least one of the property panes is preconstructed before receipt of said request.

6. The method of claim 1, wherein:

the list of properties is displayed as a plurality of notebook tabs; and each property pane is associated with a particular notebook tab appearing on screen, each notebook tab indicating to the user a specific property which is associated with the property pane of the notebook tab.

7. The method of claim 6, wherein each notebook tab displays a text label indicating a name for the property associated with the notebook tab.

8. The method of claim 7, wherein said particular object is a spreadsheet cell and wherein each text label indicates to the user a particular type of property for a spreadsheet cell.

9. The method of claim 8, wherein the text label includes text selected from: font, alignment, numeric format, color, height, and width.

10. The method of claim 1, further comprising:

(f) receiving user input for changing the value of the particular property.

11. The method of claim 1, wherein at least some of the property panes include screen controls for receiving user input for changing the value of a particular property.

12. The method of claim 11, wherein said screen controls are selected from: edit fields, radio buttons, check boxes, scroll bars, and push buttons.

13. The method of claim 1, wherein said requesting properties of a particular object step comprises:

positioning a two-button mouse device so that the screen cursor is located proximate the particular object of interest; and generating a selection signal by invoking one of the two mouse buttons.

14. The method of claim 13, wherein said generating a selection signal comprises generating a right-mouse button signal.

15. The method of claim 1, wherein said property dialog is displayed so that each property pane appears as a separate sheet in a tabbed notebook comprising a plurality of sheets, each sheet being associated with a tab member which displays a text label describing contents of the sheet.

16. The method of claim 1, wherein:

a particular property of said plurality of properties has associated with it a plurality of individually settable values; and the particular property's corresponding property pane includes a plurality of screen controls for getting and setting values for the particular property of the particular object.

17. In a computer system for operating an application program, a method for assisting a user for getting and setting of various properties of objects which comprise the application program, the method comprising:

(a) receiving first user input which requests access to properties of a particular object;

(b) in response to said first user input, displaying a tabbed property dialog comprising a plurality of descriptive tabs corresponding to a plurality of properties for the particular object and at least one of a corresponding plurality of property sheets, each property sheet, when displayed, presenting one or more user interface controls for setting respective values for a particular property of the particular object;

(c) receiving second user input for selecting one of the property sheets, said second user input comprising at least one signal from an input device for selecting the descriptive tab of the property sheet being selected;

(d) in response to said second user input, displaying said selected property sheet while continuing to display the plurality of descriptive tabs, said selected property sheet having one or more user interface controls for effecting respective changes to values for the property associated with the selected property sheet;

(e) receiving third user input at said one or more user interface controls of the selected property sheet, for changing the value of the associated property to a new value; and (f) in response to said third user input, changing the value of the property associated with said selected property sheet to the new value.

18. The method of claim 17, wherein said first user input includes a right-mouse button click.

19. The method of claim 18, wherein the descriptive tab for a property sheet includes user feedback indicating whether the value of the property of the associated property sheet has been changed by the user.

20. The method of claim 19, wherein said user feedback comprises a change in color.

21. The method of claim 17, wherein said particular object is a selected one of a spreadsheet cell, a spreadsheet block, a spreadsheet page, and a spreadsheet notebook.

22. The method of claim 17, wherein at least one of said values for at least one property comprises a numeric value for said at least one property.

23. The method of claim 17, wherein the descriptive tab for each property sheet is aligned to one side of the tabbed property dialog.

24. The method of claim 17, wherein said second user input comprises user input for selecting the tab for the property sheet being selected with a pointing device.

25. The method of claim 17, wherein said third user input comprises user input received from a selected one of a keyboard device and a pointing device.

26. The method of claim 17, wherein said user interface controls include selective ones of edit fields, radio buttons, check boxes, scroll bars, and push buttons.

27. The method of claim 17 wherein:

a particular property of said plurality of properties has associated with it a plurality of individually settable values; and the particular property's individually settable corresponding property sheet, when displayed, presents a plurality of user interface controls for setting respective values for the particular property of the particular object.

28. In a computer system including a processor; a screen device, and a pointing device for generating a first set of at least one signal designating locations on the screen device and a second set of at least one signal indicating at least one type of event at the designated screen location, a method for allowing a computer user to inspect and modify values corresponding to properties of objects displayed on the screen device, the method comprising operating the computer system to perform the steps of:

displaying a plurality of objects on the screen device, at least some of said objects being of different types, each different type of object having a different set of properties, each property for a given type of object having one or more individually settable values, with at least one of the properties for at least one type of object having a plurality of individually settable values;

in response to signals including a given type of event at a given designated location, identifying an object of interest; and displaying for the identified object of interest a dialog box that includes a list of properties available for the identified object, each property on the list being selectable, and a dialog pane containing user interface controls for indicating and setting values corresponding to the selected property, said list being displayed along an edge of the dialog pane with the selected property in the list being displayed to appear as a tab distinguished from the other properties in the list, said tab extending from an edge of the dialog pane.

29. The method of claim 28, wherein the pointing device is a mouse device, and further comprising the step of displaying a cursor on the screen device to provide a visible indication of the designated location.

30. The method of claim 28, wherein:

said pointing device is a mouse device;

said second set of at least one signal includes at least first and second types of signals in response to at least two respective types of user activation of said mouse device;

said first and second types of signals indicate said given type of event and an additional type of event; and the method further includes invoking actions for an object of interest in response to said additional type of event.

31. The method of claim 28, further comprising:

changing settable values corresponding to properties for the object of interest by entering new values for selected ones of the values associated with the properties.

32. The method of claim 28, wherein:

the identified object is of a type having a particular property having a plurality of individually settable values;

the selected property in the dialog box is the particular property; and the dialog pane has a plurality of user interface controls corresponding to the plurality of individually settable values for the selected property.

33. In a computer system including a processor, a screen device, and a pointing device for generating a first set of at least one signal designating locations on the screen device and a second set of at least one signal indicating at least one type of event at the designated screen location, a method for allowing a computer user to inspect and modify values corresponding to properties of objects displayed on the screen device, the method comprising operating the computer system to perform the steps of:

displaying a plurality of objects on the screen device, at least some of said objects being of different types, wherein each different type of object has a different set of properties, each property for a given type of object has one or more individually settable values, and the types of objects include at least one type of user-created object and at least one type of object that is not created by the user;

in response to signals including a given type of event at a given designated location, identifying an object of interest;

displaying for the identified object of interest, regardless of whether the object is a type of user-created object or is a type of object that is not created by the user, a dialog box that includes a list of properties available for the identified object, each property on the list being selectable, and a dialog pane containing user interface controls for indicating and setting values corresponding to the selected property;

receiving input specifying a different selected property in the list; and in response to the input, displaying a dialog pane containing user interface controls for indicating and setting values corresponding to the different selected property while continuing to display the list.

* * * * *